United States Patent
Higgins et al.

(10) Patent No.: US 8,774,978 B2
(45) Date of Patent: Jul. 8, 2014

(54) DEVICE AND METHOD FOR OPTIMIZATION OF CHILLED WATER PLANT SYSTEM OPERATION

(75) Inventors: Robert Higgins, Henderson, NV (US); Brendan McMasters, Braintree, MA (US)

(73) Assignee: Siemens Industry, Inc., Buffalo Grove, IL (US)

( * ) Notice: Subject to any disclaimer, the term of this patent is extended or adjusted under 35 U.S.C. 154(b) by 221 days.

(21) Appl. No.: 13/149,563

(22) Filed: May 31, 2011

(65) Prior Publication Data

US 2011/0301766 A1    Dec. 8, 2011

Related U.S. Application Data

(63) Continuation-in-part of application No. 12/758,780, filed on Apr. 12, 2010, now Pat. No. 8,417,392, which is a continuation-in-part of application No. 12/507,806, filed on Jul. 23, 2009, now Pat. No. 8,275,483.

(51) Int. Cl.
| | | |
|---|---|---|
| *G05D 3/12* | (2006.01) | |
| *G05D 5/00* | (2006.01) | |
| *G05D 9/00* | (2006.01) | |
| *G05D 11/00* | (2006.01) | |
| *G05D 17/00* | (2006.01) | |
| *G05D 7/00* | (2006.01) | |

(52) U.S. Cl.
USPC .......................................... 700/295; 700/282

(58) Field of Classification Search
USPC .................................................. 700/282, 295
See application file for complete search history.

(56) References Cited

U.S. PATENT DOCUMENTS

| 4,139,284 A | 2/1979 | Stella et al. |
| 4,423,765 A | 1/1984 | Hildebrand et al. |

(Continued)

FOREIGN PATENT DOCUMENTS

| CN | 2630717 | 8/2004 |
| JP | 2006-052880 A | 2/2006 |

(Continued)

OTHER PUBLICATIONS

Commercial HVAC Chiller Equipment, "Water-Cooled Chillers" Technical Development Program, Cat. No. 796-055, 2005, Carrier Corporation.

(Continued)

*Primary Examiner* — Mohammad Ali
*Assistant Examiner* — Ziaul Karim

(57) ABSTRACT

A demand flow device configured to interface with a chilled water plant controller to optimize performance of one or more chilled water plant components over a range of demand conditions is disclosed. The demand flow device includes a communication device configured to receive sensor data associated with the one or more chilled water plant components, wherein the sensor data measures operational variables of the chilled water plant. The demand flow device further includes a demand flow controller in communication with the communication device. The demand flow controller is configured to utilize the received sensor data to: determine an optimal pressure setpoint as a function of a desired chilled water delta T; control a chilled water flow rate through the one or more chiller water plant components as a function of the optimal pressure setpoint and the desired chilled water delta T; and adjust, via the chilled water plant controller, the optimal pressure setpoint, in response to one or more detected triggering events, to perform a critical zone reset of the desired chilled water delta T.

25 Claims, 23 Drawing Sheets

(56) References Cited

U.S. PATENT DOCUMENTS

| | | | |
|---|---|---|---|
| 4,879,879 A | | 11/1989 | Marsala et al. |
| 5,067,326 A | * | 11/1991 | Alsenz ............................ 62/193 |
| 5,074,938 A | * | 12/1991 | Chi ................................. 149/21 |
| 5,083,438 A | | 1/1992 | McMullin |
| 5,144,811 A | | 9/1992 | Brodie et al. |
| 5,537,830 A | * | 7/1996 | Goshaw et al. ................. 62/201 |
| 5,539,633 A | | 7/1996 | Hildebrand et al. |
| 5,600,960 A | | 2/1997 | Schwedler et al. |
| 5,632,154 A | | 5/1997 | Sibik et al. |
| 5,640,153 A | | 6/1997 | Hildebrand et al. |
| 5,729,474 A | | 3/1998 | Hildebrand et al. |
| 5,809,794 A | | 9/1998 | Sibik et al. |
| 5,946,926 A | | 9/1999 | Hartmann |
| 5,963,458 A | | 10/1999 | Cascia |
| 6,085,532 A | | 7/2000 | Sibik |
| 6,158,493 A | | 12/2000 | Hildebrand et al. |
| 6,185,946 B1 | | 2/2001 | Hartmann |
| 6,216,097 B1 | | 4/2001 | Choo et al. |
| 6,276,152 B1 | | 8/2001 | Sibik |
| 6,438,981 B1 | | 8/2002 | Whiteside |
| 6,446,448 B1 | | 9/2002 | Wang et al. |
| 6,467,288 B2 | | 10/2002 | Kuroki et al. |
| 6,499,308 B2 | | 12/2002 | Inoue et al. |
| 6,662,584 B1 | | 12/2003 | Whiteside |
| 6,718,779 B1 | | 4/2004 | Henry |
| 6,792,765 B2 | | 9/2004 | Domnick et al. |
| 6,874,691 B1 | | 4/2005 | Hildebrand et al. |
| 7,349,824 B2 | | 3/2008 | Seigel |
| 7,890,215 B2 | | 2/2011 | Duncan |
| 2003/0236593 A1 | | 12/2003 | Schumacher |
| 2004/0059691 A1 | | 3/2004 | Higgins |
| 2008/0006044 A1 | | 1/2008 | Tan |
| 2008/0162077 A1 | | 7/2008 | Chang et al. |
| 2009/0001202 A1 | | 1/2009 | Lesar et al. |
| 2009/0090498 A1 | | 4/2009 | Okada |
| 2009/0091437 A1 | * | 4/2009 | Corniot ........................ 340/442 |
| 2009/0171512 A1 | | 7/2009 | Duncan |
| 2009/0314484 A1 | | 12/2009 | Barrett et al. |
| 2009/0319087 A1 | | 12/2009 | Hasegawa et al. |
| 2010/0100246 A1 | | 4/2010 | Josserand et al. |
| 2011/0022236 A1 | | 1/2011 | Higgins |
| 2011/0137468 A1 | | 6/2011 | Duncan |
| 2011/0190946 A1 | | 8/2011 | Wong et al. |

FOREIGN PATENT DOCUMENTS

| | | |
|---|---|---|
| JP | 2008-261536 A | 10/2008 |
| KR | 10-0497909 B1 | 6/2005 |

OTHER PUBLICATIONS

Commercial HVAC Equipment, "Condensers and Cooling Towers" Technical Development Program, Cat. No. 796-060, 2005, Carrier Corporation.

www.coolenergytech.com, "Chiller Plant Optimizer", Aug. 14, 2007.

www.intdatsys.com/EWChillerPlant.htm, "Chiller Plant Optimization", copyright 2004-2008.

www.trane.com/Commercial/uploads/pdf/1244/TRACE700chillerplantanalyzer.pdf, "TRACE 700 Chiller Plant Analyzer", Dec. 22, 2006.

International Search Report and Written Opinion in International Patent Application No. PCT/US2012/36435 dated Sep. 28, 2012, 10 pages.

* cited by examiner

Fig. 7

| CWE Temperature | 61.00 | 64.97 | 67.20 | 75.00 | 78.00 | 80.00 | 83.00 |
|---|---|---|---|---|---|---|---|
| CWL Temperature | 75.00 | 79.59 | 81.20 | 89.00 | 92.00 | 94.00 | 97.00 |
| Chilled Water Pump KW | 46 | 54 | 65 | 49 | 55 | 59 | 48 |
| Condenser Water Pump KW | 26 | 27 | 31 | 27 | 28 | 29 | 29 |
| Chiller KW | 1027 | 1217 | 1321 | 1423 | 1555 | 1605 | 1571 |
| Tower Fan KW | 228 | 198 | 118 | 57 | 33 | 23 | 18 |
| Total Plant KW | 1327 | 1496 | 1535 | 1556 | 1671 | 1696 | 1666 |
| System Tons | 2130 | 2364 | 2408 | 2193 | 2353 | 2356 | 2201 |
| System KW/Ton | 0.623 | 0.633 | 0.640 | 0.680 | 0.710 | 0.720 | 0.757 |
| Chiller KW/Ton | 0.482 | 0.515 | 0.549 | 0.649 | 0.661 | 0.681 | 0.714 |
| CWP KW/Ton | 0.012 | 0.011 | 0.013 | 0.012 | 0.012 | 0.012 | 0.013 |
| CHWP KW/Ton | 0.022 | 0.023 | 0.027 | 0.022 | 0.023 | 0.025 | 0.022 |
| CT Fan KW/Ton | 0.107 | 0.084 | 0.049 | 0.026 | 0.014 | 0.010 | 0.008 |
| System KW/Ton | 0.623 | 0.633 | 0.637 | 0.710 | 0.710 | 0.728 | 0.757 |
| Online Chiller Capacity % | 59% | 70% | 75% | 81% | 87% | 91% | 93% |
| Online Chiller Capacity Tons | 3641 | 3401 | 3232 | 2724 | 2705 | 2603 | 2367 |
| | | | | | | | |
| Increased System Efficiency | 18% | 16% | 16% | 6% | 6% | 4% | 0% |
| Increased Chiller Efficiency | 32% | 28% | 23% | 9% | 7% | 5% | 0% |
| Increased Chiller Capacity | 54% | 44% | 37% | 15% | 14% | 10% | 0% |

Fig. 8

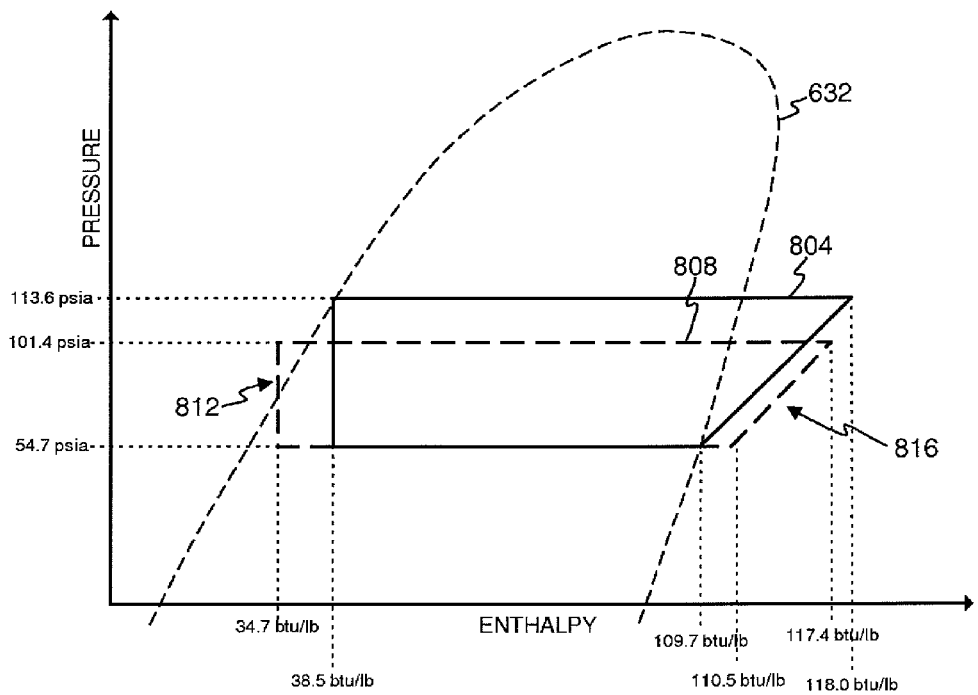

Fig. 17

| | Evaporator | | | | | | Condenser | | | | | | |
|---|---|---|---|---|---|---|---|---|---|---|---|---|---|
| comp kw/ton | chws temp | chwr temp | e sat temp | e sat psia | superheat enthalpy | cws temp | cwr temp | c sat temp | c sat psia | sub cool enthalpy | RE btu/lb | disc temp | d temp enthalpy |
| 0.700 | 43 | 54- | 45 | 55 | 110.50 | 85 | 95 | 97 | 133 | 40.50 | 70.00 | 127 | 118.90 |
| 0.680 | 43 | 48 | 45 | 55 | 109.70 | 79 | 85 | 87 | 114 | 38.50 | 71.20 | 117 | 118.00 |
| 0.581 | 43 | 54- | 45 | 55 | 110.50 | 68 | 78 | 80 | 101 | 34.70 | 75.80 | 110 | 117.40 |
| 0.341 | 38 | 54- | 40 | 50 | 110.50 | 49 | 59 | 61 | 73 | 28.40 | 82.11 | 91 | 115.30 |

Fig. 18

| CONSTANT FLOW CONDENSER WATER | | | | |
|---|---|---|---|---|
| TONS | GPM | CWET | CWLT | DELTA T |
| 1000 | 2400 | 85 | 95 | 10 |
| 900 | 2400 | 80 | 89 | 9 |
| 800 | 2400 | 75 | 83 | 8 |
| 700 | 2400 | 70 | 77 | 7 |
| 600 | 2400 | 65 | 71 | 6 |
| 500 | 2400 | 60 | 65 | 5 |
| 400 | 2400 | 55 | 59 | 4 |
| 300 | 2400 | 50 | 53 | 3 |
| 200 | 2400 | 45 | 47 | 2 |

| | comp kw/ton | Evaporator | | | | | Condenser | | | | | Refrigerant Properties | | | | CoP (Ref) | Tons |
|---|---|---|---|---|---|---|---|---|---|---|---|---|---|---|---|---|---|
| | | chws temp | chwr temp | e sat temp | e sat psia | superheat enthalpy | cws temp | cwr temp | c sat temp | c sat psia | sub cool enthalpy | RE btu/lb | disc temp | dtemp enthalpy | heat of comp | | |
| Design | 0.700 | 43 | 54 B | 45 | 55 | 110.50 C | 85 | 95 E | 97 | 133 | 40.50 A | 70.00 | 127 | 118.90 D | 8.40 | 8.33 | 440 |
| Pre | 0.680 | 43 | 48 b | 45 | 55 | 109.70 c | 79 | 85 e | 87 | 114 | 38.50 a | 71.20 | 117 | 118.00 D | 8.30 | 8.58 | 239 |
| Post | 0.531 | 43 | 54 | 45 | 55 | 110.50 | 68 | 78 | 80 | 101 | 34.70 | 75.80 | 110 | 117.40 | 6.90 | 10.99 | 297 |
| Best | 0.341 | 38 | 54 | 40 | 50 | 110.50 | 49 | 59 | 61 | 73 | 28.40 | 82.10 | 91 | 115.30 | 4.80 | 17.10 | 641 |

Fig. 21

Effect on Energy and Capacity by Lowering CWET at a Constant Delta T

| | | | | | | | |
|---|---|---|---|---|---|---|---|
| CWE Temperature | 61.00 | 64.97 | 67.20 | 75.00 | 78.00 | 80.00 | 83.00 |
| CWL Temperature | 75.00 | 79.59 | 81.20 | 89.00 | 92.00 | 94.00 | 97.00 |
| Chilled Water Pump KW | 46 | 54 | 65 | 49 | 55 | 59 | 48 |
| Condenser Water Pump KW | 26 | 27 | 31 | 27 | 28 | 29 | 29 |
| Chiller KW | 1027 | 1217 | 1321 | 1423 | 1555 | 1605 | 1571 |
| Tower Fan KW | 228 | 198 | 118 | 57 | 33 | 23 | 18 |
| Total Plant KW | 1327 | 1496 | 1535 | 1556 | 1671 | 1696 | 1666 |
| System Tons | 2130 | 2364 | 2408 | 2193 | 2353 | 2356 | 2201 |
| System KW/Ton | 0.623 | 0.633 | 0.640 | 0.680 | 0.710 | 0.720 | 0.757 |
| Chiller KW/Ton | 0.482 | 0.515 | 0.549 | 0.649 | 0.661 | 0.681 | 0.714 |
| CWP KW/Ton | 0.012 | 0.011 | 0.013 | 0.012 | 0.012 | 0.012 | 0.013 |
| CHWP KW/Ton | 0.022 | 0.023 | 0.027 | 0.022 | 0.023 | 0.025 | 0.022 |
| CT Fan KW/Ton | 0.107 | 0.084 | 0.049 | 0.026 | 0.014 | 0.010 | 0.008 |
| System KW/Ton | 0.623 | 0.633 | 0.637 | 0.710 | 0.710 | 0.728 | 0.757 |
| Online Chiller Capacity % | 59% | 70% | 75% | 81% | 87% | 91% | 93% |
| Online Chiller Capacity Tons | 3641 | 3401 | 3232 | 2724 | 2705 | 2603 | 2367 |
| | | | | | | | |
| Increased System Efficiency | 18% | 16% | 16% | 6% | 6% | 4% | 0% |
| Increased Chiller Efficiency | 32% | 28% | 23% | 9% | 7% | 5% | 0% |
| Increased Chiller Capacity | 54% | 44% | 37% | 15% | 14% | 10% | 0% |

(3) 100 HP CHWP Online (300 HP)
(2) 200 HP CWP Online (400 HP)
(2) CVHE Trane 1250 Online (320 HP)
(4) Evapco CT / 8 fans online Air Side Capacity Opportunity

Fig. 23A

| | A | B | C | D | E |
|---|---|---|---|---|---|
| 1 | Tons | GPM | CHWS | CHWR | Delta T |
| 2 | 42 | 100 | 45 | 55 | 10 |
| 3 | 38 | 100 | 45 | 54 | 9 |
| 4 | 33 | 100 | 45 | 53 | 8 |
| 5 | 29 | 100 | 45 | 52 | 7 |
| 6 | 25 | 100 | 45 | 51 | 6 |
| 7 | 21 | 100 | 45 | 50 | 5 |
| 8 | 17 | 100 | 45 | 49 | 4 |
| 9 | 13 | 100 | 45 | 48 | 3 |
| 10 | 8 | 100 | 45 | 47 | 2 |
| 11 | 4 | 100 | 45 | 46 | 1 |

Fig. 23B

| | F | G | H | I | J |
|---|---|---|---|---|---|
| 1 | Tons | GPM | CHWS | CHWR | Delta T |
| 2 | 42 | 100 | 45 | 55 | 10 |
| 3 | 42 | 92 | 44 | 55 | 11 |
| 4 | 42 | 84 | 43 | 55 | 12 |
| 5 | 42 | 78 | 42 | 55 | 13 |
| 6 | 42 | 72 | 41 | 55 | 14 |
| 7 | 42 | 67 | 40 | 55 | 15 |
| 8 | 42 | 63 | 39 | 55 | 16 |
| 9 | 42 | 59 | 38 | 55 | 17 |
| 10 | 42 | 56 | 37 | 55 | 18 |
| 11 | 42 | 53 | 36 | 55 | 19 |

Fig. 23C

| | K | L | M | N | O |
|---|---|---|---|---|---|
| 1 | Tons | GPM | CHWS | CHWR | Delta T |
| 2 | 42 | 100 | 45 | 55 | 10 |
| 3 | 46 | 100 | 44 | 55 | 11 |
| 4 | 50 | 100 | 43 | 55 | 12 |
| 5 | 54 | 100 | 42 | 55 | 13 |
| 6 | 58 | 100 | 41 | 55 | 14 |
| 7 | 63 | 100 | 40 | 55 | 15 |
| 8 | 67 | 100 | 39 | 55 | 16 |
| 9 | 71 | 100 | 38 | 55 | 17 |
| 10 | 75 | 100 | 37 | 55 | 18 |
| 11 | 79 | 100 | 36 | 55 | 19 |

Fig. 24

| | A | C | D | E | F | G | H | I | J | K | L | M | N |
|---|---|---|---|---|---|---|---|---|---|---|---|---|---|
| 2 | VAV AIR HANDLER DESIGN DATA | JAN | FEB | MAR | APR | MAY | JUN | JUL | AUG | SEP | OCT | NOV | DEC |
| 5 | Monthly Average AHU CFM | 110250 | 126000 | 157500 | 189000 | 220500 | 252000 | 283500 | 315000 | 252000 | 189000 | 126000 | 110250 |
| 6 | Base Line AHU SAT | 55.0 | 55.0 | 55.0 | 55.0 | 55.0 | 55.0 | 55.0 | 55.0 | 55.0 | 55.0 | 55.0 | 55.0 |
| 7 | AHU SAT Wet Bulb Assumption | 54.9 | 54.9 | 54.9 | 54.9 | 54.9 | 54.9 | 54.9 | 54.9 | 54.9 | 54.9 | 54.9 | 54.9 |
| 8 | AHU SAT Enthalpy Assumption | 23.1 | 23.1 | 23.1 | 23.1 | 23.1 | 23.1 | 23.1 | 23.1 | 23.1 | 23.1 | 23.1 | 23.1 |
| 9 | Monthly Average AHU Qt | 300 | 400 | 500 | 600 | 700 | 800 | 900 | 1000 | 800 | 600 | 400 | 300 |
| 10 | Approximate AHU Fan Energy | 6 | 10 | 19 | 32 | 51 | 76 | 109 | 149 | 76 | 32 | 10 | 6 |
| 15 | Minimum CFM % | 35% | 35% | 35% | 35% | 35% | 35% | 35% | 35% | 35% | 35% | 35% | 35% |
| 16 | Minimum SAT | 55 | 54 | 53 | 52 | 52 | 52 | 50 | 50 | 52 | 53 | 54 | 55 |
| 17 | AHU SAT Wet Bulb Assumption | 54.9 | 53.9 | 52.9 | 51.9 | 51.9 | 51.9 | 49.9 | 49.9 | 51.9 | 52.9 | 53.9 | 54.9 |
| 18 | AHU SAT Enthalpy Assumption | 23.1 | 22.5 | 21.9 | 21.3 | 21.3 | 21.3 | 20.1 | 20.1 | 21.3 | 21.9 | 22.5 | 23.1 |
| 19 | Base Line KW | | | | | | | | | | | | |
| 20 | h2 calculation | 30.4 | 31.6 | 31.6 | 31.6 | 31.6 | 31.6 | 31.6 | 31.6 | 31.6 | 31.6 | 31.6 | 30.4 |
| 22 | DF AHU CFM | 110250 | 117531 | 137946 | 156012 | 182014 | 208016 | 209578 | 232864 | 208016 | 165535 | 117531 | 110250 |
| 23 | Monthly Average AHU Qt | 300 | 400 | 500 | 600 | 700 | 800 | 900 | 1000 | 800 | 600 | 400 | 300 |

DEVICE AND METHOD FOR OPTIMIZATION OF CHILLED WATER PLANT SYSTEM OPERATION

CROSS REFERENCE

This patent document is a continuation-in-part of and claims the priority benefit provided under 35 U.S.C. §120 to U.S. patent application Ser. No. 12/758,780 filed on Apr. 12, 2010 which is a continuation in part of U.S. patent application Ser. No. 12/507,806 filed on Jul. 23, 2009. The entire contents of which are hereby expressly incorporated herewith for all purposes to the extent permitted by law.

TECHNICAL FIELD

The invention relates generally to chilled water comfort cooling and industrial process cooling systems and in particular to methods and apparatus for efficiently operating chilled water cooling systems.

BACKGROUND

Many commercial and other buildings and campuses are cooled by chilled water plants. In general, these chilled water plants produce chilled water which is pumped to air handlers to cool building air. Chillers, air handlers, and other components of a chilled water plant are designed to operate at a specific chilled water entering and leaving temperature, or Delta T. At design Delta T, these components are at their most efficient and can produce cooling output at their rated capacity. Low Delta T, which occurs when the entering and leaving temperature become closer than the design Delta T, reduces efficiency and cooling capacity of the chilled water plant and causes the chilled water plant to use more energy than required for a given demand.

Chilled water plants are designed to meet a maximum possible cooling demand of a building, campus, or the like, also known as the design condition. At the design condition, chilled water plant components are at the upper end of their capacity, where the system is most energy efficient. However, it is rare that such a high demand for cooling is necessary. In fact, almost all chilled water plants operate below design conditions for 90% of the year. For example, cool weather conditions can cause cooling demand to drop considerably. As cooling demand is reduced, Delta T is often also reduced. This means that for the majority of the time, almost all chilled water plants are operating at low Delta T and less than optimal efficiency. This chronic low Delta T, is referred to as Low Delta T Syndrome.

Many mitigation strategies have been developed to address Low Delta T Syndrome, such as through the use of sophisticated sequencing programs and equipment ON/OFF selection algorithms, but none have proven to completely resolve this phenomenon. In most instances, the chilled water plant operator simply pumps more water to system air handlers to increase their output, but this has the compounding effect of further reducing the already low Delta T. Also, increased pumping in the secondary loop results in higher than necessary pumping energy usage.

From the discussion that follows, it will become apparent that the present invention addresses the deficiencies associated with the prior art while providing numerous additional advantages and benefits not contemplated or possible with prior art constructions.

SUMMARY

Demand Flow provides a method and apparatus for highly efficient operation of chilled water plants. In fact, when compared to traditional operational schemes, Demand Flow provides substantial energy savings while meeting cooling output requirements. In general, Demand Flow controls pumping of chilled water, condenser water, or both according to a constant Delta T line. This reduces energy utilization, reduces or eliminates Low Delta T Syndrome, while allowing a chilled water plant to meet cooling demand. In one or more embodiments, the constant Delta T line may be reset to another Delta T line to meet changing cooling demands while remaining energy efficient.

Low Delta T Syndrome has and continues to plague chilled water plants causing excess energy usage and artificial capacity reductions. This prevents chilled water plants from meeting cooling demands, even at partial load. Demand Flow and its operational strategy address these issues and provide additional benefits as will be described herein.

In one embodiment, Demand Flow provides a method for efficient operation of a chilled water plant. The method may comprise setting a chilled water Delta T, and controlling chilled water flow rate through the one or more components to maintain the chilled water Delta T across one or more chilled water plant components. The chilled water Delta T includes a chilled water entering temperature and a chilled water leaving temperature at the chilled water plant components. In one or more embodiments, the chilled water Delta T may be maintained by increasing the chilled water flow rate to reduce the chilled water Delta T and decreasing the chilled water flow rate to increase the chilled water Delta T. Typically, the chilled water flow rate will be controlled through one or more chilled water pumps.

A critical zone reset may be performed to adjust the chilled water Delta T when one or more triggering events occur. In general, the critical zone reset provides a new or reset Delta T setpoint to adjust cooling output or capacity as needed. The chilled water Delta T may be reset in various ways. For example, the chilled water Delta T may be reset by adjusting the chilled water entering temperature, adjusting the chilled water leaving temperature, or both. Control of chilled water flow rate across the chilled water plant components to maintain the chilled water Delta T in this manner substantially reduces Low Delta T Syndrome at the chilled water plant. In fact, the reduction may be such that Low Delta T Syndrome is eliminated at the chilled water plant.

A variety of occurrences may be triggering events for a critical zone reset. For instance, the opening of a chilled water valve of an air handler unit beyond a particular threshold may be a triggering event. In addition, an increase or decrease in temperature of the chilled water in a bypass of the chilled water plant, or a change in flow rate of a tertiary pump beyond a particular threshold may be triggering events. The humidity level in a surgery suite/operating room, manufacturing environment, or other space may also be a triggering event.

Condenser water flow rate may also be controlled according to the method. For instance, the method may comprise establishing a condenser water Delta T comprising a low condenser water entering temperature and a condenser water leaving temperature at a condenser. The condenser may use the low condenser water entering temperature to provide refrigerant sub-cooling which is highly beneficial to the refrigeration effect and chiller efficiency. The condenser water Delta T may be maintained by adjusting condenser water flow rate through the condenser, such as through one or more condenser water pumps.

Maintenance of the condenser water Delta T allows the condenser to provide refrigerant sub-cooling without stacking even at the low condenser water entering temperature. The condenser water Delta T may be maintained by controlling the condenser water leaving temperature, wherein the condenser water leaving temperature is controlled by adjusting the condenser water flow rate through the one or more condenser water pumps.

In another embodiment, a method for operating one or more pumps at a chilled water plant is provided. This method may comprise pumping water at a first flow rate through a chiller with a first pump, and adjusting the first flow rate to maintain a first Delta T across the chiller. The first Delta T may comprise a chiller entering temperature and a chiller leaving temperature which provides beneficial refrigerant superheat at an evaporator of the chiller regardless of chilled water plant load conditions.

The method may also comprise pumping the water at a second flow rate through an air handler unit with a second pump, and adjusting the second flow rate to maintain a second Delta T across the air handler unit. The second Delta T may comprise an air handler unit entering temperature and an air handler unit leaving temperature which provides desired cooling output at the air handler unit regardless of the chilled water plant load conditions. In one or more embodiments, the first Delta T and the second Delta T may be similar or the same to balance the first flow rate and the second flow rate and reduce bypass mixing at a bypass of the chilled water plant. Bypass mixing is a common cause of Low Delta T Syndrome and its reduction is thus highly advantageous.

The method may include a critical zone reset to increase cooling output. For example, the second flow rate may be increased by resetting the second Delta T when a water valve of the air handler unit opens beyond a particular threshold. This increase to the second flow rate causes an increase to cooling output at the air handler.

The method may be used at a variety of chilled water plant configurations. To illustrate, the method may comprise pumping the water through a distribution loop of the chilled water plant to the second pump at a third flow rate with a third pump, and adjusting the third flow rate to maintain a third Delta T. Cooling capacity at the air handler of this embodiment may be increased by a critical zone reset. For example, the third flow rate may be increased by resetting the third Delta T when the second flow rate provided by the second pump is beyond a particular threshold. Like the above, increasing the third flow rate increases cooling capacity at the air handler.

The method may control condenser water flow rate. For example, the method may include pumping condenser water at a fourth flow rate through a condenser of the chiller with a fourth pump, and adjusting the fourth flow rate to maintain a fourth Delta T at the condenser. The fourth Delta T may comprise a condenser water entering temperature and a condenser water leaving temperature which provides refrigerant sub-cooling and prevents refrigerant stacking regardless of chilled water plant load conditions. For example, the condenser water entering temperature may be lower than a wet bulb temperature for the condenser water to provide refrigerant sub-cooling.

In one embodiment, a controller for controlling one or more pumps of a chilled water plant is provided. The controller may comprise an input configured to receive sensor information from one or more sensors, a processor configured to control a flow rate provided by the one or more pumps to maintain a Delta T across a component of the chilled water plant, and an output configured to send one or more signals to the one or more pumps. The processor may also generate the one or more signals which control the flow rate provided by the one or more pumps. The Delta T may comprise an entering temperature and a leaving temperature.

The processor may be configured to maintain the Delta T by increasing or decreasing the flow rate based on the sensor information. The processor may also be configured to perform a critical zone reset by lowering the Delta T in response to sensor information indicating additional cooling capacity is desired at the component. The sensor information may be a variety of information. For example, the sensor information may be temperature information. The sensor information may also or alternatively be operating information selected from the group consisting of air handler chilled water valve position, VFD Hz, pump speed, chilled water temperature, condenser water temperature, and chilled water plant bypass temperature.

The processor may be configured to maintain the Delta T by controlling the leaving temperature of the Delta T. The leaving temperature may be controlled by adjusting the flow rate through the component of the chilled water plant. To illustrate, the flow rate may be adjusted by increasing the flow rate to lower the leaving temperature and decreasing the flow rate to raise the leaving temperature. The Delta T maintained by the controller may be similar to a design Delta T for the component. This allows the component to operate efficiently according to its manufacturer specifications.

Demand flow, in other exemplary embodiments, may further be implemented according to demand flow variable pressure curve logic (VPCL). Demand flow VPCL represents an operational strategy that optimizes the total energy consumption of the chiller, chilled water pump, the condenser water pump, cooling tower fan and air handling unit along a calculated efficiency curve. The operational strategy represented by demand flow VPCL individually and holistically optimizes the active pressure curve setpoints for each of the pumps operable within a chilled water plant. In response to the optimization of the active pressure curve setpoints for each of the pumps, the speed and energy usage associated with the cooling tower fan and the air handling unit may also be adjusted and optimized.

In one exemplary embodiment, a demand flow device configured to interface with a chilled water plant controller to optimize performance of one or more chilled water plant components over a range of demand conditions is disclosed. The demand flow device includes a communication device configured to receive sensor data associated with the one or more chilled water plant components, wherein the sensor data measures operational variables of the chilled water plant, a demand flow controller in communication with the communication device. The demand flow controller is configured to utilize the received sensor data to: determine an optimal pressure setpoint as a function of a desired chilled water delta T; control a chilled water flow rate through the one or more chiller water plant components as a function of the optimal pressure setpoint and the desired chilled water delta T; and adjust, via the chilled water plant controller, the optimal pressure setpoint, in response to one or more detected triggering events, to perform a critical zone reset of the desired chilled water delta T.

In another embodiment, a demand flow control system for the implementation of variable pressure control logic in an existing chilled water plant controller to optimize performance of one or more chilled water plant components over a range of demand conditions is disclosed. The demand flow control system includes a demand flow controller in communication with the existing chilled water plant controller. The demand flow controller, in turn, is configured to receive sensor data from one or more chilled water plant components coupled to the existing chilled water plan controller to: determine an optimal pressure setpoint as a function of a desired chilled water delta T and the received sensor data for each of the one or more chilled water plan components, wherein the optimal pressure setpoint is determined iteratively for each of the one or more chilled water plant components; communicate the optimal pressure setpoint to the existing chilled water plant controller; and control, via the existing chilled water plant controller, a chilled water flow rate through each of the one or more chilled water plant components as a function of the optimal pressure setpoint and the desired chilled water delta T.

In another embodiment, a method of demand flow control utilizing variable pressure control logic to optimize the performance of one or more chilled water plant components over a range of demand conditions operable in an existing chilled water plant is disclosed. The method of demand flow includes sensing a chilled water entrance temperature and a chilled water exit temperature at one or more components of the chilled water plant; communicating the sensed chilled water entrance temperature and the sensed chilled water exit temperature to a demand flow controller; calculating an optimal pressure setpoint at the demand flow controller, wherein the optimal pressure setpoint is calculated as a function of a desired chilled water delta T and the sensed chilled water entrance temperature and the sensed chilled water exit temperature to a demand flow controller; communicating the optimal pressure setpoint to an existing chilled water plant controller; and controlling a chilled water flow rate through the one or more components of the chilled water plant.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Additional features and advantages of the disclosed embodiments are described in, and will be apparent from, the following Detailed Description and the figures.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 7 is a chart illustrating the benefits of a low condenser water entering temperature at an exemplary condenser;

FIG. 8 is an exemplary pressure enthalpy graph illustrating the benefits of Demand Flow at an exemplary chiller;

FIG. 17 is a chart illustrating the benefits of Demand Flow at an exemplary chilled water plant;

FIG. 18 is a chart illustrating the linear relationship between condenser water entering and leaving temperatures at an exemplary condenser;

FIG. 21 is a chart illustrating the effect on energy and capacity under Demand Flow at an exemplary chilled water plant;

FIG. 23A is a chart illustrating the relationship between chilled water flow and Delta T in an exemplary chilled water plant at low Delta T;

FIG. 23B is a chart illustrating the flexibility of Demand Flow with an exemplary constant cooling capacity;

FIG. 23C is a chart illustrating the flexibility of Demand Flow with an exemplary constant flow rate;

FIG. 24 is a chart illustrating air side energy shifts under Demand Flow at an exemplary chilled water plant;

DETAILED DESCRIPTION

Figure 1:
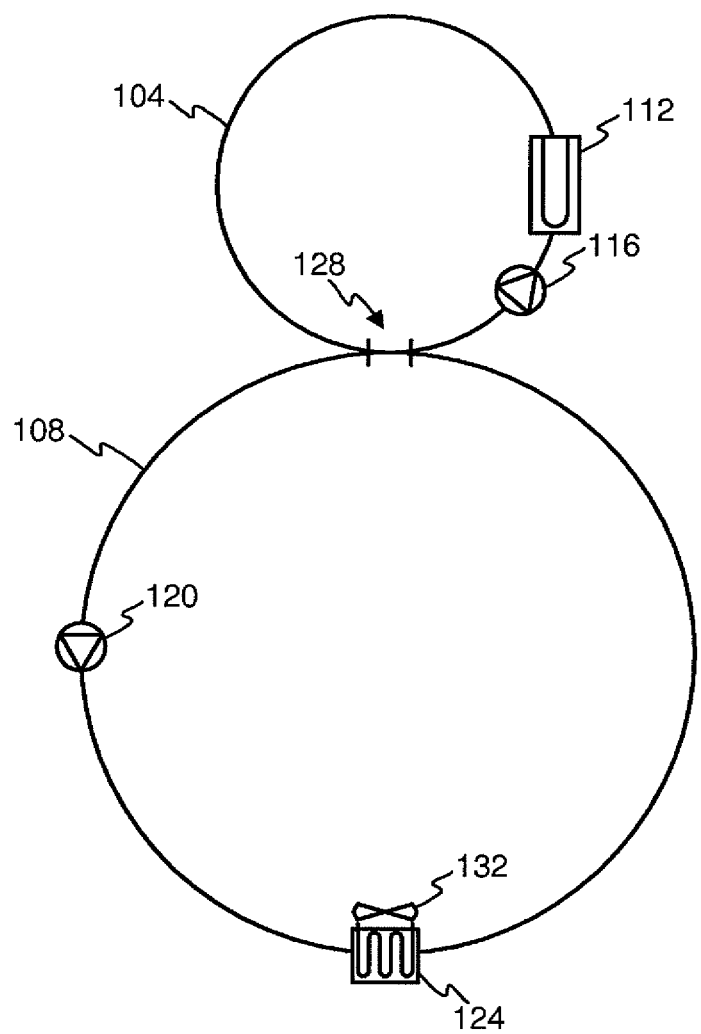
FIG. 1 is a block diagram illustrating an exemplary decoupled chilled water plant.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Demand Flow, as described herein, refers to methods and apparatus to reduce or eliminate Low Delta T Syndrome and to improve chilled water plant efficiency. Demand Flow may be implemented in retrofit projects for existing chilled water plants as well as new installations or designs of chilled water plants. As used herein, chilled water plant refers to cooling systems utilizing chilled water to provide comfort cooling or chilled water for some process need. Such chilled water plants are typically, but not always, used to cool campuses, industrial complexes, commercial buildings, and the like.

In general and as will be described further below, Demand Flow utilizes variable flow or pumping of chilled water within a chilled water plant to address Low Delta T Syndrome and to substantially increase the efficiency of a chilled water plant. Variable flow under Demand Flow maintains a Delta T for chilled water plant components which is at or near the design Delta T for the components. As a result, Demand Flow substantially increases the operating efficiency of chilled water plants and components thereof resulting in substantial savings in energy costs. The increased efficiency provided by Demand Flow also provides the benefit of reduced pollution. Furthermore, Demand Flow also increases the life expectancy of chilled water plant components by operating these components near or at their specified entering and leaving chilled water temperatures, or design Delta T, unlike traditional variable or other pumping techniques.

Demand Flow provides increased efficiency regardless of cooling demand or load by operating chilled water plant components in a synchronous fashion. In one or more embodiments, this occurs by controlling chilled water and condenser water pumping at one or more pumps to maintain a Delta T at particular components or points of a chilled water plant. In general, Demand Flow operates on individual condenser or water pumps to maintain a Delta T across a particular component or point of a chilled water plant. For example, primary chilled water pumps may be operated to maintain a Delta T across a chiller, secondary chilled water pumps may be operated to maintain a Delta T across plant air handlers, and condenser water pumps may be operated to maintain a Delta T across a condenser.

The control of individual pumps (and flow rate) in this manner results in synchronized operation of a chilled water plant, as will be described further below. This synchronized operation balances flow rates in the chilled water plant, which significantly reduces or eliminates Low Delta T Syndrome and related inefficiencies.

In traditional chilled water plants variable flow is controlled according to a minimum pressure differential, or Delta P, at some location(s) in the chilled water plant or system. Demand Flow is distinct from these techniques in its focus on Delta T, rather than Delta P. With Demand Flow, an optimal Delta T can be maintained at all chilled water plant components regardless of load conditions (i.e. demand for cooling). The maintenance of a constant or steady Delta T allows for wide variances in chilled water flow, resulting in energy savings not only in pumping energy but also in chiller energy consumption. For example, the Delta T of a chiller may be maintained, via control of flow rate through chilled water or condenser water pumps, near or at the chiller's design parameters regardless of load conditions to maximize the efficiency of the evaporator and condenser heat exchanger tube bundles of the chiller.

In contrast, traditional variable flow schemes vary the flow within much narrower ranges, and thus are incapable of achieving the cost and energy savings of Demand Flow. This is because traditional flow control schemes control flow rate to produce a particular pressure difference, or Delta P, rather than Delta T. In addition, traditional variable flow schemes seek only to maintain Delta P only at some predetermined system location, ignoring low Delta T. This results in flow rates which are much higher than required to generate and distribute the desired amount of cooling output, in large part, to compensate for inefficiencies caused by low Delta T.

Because flow rates are controlled by Demand Flow to maintain a Delta T and not to maintain Delta P or a particular cooling output at plant air handlers, there may be situations where the flow rate is too low to produce the desired amount of cooling output in certain areas based on system diversity. To address this, Demand Flow includes a feature referred to herein as a critical zone reset which allows the Delta T maintained by Demand Flow to be reset to another, typically lower, value based on a specific need of the system that is not being fully met at the required flow rate of the system. This can be due to inadequate piping, incorrectly sized air handlers for the load being served, or any number of unforeseen system anomalies. As will be described further below, this allows additional cooling to be provided by maintaining a new or reset Delta T generally by increasing chilled water flow. The application of Demand Flow has a synergistic effect on air handlers as well as chillers, pumps, and other components of a chilled water plant. This results in reduced net energy usage while maintaining or even increasing the rated capacity for the chilled water plant. As will be described further below, under Demand Flow, little or no excess energy is used to provide a given level of cooling.

Preferably, the Delta T maintained by Demand Flow will be near or at a chilled water plant component's design Delta T to maximize the component's efficiency. Advantages of maintaining Delta T may be seen through a cooling capacity equation, such as $$\text{Tons} = \left( \frac{GPM * \Delta T}{K} \right).$$

where Tons is cooling capacity, GPM is flow rate, and K is some constant. As this equation shows, as Delta T is lowered, so is cooling capacity.

It is noted that though described herein with reference to a particular capacity equation, it will be understood that Demand Flow's operation and benefits can also be shown with a variety of capacity equations. This is generally because the relationships between cooling capacity, flow rate, and constant Delta T are linear.

Advantages of maintaining Delta T can be seen from the following example. For a constant value of 24 for K, 1000 Tons of capacity may be generated by providing a 1500 GPM flow rate at a 16 degree design Delta T. 500 Tons of capacity may be generated by providing 750 GPM at 16 degrees Delta T. However, at a low Delta T such as commonly found in traditional systems, a higher flow rate would be required. For example, at an 8 degree Delta T, 500 tons of capacity would require a 1500 GPM flow rate. If Delta T is lowered further, such as to 4 degrees, cooling capacity would be 250 Tons at 1500 GPM. Where chilled water plant pumps, or other components, may only be capable of a maximum 1500 GPM flow rate, the chilled water plant would not be able to meet the desired demand of 500 Tons, even though, at design Delta T, the chilled water plant is capable of 1000 Tons capacity at 1500 GPM.

I. Low Delta T Syndrome

Low Delta T Syndrome will now be described with regard to FIG. 1 which illustrates an exemplary decoupled chilled water plant. As shown, the chilled water plant comprises a primary loop 104 and a secondary loop 108. Each loop 104, 108 may have its own entering and leaving water temperature, or Delta T. It is noted that Demand Flow also benefits direct/primary chilled water plants (i.e. non-decoupled chilled water plants) as well, as will be described further below.

During operation of a decoupled chilled water plant, chilled water is produced in a production or primary loop 104 by one or more chillers 112. This chilled water may be circulated in the primary loop 104 by one or more primary chilled water pumps 116. Chilled water from the primary loop 104 may then be distributed to a building (or other structure) by a distribution or secondary loop 108 in fluid communication with the primary loop 104. Within the secondary loop 108, chilled water may be circulated by one or more secondary chilled water pumps 120 to one or more air handlers 124. The air handlers 124 allow heat from the building's air to be transferred to the chilled water, such as through one or more heat exchangers. This provides cooled air to the building. Typically, building air is forced or blown through a heat exchanger if an air handler 124 is to better cool a volume of air. The chilled water leaves the air handlers 124 returning to the secondary loop 108 at a higher temperature due to the heat the chilled water has absorbed via the air handlers.

The chilled water then leaves the secondary loop 108 and returns to the primary loop 104 at the higher temperature. As can be seen, both the primary loop 104 and secondary loop 108 (as well as the chilled water plant components attached to these loops) have an entering water temperature and a leaving water temperature, or Delta T. In an ideal situation, the entering and leaving temperatures for both loops would be at their respective design Delta Ts. Unfortunately, in practice, the chilled water loops operate at chronic low Delta T.

Low Delta T occurs for a variety of reasons. In some cases, low Delta T occurs because of an imperfect design of the chilled water plant. This is relatively common due to the complexity of chilled water plants and difficulty in achieving a perfect design. To illustrate, air handlers 124 of the secondary loop 108 may not have been properly selected and thus chilled water does not absorb as much heat as expected. In this case, the chilled water from the secondary loop 108 enters the primary loop 104 at a cooler temperature than expected resulting in low Delta T. It is noted that, due to imperfect design and/or operation, a chilled water plant may be operating at low Delta T under various loads, including design condition loads.

Low Delta T also occurs as cooling output is lowered to meet a load that is less than the design condition. As output is lowered, chilled water flow, chilled water Delta T, and other factors become unpredictable often resulting in low Delta T. In fact, in practice, it has been seen that traditional Delta P flow control schemes invariably result in low Delta T at some, if not all, chilled water plant components.

For example, to reduce cooling output from design conditions, one or more chilled water valves of the chilled water plant's air handlers 124 may be closed (partially or completely). This reduces chilled water flow through the air handlers 124 and thus less cool air is provided. However, now that the chilled water valves are partially closed, the chilled water absorbs less heat from the air as it flows through the air handlers 124 at a higher rate than necessary as evidenced by the lower than design Delta T. Thus, the chilled water leaving the air handlers 124 is not as "warm" as it once was. As a result, the chilled water leaving the secondary loop 108 for the primary loop 104 is cooler than desired causing low Delta T in both loops.

Figure 2:
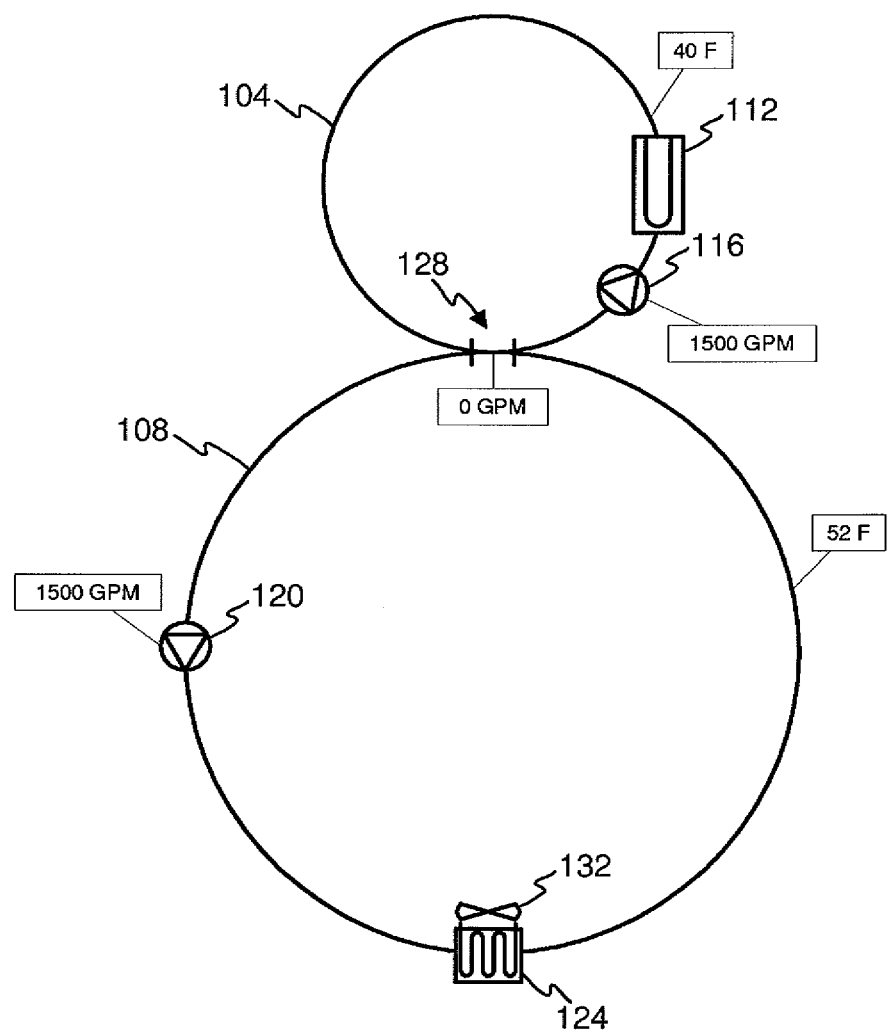
FIG. 2 is a block diagram illustrating low Delta T Syndrome at an exemplary chilled water plant.

To illustrate with a specific example, an exemplary chilled water plant is provided in FIG. 2. In the example, the chilled water produced in the primary loop 104 is 40 degrees. As can be seen, chilled water leaving the air handlers 124 may be at 52 degrees instead of an expected 56 degrees because the chilled water valves have been closed and the flow rate of the chilled water is too high for the present load. Because there is no excess distribution flow in the bypass 128, the leaving chilled water temperature of the secondary loop is still 40 degrees. Assuming the system has a 16 degree design Delta T, there is now a low Delta T of 12 degrees which is 4 degrees lower than the design Delta T. It is noted here that the low Delta T itself reduces capacity and causes excess energy to be used to provide a given cooling output. As can be seen by the capacity equation, $$\text{Tons} = \left(\frac{GPM * \Delta T}{K}\right),$$

Tons capacity is significantly reduced by the low Delta T. To compensate, a higher flow rate or GPM would be required leading to excess use of pumping energy for the given cooling demand.

Referring back to FIG. 1, another cause of low Delta T is bypass mixing caused by excess flow within the primary loop 104, the secondary loop 108, or both. Bypass mixing and excess flow are known causes of low Delta T and have traditionally been extremely difficult to address, especially with Delta P flow control schemes. In fact, one common cause of excess flow is over pumping of chilled water by inefficient Delta P control schemes (as shown by the above example). For this reason, flow imbalances and bypass mixing are commonplace in chilled water plants utilizing Delta P flow control schemes. It is noted that bypass mixing can even occur at design condition because, as with any complex machinery, chilled water plants are rarely perfect. In fact, chilled water plants often are designed with primary chilled water pump flow rates which do not match secondary pump flow rates.

In decoupled chilled water plants, a decoupler or bypass 128 connecting the primary loop 104 and secondary loop 108 is provided to handle flow imbalances between the loops. This typically occurs as a result of excess flow or excess pumping in one of the loops. The bypass 128 accepts the excess flow from one loop generally by allowing it to circulate to the other loop. It is noted that excess flow is not limited to any particular loop and that there may be excess flow in all loops in addition to a flow imbalance between them.

Figure 3:
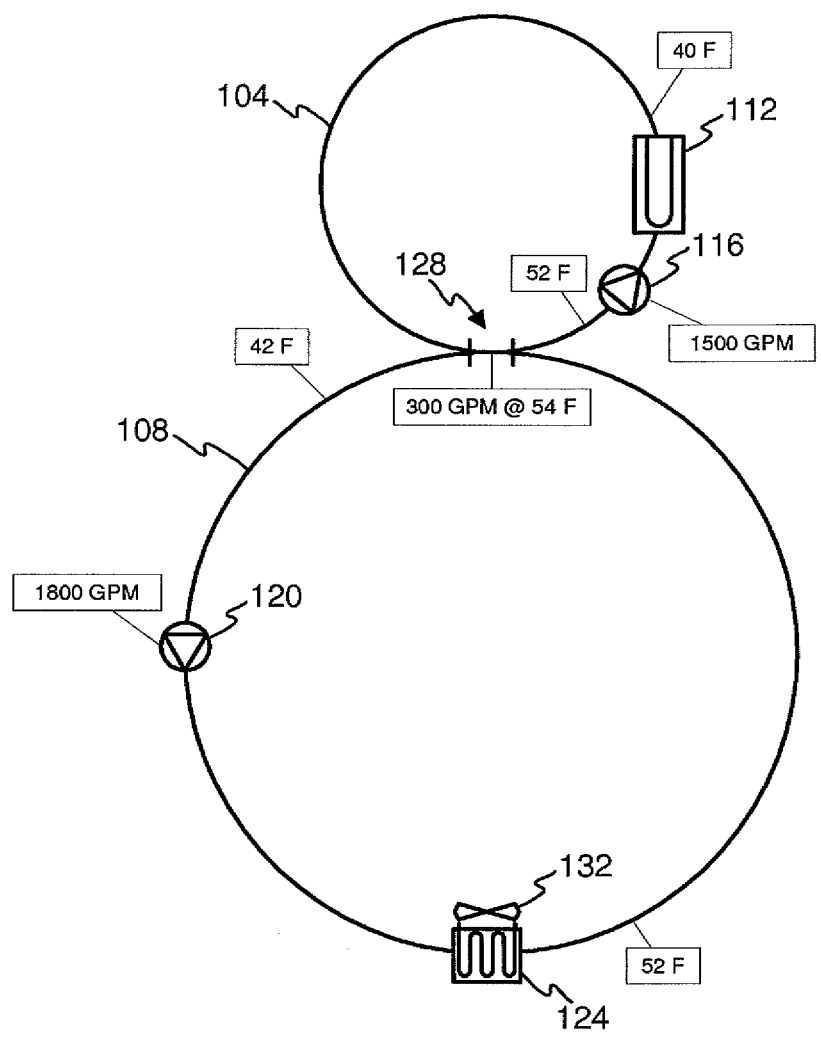
FIG. 3 is a block diagram illustrating excess flow at an exemplary chilled water plant.

Excess flow generally indicates too much energy is being expended on pumping chilled water, as will be described later via the Affinity Laws, and also exacerbates the problems of low Delta T. To illustrate using FIG. 3, which illustrates an exemplary chilled water plant having excess flow, chilled water from the air handlers 124 and secondary loop 108 mixes with supply water from the primary loop 104 in the bypass 128 when there is excess primary or distribution chilled water flow. The resultant mix of these two water streams yield warmer than design chilled water which is then distributed to the air handlers 124.

To illustrate, 300 gallons per minute (GPM) excess flow of 54 degree water from the secondary loop 108 would mix with 40 degree chilled water from the primary loop 104 in the bypass 128 raising the temperature of the secondary loop's chilled water to 42 degrees. Now, the secondary loop's chilled water has a temperature higher than the primary loop's chilled water. This causes low Delta T in the primary loop 104 and the secondary loop 108 and a corresponding reduction in cooling capacity.

Bypass mixing of chilled water streams is also undesirable because it exacerbates low Delta T. To illustrate, when the air handlers 124 sense the elevated water temperature caused by bypass mixing or are unable to meet cooling demand due to the elevated water temperature, their chilled water valves open to allow additional flow of water through the air handlers 124 to increase air cooling capacity. In traditional Delta P systems, secondary chilled water pumps 120 would also increase chilled water flow rate to increase air cooling capacity at the air handlers 124. This increase in flow rate causes further imbalances in flow rate (i.e. further excess flow) at the bypass 128 between the primary loop 104 and secondary loop 108. The increased excess flow exacerbates low Delta T by causing additional bypass mixing which lowers Delta T even further.

Excess flow and bypass mixing also cause excess energy usage for a given cooling demand. In some situations, additional pumping energy is used to increase flow rate in the primary loop 104 to better balance the flow from the secondary loop 108 and prevent bypass mixing. In addition or alternatively, an additional chiller 112 may need to be brought online or additional chiller energy may be used to generate enough chilled water in the primary loop 104 to compensate for the warming effect of bypass mixing on the chilled water supply. On the air supply side, the air handlers 124 may attempt to compensate for the reduced capacity caused by elevated water temperatures by moving larger volumes of air. This is typically accomplished by increasing power to one or more fans 132 to move additional air through the air handlers 124, as will be described further via the Affinity Laws.

In many cases, these measures (e.g. increased chilled water pumping, opening of air handler water valves, increased air supply air movement) do not fully compensate for the artificial reduction in cooling capacity caused by low Delta T. Thus, the chilled water plant is simply unable to meet the demand for cooling even though this level of demand may be below its rated chilling capacity. In situations where such measures are able to compensate for the artificial reduction in capacity, such as by starting additional chillers, the chilled water plant is utilizing substantially more energy than necessary to provide the desired cooling output with much of the excess energy being expended on compensating for the effects of low Delta T.

Figure 4:
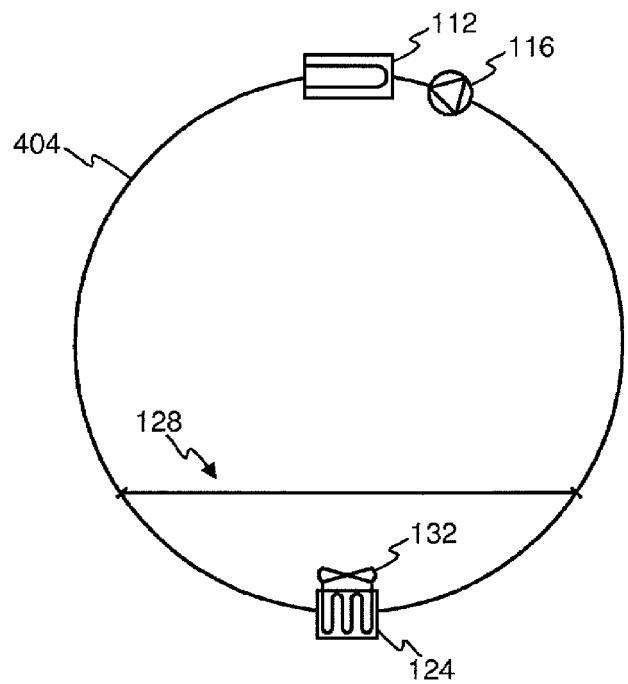
FIG. 4 is a block diagram illustrating an exemplary direct-primary chilled water plant.

It will be understood that low Delta T also occurs in direct-primary chilled water plant configurations (i.e. non-decoupled chilled water plants), even though such configurations generally do not have the problem of mixing building return water with production supply water. Direct-primary systems invariably have a plant or system bypass, 3-way valves, or both in order to maintain minimum flow through the system. For example, FIG. 4 illustrates an exemplary direct-primary chilled water plant having such a bypass. Similar to a decoupled chilled water plant, excess flow can occur in these bypasses or 3-way valves. Thus, the problems of low Delta T, such as excess chiller energy, excess pumping energy, and reduced system capacity are also present in direct-primary configurations. In fact, the problems of low Delta T are the same regardless of the plant configuration. This has been shown in practice by the fact that Low Delta T Syndrome occurs in both types of chilled water plants.

Figure 5:
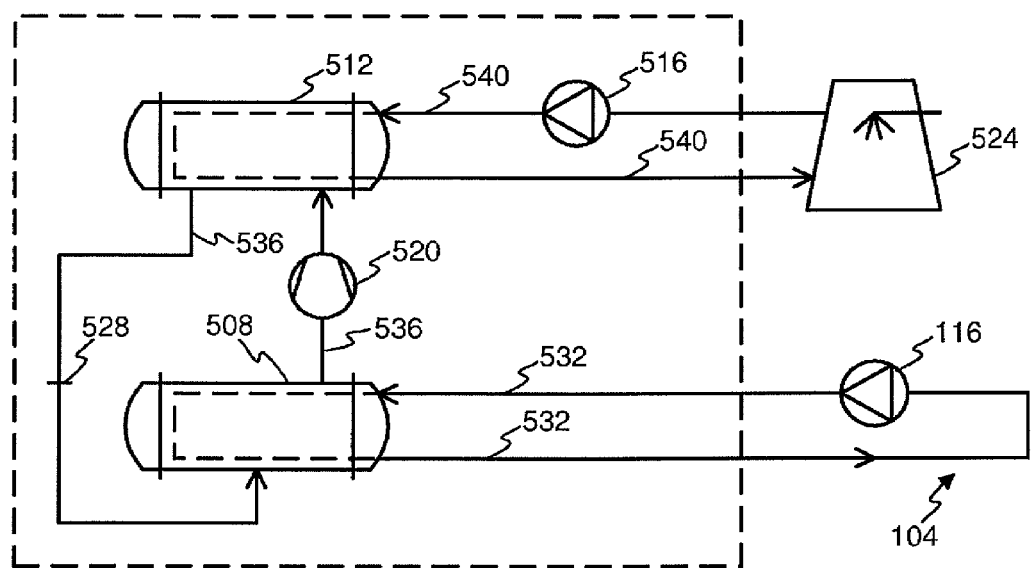
FIG. 5 is a block diagram illustrating components of an exemplary chiller.

The effect of low Delta T with regard to chillers will now be further described. FIG. 5 illustrates an exemplary chiller 112. For illustrative purposes, the dashed line of FIG. 5 delineates which components are part of the exemplary chiller 112 and which are not, with components within the dashed line being part of the chiller. Of course, it will be understood that a chiller may include additional components or fewer components than shown.

As can be seen, the chiller 112 comprises a condenser 508, a compressor 520 and an evaporator 512 connected by one or more refrigerant lines 536. The evaporator 512 may be connected to a primary or other loop of a chilled water plant by one or more chilled water lines 532.

In operation, chilled water may enter the evaporator 512 where it transfers heat to a refrigerant. This evaporates the refrigerant causing the refrigerant to become refrigerant vapor. The heat transfer from the chilled water cools the water allowing the water to return to the primary loop through the chilled water lines 532. To illustrate, 54 degree chilled water may be cooled to 42 degrees by transferring heat to 40 degree refrigerant within an evaporator 512. The 42 degree chilled water may then be used to cool a building or other structures, as described above.

In order for the refrigeration cycle to continue, refrigerant vapor produced by the evaporator 512 is condensed back into liquid form. This condensation of refrigerant vapor may be performed by the condenser 508. As is known, the refrigerant vapor can only condense on a lower temperature surface. Because refrigerant has a relatively low boiling point, refrigerant vapor has a relatively low temperature. For this reason, a compressor 520 may be used to compress the refrigerant vapor, raising the vapor's temperature and pressure.

The increased temperature of the refrigerant vapor allows the vapor to condense at a higher temperature. For example, without compression the refrigerant vapor may be at 60 degrees, whereas with compression the vapor may be at 97 degrees. Thus, condensation may occur below 97 degrees rather than below 60 degrees. This is highly beneficial because it is generally easier to provide a condensing surface having a temperature lower than the increased temperature of the refrigerant vapor.

The refrigerant vapor enters the condenser 508 where its heat may be transferred to a condensing medium, causing the refrigerant to return to a liquid state. For example, the condenser 508 may comprise a shell and tube design where the condensing medium flows through the condenser's tubes. In this manner, refrigerant vapor may condense on the tubes within the condenser's shell. As discussed herein the condensing medium is condenser water, though it will be understood that other fluids or mediums may be used. After condensing, the refrigerant then returns through a refrigerant line 536 and pressure reducer 528 back to the evaporator 512 where the refrigeration cycle continues.

The condenser 508 may be connected to a cooling tower 524 or other cooling device by one or more condenser water lines 540. Because the condenser water absorbs heat from the refrigerant vapor, the condenser water must be cooled to keep its temperature low enough to condense the refrigerant vapor. The condenser water may be circulated between the condenser 508 and cooling tower 524 by one or more condenser water pumps 516. This provides a supply of cooled condenser water which allows continuous condensation of refrigerant vapor. It is noted that though a cooling tower 524 is used to cool the water in the embodiment of FIG. 4, other supplies of condenser water may be used.

Figure 6A:
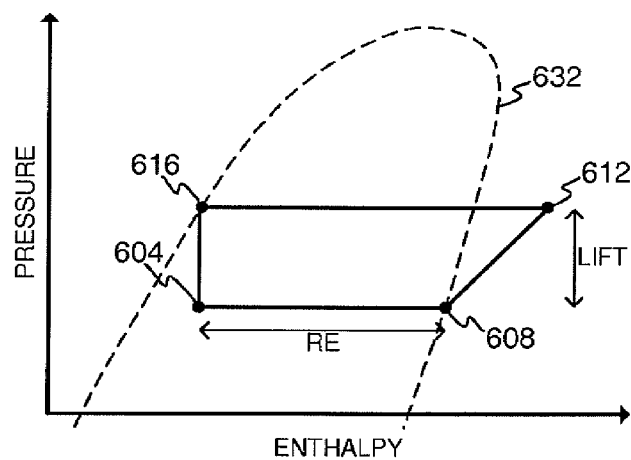
FIG. 6A is a exemplary pressure enthalpy graph illustrating the refrigeration cycle.

Operation of a chiller may also be shown through a pressure-enthalpy graph such as shown in FIG. 6A. In the graph, pressure is represented on the vertical axis while enthalpy is on the horizontal axis. At point 604, the refrigerant may be in a heavily saturated or principally liquid state in an evaporator. As the refrigerant absorbs heat from chilled water in the evaporator, its enthalpy increases turning the refrigerant into refrigerant vapor at point 608. The portion of the graph between point 604 and point 608 represents the refrigeration effect of the chiller. During this time, the absorption of heat from the chilled water by the refrigerant cools the chilled water.

A compressor may then be used to increase the temperature and pressure of the refrigerant vapor from point 608 to point 612. This is known as "lift." This lift allows the refrigerant vapor to condense in the condenser, such as described above. Between point 612 and point 616, the refrigerant vapor transfers heat to condenser water and condenses in the condenser, turning the vapor into liquid once again. The refrigerant then passes through a pressure reducer between point 616 and point 604, which reduces both the temperature and pressure of the liquid refrigerant such that it may be used in the evaporator and continue the refrigeration cycle.

As will be described further below, problems associated with low Delta T in the condenser often result in chiller failure due to lack of minimum lift at partial load conditions. When the pressure differential between the condenser and evaporator drops too low a condition known to the industry as "stacking" occurs. This is a condition where the refrigerant builds up in the condenser, dropping evaporator saturated pressure and temperature to critical points. Refrigerant also has a high affinity for oil and stacking will therefore trap a good portion of the oil charge in the condenser causing the chiller to shut down on any number of low pressure, low evaporator temperature, or low oil pressure problems.

Because most traditional condenser water pumping systems operate at constant volume cooling towers are at full flow conditions as well. As the load on the cooling tower decreases the operating range remains relatively constant, reducing the efficiency of the tower. Conversely in variable flow condenser water systems the operating range decreases with the flow. This allows for lower condenser water entering temperatures and the associated reduction in chiller energy and cooling tower fan energy described further below in this narrative.

Low Delta T also results in very inefficient condenser water pump efficiency (KW/Ton) and limits the amount of refrigerant sub-cooling available to the chiller through seasonably low condenser water entering temperatures. At a given load, for every degree condenser water entering temperature is reduced, compressor energy is reduced by about 1.5% and nominal tonnage of the chiller is increased by about 1%. Thus, as will be described further below, operating the chillers at the lowest possible condenser water entering temperature is highly desirable.

In addition, low Delta T at the evaporator reduces the refrigeration effect of the refrigeration cycle. As will be described further below, this reduces the temperature of refrigerant vapor produced by the evaporator.

II. Demand Flow

In general, Demand Flow comprises systems and methods for addressing Low Delta T Syndrome while increasing chilled water plant and system efficiency. As demonstrated above, traditional chilled water system control schemes lead directly to energy and capacity inefficiencies evidenced by Low Delta T Syndrome, high KW/Ton, and reduced air side capacity. The above description, also demonstrates that there is a direct conflict between most traditional control schemes and optimizing system energy and deliverable capacity. This is most clearly evidenced by pressure differential, or Delta P, chilled water pumping control schemes, which ignore increased energy usage and reduced system capacities. Traditionally designed Delta P based pumping schemes inevitably yield a system that performs with Low Delta T Syndrome as the system load varies.

In a perfect world, the chilled water Delta T would be the same in the primary, secondary, and any tertiary or other loops of a chilled water plant. Operating chilled water plant components at their selected or design Delta T always produces the most deliverable capacity and highest system efficiencies. Thus, in a perfect world, chilled water Delta T would match design Delta T. To generate this ideal situation, chilled water plant component selection, design, installation and pumping control algorithms must be perfect. Unfortunately, this perfection is extraordinarily rare or never achieved in practice, and disparities in design, load, and installation of chilled water plants are ever-present.

Unlike traditional control schemes, a core principle of Demand Flow is to operate as close to design Delta T as possible with emphasis given to meeting cooling demand, as will be described below with regard to critical zone resets. This allows a chilled water plant to operate at a high efficiency, regardless of cooling load. This is in contrast to traditional control schemes, where operating at partial or even design loads utilizes substantially more energy than necessary because of Low Delta T Syndrome which plagues these traditional systems.

In addition, because pumps are controlled to maintain a Delta T as close to or at design Delta T, the chilled water plant utilizes energy efficiently regardless of the load on the plant. When compared to traditional control schemes, energy usage is substantially lower under Demand Flow as can be seen from the following chart. Values indicated on the chart have been taken from actual measurements of an operational Demand Flow implementation.

To illustrate, FIG. 7 is a chart of an actual Demand Flow application that shows the energy reductions achievable by reducing the condenser water entering temperature. FIG. 8 is a pressure-enthalpy diagram comparing constant volume condenser water pumping 804 and Delta P chilled water pumping schemes to Demand Flow pumping 808. As can be seen, lift is reduced while the refrigeration effect is increased by sub-cooling 812 and refrigerant superheat 816 as compared to traditional constant volume pumping 804.

Demand Flow has a measurable, sustainable, and reproducible effect on chilled water plants because it is grounded in sound scientific fundamental principals that, as such, are both measurable and predictable. The gains in efficiency and deliverable capacity resulting from applying Demand Flow will be described as follows.

Figure 9A:
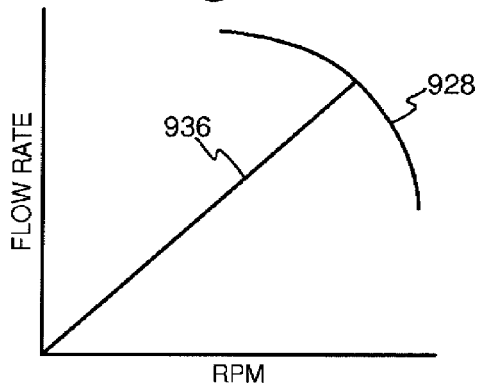
FIG. 9A is a graph illustrating the relationship between flow rate and shaft speed.

A fundamental premise of pumping energy efficiency with variable flow chilled water plants known as the Affinity Laws consist of the following laws:

Law 1: Flow is proportional to shaft rotational speed, as shown by the equation $$\frac{Q_1}{Q_2} = \frac{N_1}{N_2}$$

where N is shaft rotational speed and Q is the volumetric flow rate (e.g. CFM, GPM, or L/s. This is illustrated by flow line 936 shown in the graph of FIG. 9A.

Figure 9B:
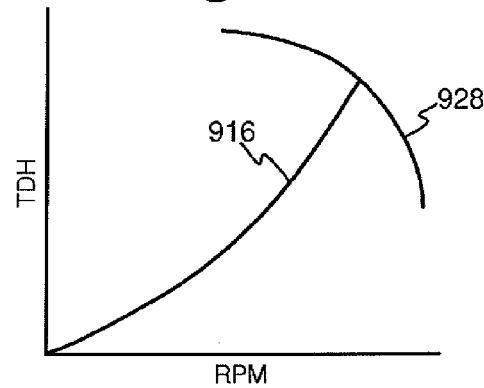
FIG. 9B is a graph illustrating the relationship between total design head and shaft speed.

Law 2: Pressure or head is proportional to the square of shaft speed, as shown by the equation $$\frac{H_1}{H_2} = \left(\frac{N_1}{N_2}\right)^2$$

where H is the pressure or head developed by the pump or fan (e.g. ft or m). This is illustrated by the pumping curve 916 shown in the graph of FIG. 9B.

Figure 9C:
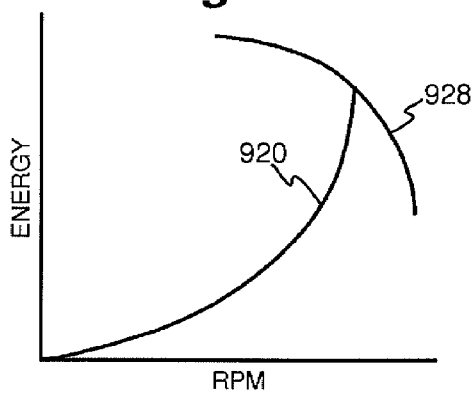
FIG. 9C is a graph illustrating the relationship between energy usage and shaft speed.

Law 3: Power is proportional to the cube of shaft speed, as shown by the equation $$\frac{P_1}{P_2} = \left(\frac{N_1}{N_2}\right)^2$$

where P is shaft power (e.g. W). This is illustrated by the energy curve 920 shown in graph of FIG. 9C.

The Affinity Laws state that chilled water pressure drop (also referred to as TDH or as H in the above) is related to change of flow rate squared, while energy utilization is related to change of flow rate cubed. Therefore, in Demand Flow, as flow rate is reduced, cooling capacity or output is reduced proportionally but the energy utilization is reduced exponentially.

Figure 9D:
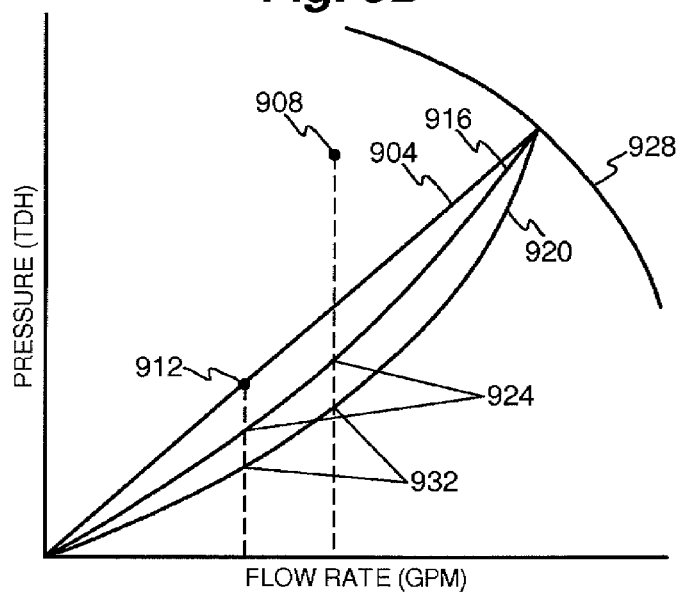
FIG. 9D is a graph illustrating an exemplary Delta T line with a pumping curve an energy curve.

FIG. 9D is a graph illustrating an exemplary constant Delta T line 904. The line 904 is referred to as a constant Delta T line because all points on the line have been generated with the same Delta T. In the graph, the horizontal axis represents flow rate while the vertical axis represents pressure. Thus, as shown, the Delta T line 904 shows, for a constant Delta T, the flow rate necessary to produce a particular cooling output. In one or more embodiments, the Delta T line 904 may be defined by a capacity equation, such as, $$\text{Tons} = \left(\frac{GPM * \Delta T}{K}\right),$$

which provides that an increase or decrease to flow rate (GPM) causes a proportional increase or decrease in cooling output (Tons). It is noted that though a particular Delta T line 904 is shown in FIG. 9D, it will be understood that the Delta T line 940 may be different for various chilled water plants or chilled water plant components.

In general, Demand Flow seeks to keep flow rate for a given cooling output on the Delta T line 904. This results in substantial efficiency gains (i.e. energy savings) while meeting demand for cooling. In contrast, the flow rate determined by traditional control schemes is higher, often substantially, than that provided by the Delta T line 904. This has been shown in practice and is often recorded in the operational logs of traditional chilled water plants. FIG. 9D illustrates an exemplary logged point 908 showing the flow rate as determined by traditional control schemes, and a Demand Flow point 912. The Demand Flow point 912 represents the flow rate for a given cooling output under Demand Flow principles.

Typically, the logged point 908 as determined by traditional control schemes will have a higher flow rate than what is required by the chilled water plant to meet actual cooling demands. For example, in FIG. 9D, the logged point 908 has a higher flow rate than the Demand Flow point 912. This is, at least partially, because traditional control schemes must compensate for inefficiencies caused by low Delta T with higher flow rates and increased cooling output.

With Demand Flow, flow rate is adjusted along the Delta T line 904, linear to load, which means that the chilled water plant, and components thereof, operate at or near design Delta T. In this manner, low Delta T is eliminated or significantly reduced by Demand Flow. Thus, the desired demand for cooling may be met at a lower flow rate and cooling output as compared to traditional control schemes. This is due in large part because the chilled water plant does not have to compensate for the inefficiencies of low Delta T.

FIG. 9D overlays the above-mentioned pumping curve 916 and energy curve 920 to illustrate the efficiency gains provided by Demand Flow. As shown, the pumping curve 916 represents total design head (TDH) or pressure drop on its vertical axis and capacity or shaft speed on its horizontal axis. The Affinity Laws dictate that shaft speed is linearly proportional to flow rate. Thus, the pumping curve 916 may be overlaid as in FIG. 9D to illustrate efficiency gains provided by Demand Flow. The Affinity Laws also dictate that the pumping curve 916 is a square function. It can thus be seen from the graphs that, as flow rate is reduced linearly along the Delta T line 204, TDH is reduced exponentially.

The energy curve 920 as shown represents energy usage on its vertical axis and shaft speed (which as stated has been shown to be linearly proportional to flow rate) on its horizontal axis. Under the Affinity Laws, the energy curve 920 is a cube function. Thus, it can be seen that as flow rate is reduced, energy usage is reduced exponentially, even more so than TDH. Stated another way, energy usage increases exponentially according to a cube function as flow rate increases. For this reason, it is highly desirable to operate system pumps such that the minimum flow rate necessary to achieve a particular cooling output is provided.

It can be seen that a substantial amount of energy savings occurs when operating a chilled water plant with Demand Flow. FIG. 9D highlights the differences in energy usage between the Demand Flow point 912, and the logged point 908. As can be seen by the energy curve 920, at the cooling output indicated by these points, excess energy usage 932 between the logged point 908 and the Demand Flow point 912 is substantial. Again, this is because of the exponential increase to energy usage as flow rate increases.

FIG. 9D also highlights the differences in TDH between the Demand Flow point 912 and the logged point 908. As can be seen, the logged point 908 once again has a substantially higher TDH than is necessary to meet current cooling demand. In contrast, at the Demand Flow point 912, TDH is much lower. As can be seen by the pumping curve 916, excess TDH 924 between the logged point 908 and the Demand Flow point 912 is substantial. Thus, substantially less work is expended by chilled water plant pumps under Demand Flow as compared to traditional control schemes. This is beneficial in that less strain is placed on the pumps extending their service life.

III. Demand Flow Operational Strategy

To aid in the description of Demand Flow, the term operational strategy will be used herein to refer to the principles, operations, and algorithms applied to chilled water plants and components thereof to achieve Demand Flow's benefits to plant energy usage and cooling capacity. The operational strategy beneficially influences aspects common to most if not all chilled water plants. As will be described below, these aspects include chilled water production (e.g. chillers), chilled water pumping, condenser water pumping, cooling tower fan operation, and air side fan operation. Application of the operational strategy significantly reduces or eliminates Low Delta T Syndrome by operating chilled water plant components at or near design Delta T, regardless of load conditions. This in turn optimizes energy usage and deliverable capacity for chilled water plant components and the plant as a whole.

Figure 10:
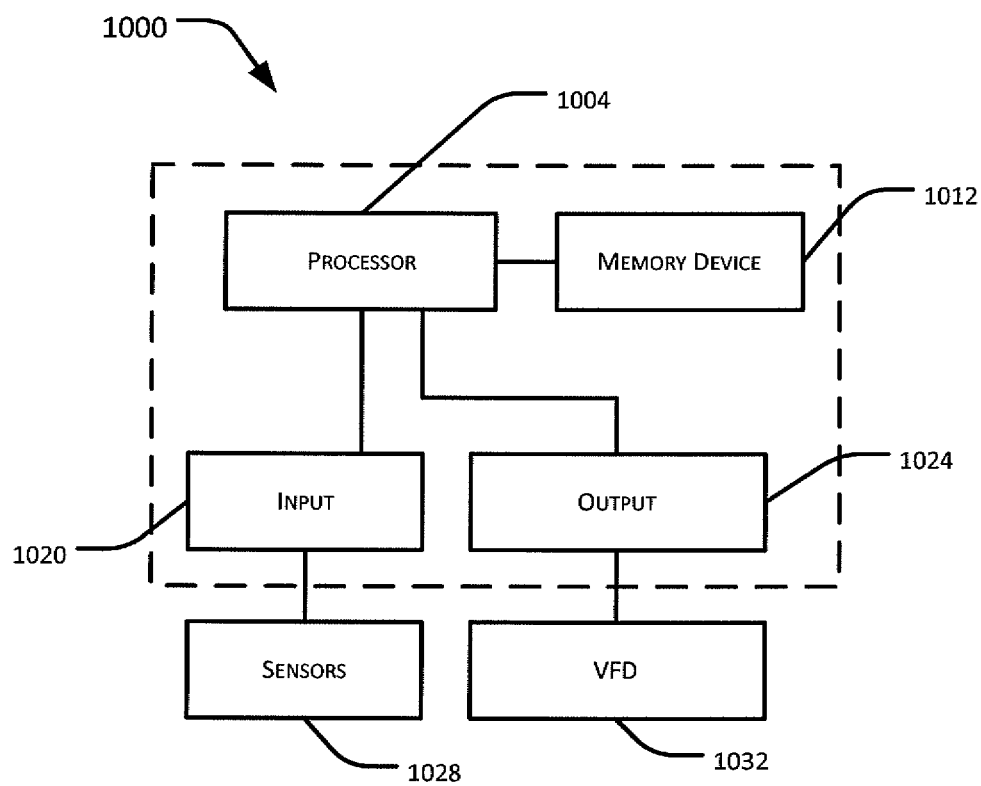
FIG. 10 is a block diagram illustrating an exemplary controller.

In one or more embodiments, the operational strategy may be embodied and/or implemented by one or more control devices or components of a chilled water plant. FIG. 10 illustrates an exemplary controller which may be used to implement the operational strategy. In one or more embodiments, the controller may accept input data or information, perform one or more operations on the input according to the operational strategy, and provide a corresponding output.

The controller 1000 may comprise a processor 1004, one or more inputs 1020, and one or more outputs 1024. The input 1020 may be used to receive data or information from one or more sensors 1028. For example, information about chilled water, condenser water, refrigerant, or operating characteristics of chilled water plant components detected by one or more sensors 1028 may be received via an input 1020.

The processor 1004 may then perform one or more operations on the information received via the one or more inputs 1020. In one or more embodiments, the processor may execute one or more instructions stored on a memory device 1012 to perform these operations. The instructions may also be hard wired into the processor 1004 such as in the case of an ASIC or FPGA. It is noted that the memory device 1012 may be internal or external to the processor 1004 and may also be used to store data or information. The instructions may be in the form of machine readable code in one or more embodiments.

The operational strategy may be embodied by the one or more instructions such that, by executing the instructions, the controller 1000 can operate a chilled water plant or component thereof according to Demand Flow. For example, one or more algorithms may be performed to determine when increases or decreases to chilled/condenser water flow rate should be performed to keep chilled/condenser water pumping on or near a Delta T line. Once, the instructions are executed on the information from the one or more inputs 1020, a corresponding output may be provided via one or more outputs 1024 of the controller 1000. As shown, an output 1024 of the controller 1000 is connected to a VFD 1032. The VFD 1032 may be connected to a chilled, condenser, or other pump or cooling tower fan (not shown). In this manner, the controller 1000 can control pumping at chilled water plant pumps.

It is noted that the operational strategy may be thought of as providing external control operations which control a chilled water plant's components. For example, in the case of a retrofit, a controller 1000 or the like may apply Demand Flow to a chilled water plant without requiring alterations to the plant's existing components. The controller 1000 may control existing plant VFDs and pumps for instance. In some embodiments, VFDs may be installed on one or more chilled water, condenser water, or other pumps to allow control of these pumps by the operational strategy. One or more sensors may also be installed or existing sensors may be used by the controller 1000 in one or more embodiments.

Figure 11A:
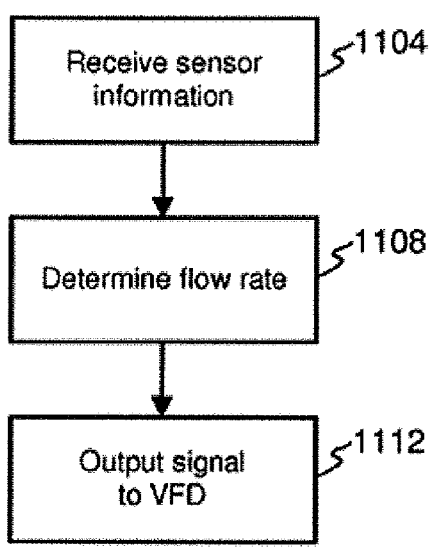
FIG. 11A is a flow diagram illustrating an exemplary controller in operation.

FIG. 11A is a flow diagram illustrating exemplary operations which may be performed by a controller 1024 to perform the operational strategy. It will be understood that some steps described herein may be performed in different order than described herein, and that there may be fewer or additional steps in various embodiments corresponding to various aspects of the operational strategy described herein, but not shown in the flow diagram.

In the embodiment shown, sensor information is received at a step 1104. For example, sensor information regarding entering chilled water temperature, leaving water temperature, or both of a chilled water plant component may be received. Refrigerant temperature, pressure, or other characteristics may also be received. Also, operating characteristics such as the position of chilled water valves at air handlers, the speed or output of VFDs, the speed or flow rate of pumps, as well as other information may be received.

At a step 1108, based on the information received in step 1104, the controller may determine whether to increase or decrease at one or more pumps to maintain a Delta T that is preferably near or at design Delta T. For example, referring to FIG. 1, if leaving chilled water temperature at an air handler 124 indicates low Delta T, the flow rate in the secondary loop 108 may be adjusted by a secondary chilled water pump 120 to maintain design Delta T across an air handler 124.

At a step 1112, an output may be provided, such as to a VFD or other pump controller, or even to a pump directly to increase or decrease flow rate as determined in step 1108. In this example above, by reducing flow rate, chilled water remains in the air handler 124 for a longer period of time. This causes the chilled water's enthalpy to increase because it is exposed to warm building air by the air handler 124 for a longer period of time.

The increase in the chilled water's enthalpy raises the leaving chilled water temperature of the air handler 124. As the water leaves the secondary loop 108 the leaving water temperature of the secondary loop is raised. In this manner, Delta T may be increased to near or at design Delta T (reducing or eliminating Low Delta T Syndrome).

Though the above example describes maintaining Delta T at an air handler 124, Delta T may be maintained in this manner at other chilled water plant components, including primary, secondary, or other loops as well as within components of the plant. For example, in one or more embodiments, a controller of a chilled water plant may alter the flow rate of one or more condenser water pumps to maintain a Delta T across a chiller component, such as the chiller's condenser.

As briefly discussed above, the operational strategy may also include one or more critical zone resets. In one or more embodiments, a critical zone reset changes the Delta T to which flow rate is controlled. In essence, the critical zone reset alters the Delta T line to which flow rate is controlled by the operational strategy. This allows the operational strategy to meet cooling demand by operating according to various Delta T lines. In practice, these Delta T lines will typically be near the Delta T line generated at design Delta T. The operational strategy is thus flexible and capable of meeting various cooling demands while efficiently operating the chilled water plant near or at design Delta T.

A critical zone reset may be used to increase or decrease cooling output, such as by increasing or decreasing chilled water flow. In one or more embodiments, a critical zone reset may be used to increase cooling output by increasing chilled water flow. This may occur in situations where cooling demand cannot be met by operating a chilled water plant at a particular Delta T. For example, if cooling demand cannot be met, a critical zone reset may be used to reset the current Delta T maintained by the operational strategy to a new value. To illustrate, the Delta T maintained by an operational strategy may be reset from 16 degrees to 15 degrees. To produce this lower Delta T value at chilled water plant components, the flow rate of chilled water may be increased to maintain the new Delta T value across one or more chilled water plant components. The increased flow rate provides additional chilled water to chilled water plant components which in turn provides increased cooling output to meet demand. For example, increased chilled water flow to air handlers would give the air handlers additional cool air capacity.

It is noted that critical zone resets may also occur when a chilled water plant, or components thereof, are producing too much or excess cooling output. For example, if cooling demand is lowered a critical zone reset may change the Delta T to be maintained such that it is closer to design Delta T. In the above example for instance, the Delta T may be reset from 15 degrees back to 16 degrees when cooling demand is lowered. Accordingly, chilled water flow rate may be reduced which reduces cooling output. Typically, a linear reset of a Delta T set point is calculated based on system dynamics as discovered during the commissioning process.

Figure 12:
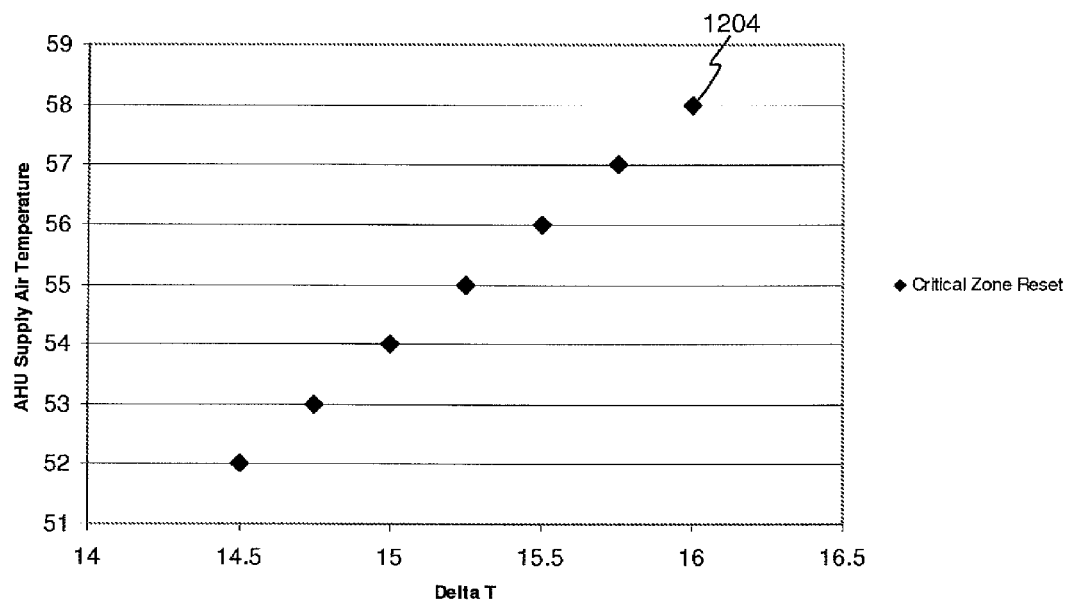
FIG. 12 is a chart illustrating exemplary critical zone resets triggered by air temperature.

FIG. 12 is a chart illustrating an example of a critical zone reset for an exemplary air handler unit. As can be seen, Delta T may be reset to a lower value to provide more chilled water flow thus lowering the air handler unit's supply air temperature. It can also be seen that resetting Delta T to a higher value raises the supply air temperature by reducing chilled water flow rate to the air handler unit.

In operation, the value to which the Delta T is reset may be determined in various ways. For example, new values for entering and leaving water temperatures (i.e. a reset Delta T) may be determined according to a formula or equation in some embodiments. In other embodiments, a set of predetermined set points may be used to provide the reset Delta T value. This can be described with respect to FIG. 12 which illustrates an exemplary group of set points 1204. In general, each set point 1204 provides a Delta T value for a given triggering event. In FIG. 12 for instance, each set point 1204 provides a Delta T value for an air handler unit's given air supply temperature. The set points 1204 may be determined during Demand Flow setup or commissioning, and may be adjusted later if desired.

If the new or reset Delta T value is still insufficient to meet cooling demand, another critical zone reset may be triggered to again reset the Delta T that is maintained by the operational strategy. In one or more embodiments, critical zone resets may occur until the chilled water plant is able to meet cooling demand.

In one or more embodiments, a critical zone reset alters the Delta T to be maintained by an incremental amount, such as a degree. This helps ensure that the Delta T to be maintained is close to design Delta T. Though a slightly reduced efficiency in chilled water components may result, the benefits of substantially reducing or eliminating low Delta T outweigh the slight reduction in efficiency. When compared to traditional control schemes, the efficiency gains of Demand Flow will remain substantial.

The circumstances which result in a critical zone reset will be referred to herein as a trigger or triggering event. As stated, critical zone resets may be triggered when chilled water plant components are producing too much or too little cooling output. To determine if plant components are producing too much or too little cooling output, the operational strategy may utilize information from one or more sensors. As will be described further below, this information may include characteristics of chilled water within a chilled water plant (e.g. temperature or flow rate), operating characteristics of one or more chilled water plant components, air or environmental conditions (e.g. temperature or humidity) of a space, as well as other information. Referring to FIG. 12 for example, a trigger may be the supply air temperature of an air handler unit. To illustrate, if the supply air temperature does not match a desired air supply temperature, a critical zone reset may be triggered.

As alluded to above, Delta T may also be increased by the operational strategy as a result of a critical zone reset. For example, if cooling demand is lowered, Delta T may be reset to a higher value by a critical zone reset. An example of resetting Delta T to a higher value to lower cooling output (i.e. raise air handler unit supply air temperature) is shown in FIG. 12. Similar to the above, an increase to Delta T by a critical zone reset may be triggered by various events or conditions.

Figure 11B:
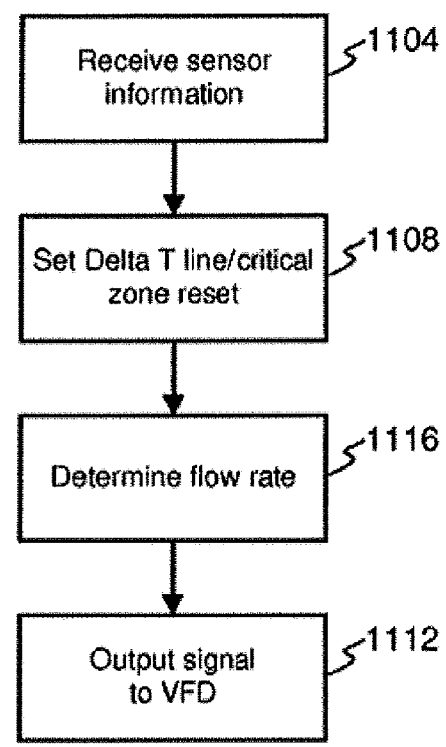
FIG. 11B is a flow diagram illustrating an exemplary controller in operation.

FIG. 11B is a flow diagram illustrating exemplary operations, including critical zone reset operation(s), which may be performed by a controller 1024. At a step 1116, information received in step 1104 may be processed to determine if a trigger has occurred. If so, a critical zone reset may occur which resets the Delta T line to which pumping is controlled. For example, operating characteristics provided by one or more sensors, such as the position of air handler chilled water valves, VFD speed or output, chilled water temperature in a plant bypass, or other information may cause a critical zone reset, as will be further described below.

If a critical zone reset occurs, the controller will utilize the reset value of Delta T or the reset Delta T line at step 1108 to determine whether an increase or decrease in flow rate is required. Then, as discussed above, an output may be provided to one or more pumps to effectuate this change in flow rate. If a critical zone reset does not occur the controller may continue to use the current Delta T line or Delta T and control flow rate accordingly. It is noted that the steps of FIGS. 11A and 11B may occur continuously or may occur at various periods of time. In this manner, critical zone resets and flow rates may be adjusted continuously or at the desired periods of time, respectively speaking.

Demand Flow's operational strategy will now be described with regard to the operation of chilled water pumps and condenser water pumps. As will become apparent from the following discussion, control of pumping or flow rate by the operational strategy has a highly beneficial effect on chilled water production (e.g. chillers), chilled water pumping, condenser water pumping, cooling tower fan operation, and air side fan operation.

A. Chilled Water Pump Operation

As described above, chilled water pumps provide chilled water flow through the chilled water plant. In one or more embodiments, chilled water pumps provide chilled water flow through primary, secondary, tertiary, or other loops of a chilled water plant.

In one or more embodiments, the operational strategy controls' such chilled water pumps such that their flow rate is on or near the Delta T line described above. As described above with regard to the graph of FIG. 9D, the operation of chilled water pumps according to a Delta T line results in substantial energy savings especially when compared to traditional control schemes.

Operation of chilled water pumps according to a Delta T line may be accomplished in various ways. In general, such operation keeps flow rate at one or more pumps on or near the Delta T line. The operational strategy may utilize different methods depending on the location or type of chilled water pump. For example, different operations may be used to control flow rate of a chilled water pump depending on whether the pump is on a primary, secondary, tertiary, or other loop. In one or more embodiments, flow rate provided by a chilled water pump may be controlled by a variable frequency drive (VFD) connected to the pump. It will be understood that other devices, including devices of the chilled water pumps themselves, may be used to control flow rate, pumping speed, or the like.

Typically, but not always, the operational strategy controls flow rate through one or more chilled water pumps to maintain a temperature at one or more points in the chilled water plant. One or more sensors may be used to detect the temperature at these points. Flow rate may then be adjusted to maintain a temperature according to temperature information from the sensors. In this manner, a Delta T may be maintained at one or more points in the chilled water plant.

Referring to FIG. 1, in one embodiment, the operational strategy may control secondary chilled water pumps 120 to maintain a Delta T, preferably at or near design Delta T, across the air handlers 124. This operates the secondary chilled water pumps 120 according to the Delta T line and ensures that the air handlers 124 can provide their rated cooling capacity while operating efficiently. As stated above, a particular Delta T may be maintained by increasing or decreasing flow rate via the secondary chilled water pumps 120.

The operational strategy may control primary chilled water pumps 116 to maintain a Delta T at one or more points of the chilled water plant as well. For example, primary chilled water pumps 116 may be operated to maintain a Delta T for the primary loop 104, secondary loop 108, or both. Again, this may be accomplished by increasing or decreasing the flow rate of one or more primary chilled water pumps 116.

As can be seen from the capacity equation, the relationship between Delta T and flow rate are linear. Thus, by maintaining a particular Delta T across the primary and secondary loops 104,108, flow rates will typically be near or at equilibrium. This reduces or eliminates excess flow causing a reduction or elimination of bypass mixing.

It is noted that other ways of eliminating bypass mixing may be used in one or more embodiments. In one embodiment, primary chilled water pumps 116 may be controlled to maintain a temperature within a bypass 128 of the chilled water plant. Because the temperature within the bypass 128 is the result of bypass mixing, maintaining the temperature within the bypass also controls bypass mixing. In this manner, the bypass mixing, and its compounding effect on low Delta T, may be greatly reduced and, in many cases, effectively eliminated. In one embodiment, the temperature maintained may be such that there is an equilibrium or a near equilibrium between the primary and secondary loops 104,108, reducing or eliminating bypass mixing.

To illustrate, excess flow in the secondary loop 108 may be determined by measuring the temperature of chilled water within the bypass 128. If the bypass temperature is near or equal to the return water temperature from the air handlers 124, there is excess secondary flow and the primary chilled water pump 116 speed may be increased until chilled water temperature in the bypass drops to near or at the temperature of chilled water in the primary loop 104. If the bypass temperature is near or equal to the supply chilled water from the primary loop 104, there is excess primary flow. Primary chilled water pump 116 speed may be decreased until the bypass temperature drops to a midpoint between the return chilled water temperature from the air handlers 124 and the primary loop 104. Bypass temperatures in this "dead band" have no reset effect on primary pump speeds. In one or more embodiments, the primary chilled water pump 116 speed may not decrease below the Delta T set point of the primary chilled water pump.

In another embodiment, the operational strategy may control primary chilled water pumps 116 to reduce or eliminate excess flow by matching the flow rate of chilled water in the primary loop 104 to the flow rate of chilled water in the secondary loop 108. One or more sensors may be used to determine flow rate of the secondary loop 108 to allow the primary chilled water pumps 116 to match the flow rate.

Critical zone resets will now be described with regard to the operation of chilled water pumps according to the operational strategy. As stated, a critical zone reset may change the Delta T line to which chilled water pumps are operated. In general, a critical zone reset may occur when there is too much or too little cooling output as may be determined through one or more sensors. A critical zone reset may occur for different chilled water pumps at different times and/or based on different sensor information.

Referring to FIG. 1 for example, a critical zone reset for secondary chilled water pumps 120 may be triggered if it is determined that there is insufficient chilled water flow to the air handlers 124 to meet cooling demand. This determination may be made based on various information (typically collected by one or more sensors). For example, when cooled air from an air handler 124 is warmer than desired a critical zone reset may occur.

In one embodiment, the position of one or more chilled water valves within an air handler 124 may indicate that there is insufficient chilled water flow and trigger a critical zone reset. For example, the opening of a chilled water valve beyond 85% or another threshold may indicate that the air handler 124 is "starved" for chilled water and trigger a critical zone reset. In one embodiment, the critical zone reset may incrementally lower the Delta T to be maintained across the air handler 124 causing an increase in chilled water flow rate through the air handler. The air handler 124 may now meet cooling demand. If not, the air handler's chilled water valve would remain open beyond the threshold and additional critical zone resets may be triggered until cooling demand can be met. As cooling being met, the chilled water valves close which prevents further critical zone resets.

Figure 13:
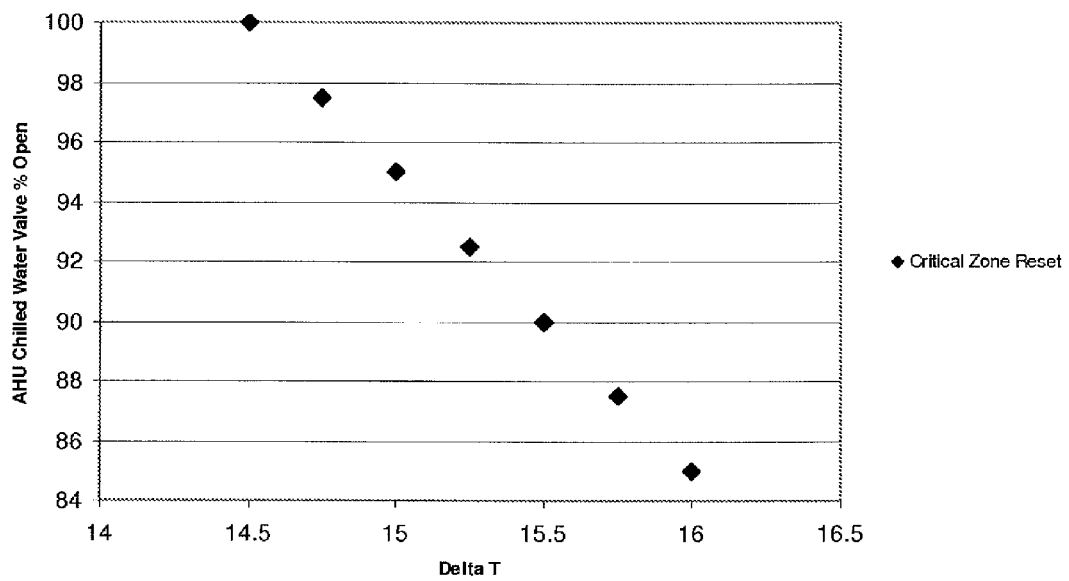
FIG. 13 is a chart illustrating exemplary critical zone resets triggered by chilled water valve positions.

FIG. 13 is a chart illustrating critical zone resets for an exemplary air handler unit. In this embodiment, critical zone resets are triggered by the position of the air handler unit's chilled water valve. As can be seen, as the chilled water valve modulates toward 100% open, Delta T is reset to lower values to provide additional chilled water flow to the air handler unit. In operation, a chilled water pump supplying chilled water to the air handler unit, such as a secondary or tertiary chilled water pump, may be used to provide the additional chilled water flow. It is noted that, FIG. 13 also shows that critical zone resets may be used to increase Delta T as the position of a chilled water valve moves from open to closed.

Critical zone resets may also be triggered for the primary chilled water pumps 116. In one or more embodiments, a critical zone reset may be triggered for primary chilled water pumps 116 to ensure there is little or no bypass mixing in a chilled water plant. In one or more embodiments, excess flow, if any, may be detected by sensing the water temperature in the bypass. An increase or decrease of water temperature within the bypass may trigger a critical zone reset. For example, as water temperature in the bypass increases, pumping in the primary loop may be increased to maintain equilibrium between the primary and secondary loops. In one embodiment, the VFD for a primary chilled water pump 116 may be adjusted by + or −1 Hz per minute until equilibrium or near equilibrium is produced. In operation, the operational strategy will typically result in excess flow that oscillates between zero and negligible flow resulting in a significant reduction or elimination of bypass mixing. It is noted that critical zone reset may occur continuously in some embodiments because to balance the flow in a bypass which may be highly variable and dynamic.

For example, in one embodiment, the temperature in the bypass may be measured and controlled, such as through a production pump VFD frequency adjustment, to a set point of 48 degrees. This set point temperature may be variable to some degree by the system and is determined at commissioning. As the temperature in the bypass rises above said set point an indication of excess distribution water flow as compared to production chilled water flow is a known. Demand Flow production pump algorithms may then reset, through a critical zone reset, to increase the VFD frequency by 1 Hz per minute until such a time as the temperature in the de-coupler drops below the set point minus a 2 degree dead band. These parameters are also variable by system and shall be determined at system commissioning. Bypass temperatures below the set point+dead band indicates that excess production water flow has been obtained and the production pumping control algorithm is then reversed by the same frequency per unit of time, but never above the original Delta T set point. This control strategy allows production pumping to meet the dynamic load conditions in the secondary or distribution loops. This reduces the Low Delta Syndrome to its lowest achievable level in all as built de-coupled pumping systems. It is noted that minimum VFD frequencies may be set during commissioning to match manufacturer minimum flow requirements.

Figure 14:
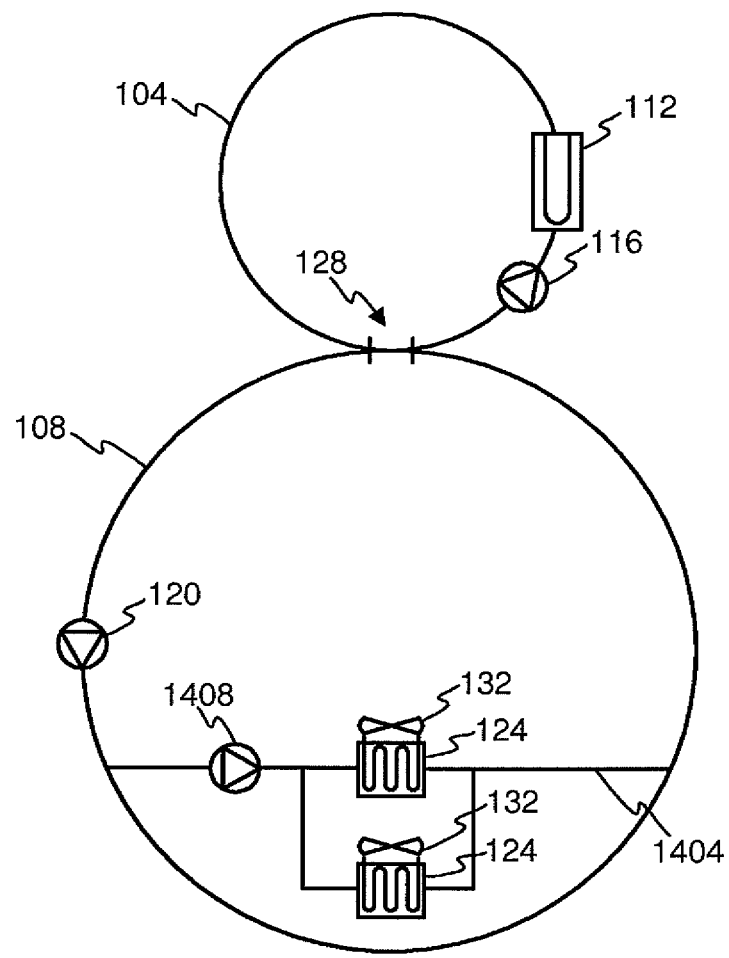
FIG. 14 is a block diagram illustrating an exemplary decoupled chilled water plant.

The operational strategy, including its critical zone resets, may be applied to various configurations of decoupled chilled water plants. FIG. 14 illustrates an exemplary chilled water plant having a primary loop 104, a secondary loop 108, and a tertiary loop 1404. As is known, the secondary loop 108 may be a distribution line which carries chilled water to the tertiary loop 1404. It is noted that a plurality of tertiary loops 1404 may be provided in some chilled water plants. In general, the tertiary loop 1404 has at least one tertiary chilled water pump and one or more air handlers 124 which provide cooling to one or more buildings or other structures.

In operation, the tertiary chilled water pumps 1408 may be operated to maintain a Delta T across the air handlers 124. As described above, this Delta T is preferably near or at design Delta T for the air handlers 124. The secondary chilled water pumps 120 may be operated to maintain a Delta T across the tertiary pumps 1408. Preferably, this Delta T is near or at design Delta T for the tertiary loop 1404. The primary chilled water pumps 116 may be operated to maintain a Delta T across the chillers 112. This Delta T is preferably near or at design Delta T for the chillers.

In chilled water plants having one or more tertiary loops 1404, critical zone resets may be triggered based on various criteria as well. To illustrate, critical zone resets for tertiary chilled water pumps 1408 may be triggered based on the position of chilled water valves in the air handlers 124. Critical zone resets for secondary chilled water pumps 120 may be triggered based on the flow rate of the tertiary chilled water pumps 1408, such as indicated by the speed of the pumps, the pumps' VFD output, or the like. A high flow rate at the tertiary chilled water pumps 1404 may indicate that the tertiary loop(s) 1404 or tertiary pumps 1408 are "starved" for chilled water. Thus, a critical zone reset may be triggered to provide additional chilled water flow to the tertiary loops 1404 from the secondary loop 108 by increasing flow rate at one or more secondary chilled water pumps 120.

To illustrate, in one embodiment, when any tertiary chilled water pump 1404 VFD frequency reaches 55 Hz, secondary loop 108 pump Delta T set points may be linearly reset through a critical zone reset in order to keep tertiary pump VFD frequencies from rising higher than 55 Hz or other frequency threshold. The set points, frequency thresholds, or both may be determined during commissioning or installation of Demand Flow at a chilled water plant.

Figure 15:
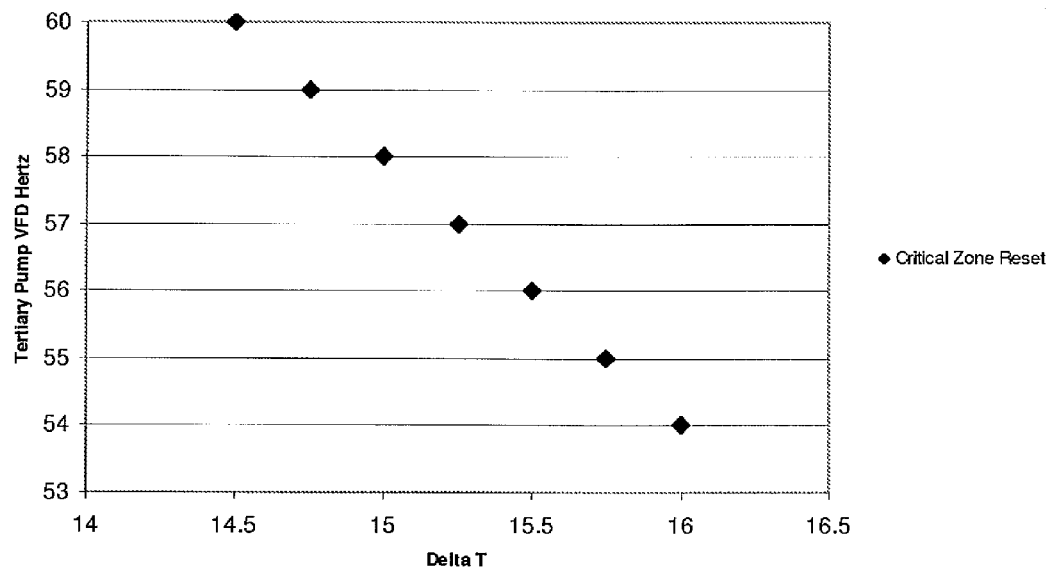
FIG. 15 is a chart illustrating exemplary critical zone resets triggered by VFD Hertz.

FIG. 15 is a chart illustrating critical zone resets for a tertiary chilled water pump. In this embodiment, critical zone resets are triggered by the operating frequency (Hz) of a tertiary water pump's VFD. As can be seen, Delta T may be reset to a lower value as the tertiary pump VFD (or other indicator of tertiary pump speed or flow rate) increases. As stated, lowering the Delta T value causes increased chilled water flow to the tertiary pump allowing cooling demand to be met. The frequencies at which critical zone resets occur and their associated Delta T values may be determined during the setup or commissioning of Demand Flow at the chilled water plant. It is noted that Delta T may also be increased as the tertiary pump's frequency or speed decreases.

Critical zone resets for primary chilled water pumps 116 may occur as described above to maintain an equilibrium or a near equilibrium greatly reducing or eliminating bypass mixing between the primary and secondary loops 104,108.

It is noted that in one or more embodiments, critical zone resets may be triggered for the most critical zone of a chilled water plant subsystem. A critical zone in this sense, may be thought of as a parameter that must be maintained to provide the desired conditions in an area or process. Such parameters may include, air handler supply air temperature, space temperature/humidity, bypass temperature, chilled water valve position, pump speed, or VFD frequency. To illustrate, tertiary chilled water pumping, such as building pumping systems in campus designs, may be reset off of their Delta T line based on the most critical zone in the building. Distribution pumping may be reset off of its Delta T line based on the most critical tertiary pump VFD HZ in the system.

B. Condenser Water Pump Operations

In general, condenser water pumps provide a flow of condenser water to allow condensation of refrigerant within a chiller. This condensation is an important part of the refrigeration cycle as it allows refrigerant vapor to return to a liquid form to continue the refrigeration cycle. In one or more embodiments, application of the operational strategy causes condenser water pumps to be operated according to a Delta T line resulting in substantial energy savings.

Figure 16:
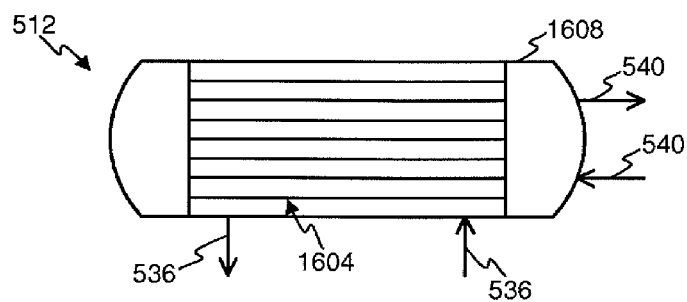
FIG. 16 is a cross section view of an exemplary condenser.

FIG. 16 illustrates an exemplary condenser 512 comprising a plurality of condenser tubes 1604 within a shell 1608. Refrigerant vapor may be held in the shell 1608 such that the refrigerant vapor contacts the condenser tubes 1604. In operation, condenser water flows through the condenser tubes 1604, causing the condenser tubes 1604 to have a lower temperature than the refrigerant vapor. As a result, the refrigerant vapor condenses on the condenser tubes 1604 as heat from the vapor is transferred to the condenser water through the condenser tubes.

In one or more embodiments, the operational strategy influences the temperature of the refrigerant and the condenser water by controlling the flow rate of the condenser water through the condenser tubes 1604. Lowering the flow rate of condenser water causes the water to remain within the condenser tubes 1604 for a longer period of time. Thus, an increased amount of heat is absorbed from the refrigerant vapor causing the condenser water to leave the condenser at a higher temperature and enthalpy. On the other hand, increasing the flow rate of the condenser water reduces the time the condenser water is within the condenser tubes 1604. Thus, less heat is absorbed and the condenser water leaves the condenser at a lower temperature and enthalpy.

As stated, one problem caused by low Delta T in a chiller is stacking. The operational strategy addresses the problem of stacking caused by low Delta T of condenser water at low condenser water entering temperatures. In one or more embodiments, this is accomplished by controlling flow rate of condenser water according to a Delta T line. In this manner, a chiller's minimum lift requirements may be maintained and the problem of stacking substantially reduced if not eliminated. In one or more embodiments, lift requirements may be maintained by controlling saturated condenser refrigerant temperature through control of condenser water leaving temperature at the condenser. The operational strategy may control condenser water leaving temperature by controlling flow rate of the condenser water temperature, as discussed above. Because the saturated condenser refrigerant pressure increases or decreases with the saturated condenser refrigerant temperature, Delta P or lift in the chiller can be maintained by controlling condenser water flow.

In operation, the operational strategy may control one or more condenser water pumps, such as through a VFD, to maintain a Delta T across the condenser. Consequently, a condenser water leaving temperature at the condenser and lift in the chiller are also maintained.

In addition, to addressing stacking, Demand Flow's operational strategy may also be configured to beneficially influence the mass flow, lift, or both at a chiller 112 by operating condenser water pumps 516 according to a Delta T line. In general, mass flow refers to the amount of refrigerant circulated within a chiller for a given load, while lift refers to the pressure/temperature differential the refrigerant has to be transferred across. The amount of mass flow and lift dictate the energy usage of a chiller's compressor 520. Thus, the operation of condenser water pumps 516 according to the operational strategy provides efficiency gains by reducing compressor energy usage.

A chiller's compressor 520 may be thought of as a refrigerant vapor pump which transfers low pressure and low temperature gas from the evaporator 508 to the condenser 512 at a higher pressure and higher temperature state. Energy used in this process may be expressed by the equation, $$E = MF * \frac{L}{K}.$$

where E is the energy used, MF is mass flow, L is lift, and K is a refrigerant constant. As can be seen from this equation, lowering mass flow or lift decreases energy usage.

The mass flow (or weight of refrigerant) that must be circulated through a chiller 112 to produce the required refrigeration effect (RE) for a given amount of work or output (Tons) may be described by the formula, $$MF = Tons * \frac{K}{RE},$$

where K is some constant. Simply stated, this formula says that increasing the refrigeration effect lowers the weight of refrigerant, or mass flow, that needs to be circulated through the chiller for a given amount of work. Increasing the refrigeration effect also increases the deliverable capacity of a chiller while reducing compressor energy for a given amount of work.

The refrigeration effect may be increased in various ways. One way to increase the refrigeration effect is by sub-cooling the refrigerant in the condenser. Sub-cooling may be accomplished by lowering the condenser water entering temperature at the condenser. As is known, condenser water entering temperature is a function of cooling tower design and environmental conditions. A lower condenser water entering temperature allows the condenser to produce a lower refrigerant temperature as the refrigerant leaves the condenser. Operating at the coldest seasonally available condenser water entering temperature allowable by the condenser provides the greatest sub-cooling while operating within its manufacturer's specifications.

Sub-cooling the refrigerant reduces its temperature below saturation and decreases the amount of "flashing" that occurs during the expansion cycle or throttling process. Flashing is a term used to describe the amount of refrigerant used to cool the refrigerant from the sub-cooled condenser to the saturated evaporator temperatures. No useful refrigeration effect is gained by this "flashed" refrigerant and it is considered an offset to the refrigeration effect. Therefore, the more the sub-cooling the higher the useful refrigeration effect per cycle.

FIG. 17 is a chart illustrating the benefits of sub-cooling at a chilled water plant where Demand Flow has been applied. In general the chart quantifies Demand Flow compressor energy shifts. In the chart, Design CoPr is calculated from known chiller performance data. Operating CoPr is an adjustment from the Design CoPr based on the current chiller operating RE and HC.

As can be seen, the top row of the chart shows the design efficiency to be 0.7 KW/Ton and the CoPr as 8.33. The second row is a snapshot of the chiller operating conditions prior to Demand Flow implementation. The third row is the same chiller at approximately the same environmental/load condition after Demand Flow. The fourth row is the efficiency the chiller is capable of achieving in the best operating conditions. Note the change in nominal tonnage and efficiency achieved in this chiller by improving the RE. Tonnage is increased by 30% while the efficiency is improved by over 50%.

Figure 6B:
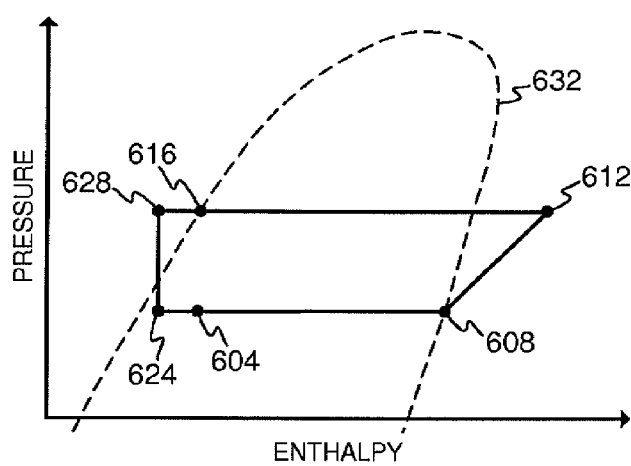
FIG. 6B is a exemplary pressure enthalpy graph illustrating sub-cooling in the refrigeration cycle.

As described above with regard to FIG. 6A, the refrigeration cycle may be illustrated by a pressure-enthalpy graph. Referring now to FIG. 6B, the beneficial effects of sub-cooling can also be shown through a pressure-enthalpy graph. As FIG. 6B shows, sub-cooling the refrigerant in the condenser reduces the enthalpy of the refrigerant from point 616 to a point 628. The sub-cooled refrigerant may then enter the evaporator at a point 624. As can be seen, this extends the refrigeration effect from point 604 to point 624.

Another contributor to compressor energy is the pressure differential between the evaporator and condenser or, Delta P, that a compressor has to transfer the refrigerant across. As stated above, this Delta P is commonly known in the industry as lift, and is commonly expressed in terms of the temperature difference between saturated refrigerant in the evaporator and the condenser. The effect of lift on compressor energy can be seen in the energy equation, $$E = MF * \frac{L}{K},$$

where L is lift. For example, according to the equation, an increase in lift causes an increase in energy usage while a decrease in lift reduces energy usage.

Practically speaking, the evaporator saturated pressure may be considered a relative constant. This pressure may be determined by the leaving chilled water temperature of the evaporator. For example, one or more set points or a chart may be used to determine saturated refrigerant pressure in the evaporator. The difference between the leaving chilled water temperature and saturated refrigerant temperature is known as evaporator approach temperature.

In one or more embodiments, the reduction of lift according to the Demand Flow operational strategy may be accomplished by reducing refrigerant pressure in the condenser. This may be achieved by reducing condenser water leaving temperature at the condenser because saturated condenser refrigerant pressure is set by the condenser water leaving temperature and the designed approach to saturated refrigerant temperature. The designed approach temperature may vary depending on the quality of a chiller. For example, an inexpensive chiller may have an approach of 4 degrees or more, while a better quality chiller may have an approach of 1 degree or less.

Figures 19, 20:
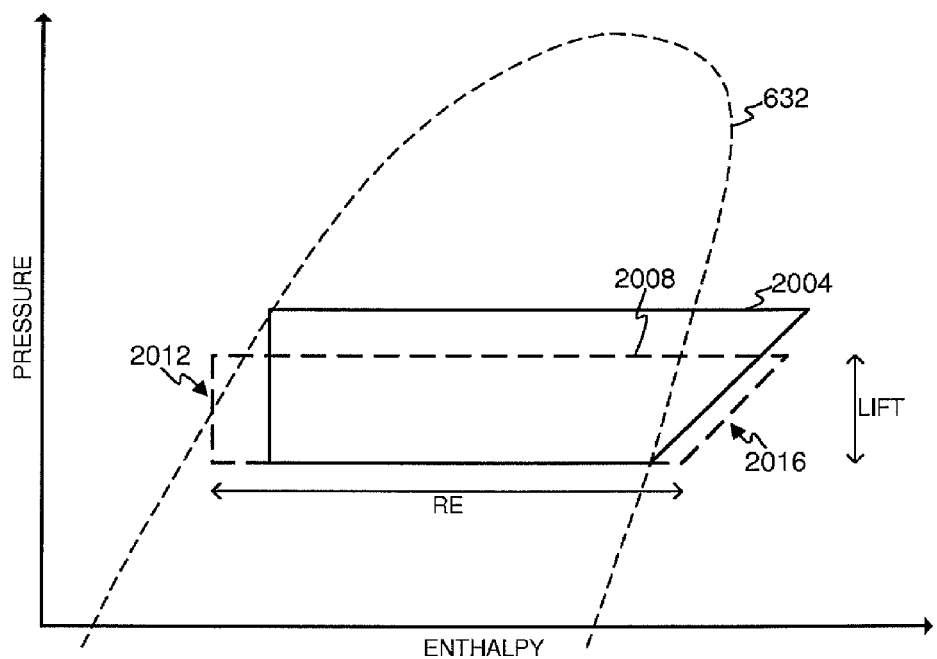
FIG. 19 is a chart illustrating compressor energy shifts under Demand Flow at an exemplary chilled water plant.
FIG. 20 is a pressure enthalpy graph illustrating changes to the refrigeration cycle under Demand Flow at an exemplary chiller.

In constant volume pumping systems, condenser water leaving temperature is generally linearly related to condenser water entering temperature at a condenser. Therefore, reducing condenser water entering temperature reduces condenser water leaving temperature. FIG. 19 is a chart illustrating the linear relationship of condenser water leaving and entering temperatures at an exemplary condenser at constant volume pumping.

As stated above, a reduced condenser water leaving temperature reduces refrigerant pressure in the condenser, sub-cooling the refrigerant and thus extending the refrigeration effect. The reduction of refrigerant pressure in the condenser also reduces lift. Thus, reducing condenser water entering temperature has the dual benefit of increasing the refrigeration effect and reducing lift.

Reducing condenser water entering temperature to just above freezing, in theory, would have the optimal practical effect on mass flow and lift. Unfortunately chillers have minimum lift requirements (which generally vary by chiller manufacturer, make, and model). Saturated refrigerant condensing pressures must be maintained at or above these minimum points to provide enough pressure differential (i.e. Delta P of the refrigerant) to drive the refrigerant through the throttling or expansion process in the condenser. If these pressure requirements are not met the refrigerant will cause stacking and cause chiller shut down from various safety devices of the chiller.

Unlike constant flow systems, the operational strategy can control lift, regardless of condenser water entering temperature, by adjusting the flow rate of condenser water. This is highly advantageous because it allows use of a lower condenser water entering temperatures. By allowing lower condenser water entering temperatures, without stacking, the operational strategy significantly reduces compressor energy by increasing sub-cooling (and the refrigeration effect) and lift. In practice, the operational strategy sub-cooling may be increased to maximum allowable limits to maximize energy savings. Demand Flow's method of controlling lift, regardless of condenser water entering temperature and via condenser water pumping algorithms, is unique to the industry.

Additionally, because traditional condenser water pumping systems operate at a constant volume, cooling towers are always at full flow conditions, even at partial load conditions. In a constant flow control scheme, as the load on the cooling tower decreases the operating range or Delta T at the tower decreases, which reduces the efficiency of the tower. In contrast, with the operational strategy Delta T at the cooling tower is maintained, at or near the tower's design Delta T via the condenser water pumping algorithms previously described. This is significant in that lower tower sump temperatures are achievable for the same amount of cooling tower fan energy because efficiencies have been increased. The lower tower sump temperatures correspond to lower condenser water entering temperatures at the condenser. It is important to note that condensers and cooling towers are selected at common Delta T design points, typically 10 degrees, as an industry standard.

In the operational strategy, minimum cooling tower fan energy is maintained, for a given sump temperature set point by controlling the condenser water pump to a constant Delta T algorithm as previously described. This method of controlling cooling tower efficiency, regardless of tower load, via condenser water pumping is unique to the industry. There is a synergy that develops between the chiller, condenser water pumping and cooling tower sub-systems by operating them under the Demand Flow strategy that reduces net system energy.

Figure 6C:
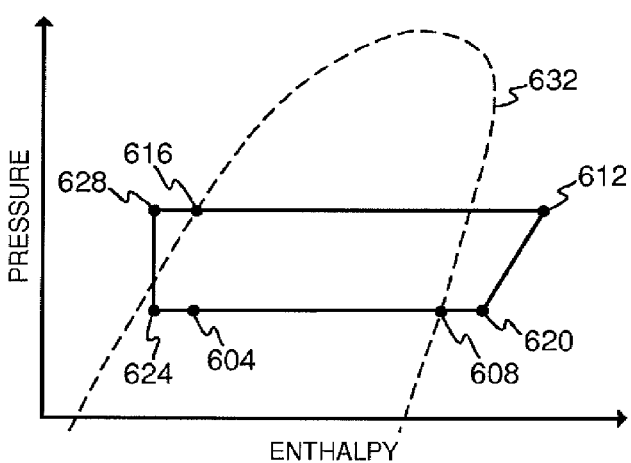
FIG. 6C is a exemplary pressure enthalpy graph illustrating refrigerant superheat in the refrigeration cycle.

It is noted here that another way the operational strategy increases the refrigeration effect is by increasing the superheat of the refrigerant in the evaporator. One benefit of increased refrigerant superheat is that it reduces the refrigerant mass flow requirements per cycle. This reduces energy usage by the compressor. As can be seen in FIG. 6C, the refrigerant superheat generated in the evaporator extends the refrigeration effect from point 608 to a point 620 having a higher enthalpy.

With the operational strategy, refrigerant superheat is held constant across the load range of the chiller by controlling chilled water pump(s) to a constant Delta T algorithm based on design Delta T conditions. This method of controlling chiller superheat to design conditions, regardless of evaporator load, via chilled water pumping algorithms is unique to the industry.

In traditionally operated chilled water plants, chilled water at the evaporator having low Delta T significantly reduces and sometimes eliminates refrigerant superheat in the chiller's evaporator. The reduction or elimination of refrigerant superheat in the evaporator reduces the refrigeration effect. For example, in FIG. 6C, reduction of refrigerant superheat may cause the refrigeration effect to shrink from point 620 to point 608.

Refrigerant that is not heavily saturated because of low chilled water Delta T is insufficiently superheated and can cause damage to the compressor because the refrigerant is insufficiently vaporized. In fact, manufacturers often add eliminator screens to the top of the evaporator sections to break up larger droplets of refrigerant that have not been superheated and adequately vaporized before they enter the compressor. If these droplets reach the compressor, they cause excess compressor noise and damage the compressor. Thus, Demand Flow provides an added benefit of preventing the formation of such droplets by maintaining or increasing refrigerant superheat to adequately vaporize the refrigerant before it reaches the compressor.

In one or more embodiments, the operational strategy maintains refrigerant superheat by controlling chilled water pumps according to a Delta T line. In this manner, refrigerant superheat may be maintained near or at design conditions, regardless of evaporator load. When compared to a traditional chiller operating at low Delta T, the refrigerant superheat is typically much greater under the operational strategy.

To illustrate, referring to FIG. 1, the primary chilled water pump 116 of a primary loop 104 may be controlled according to a Delta T line as described above. In this manner, a Delta T may be maintained at the chiller 112. As can be seen from FIG. 5, this maintains Delta T of chilled water at the chiller's evaporator 508 which is connected to the primary loop by one or more chilled water conduits 532. As a consequence of maintaining chilled water Delta T at the evaporator 508, refrigerant superheat may be maintained near or at design condition in the evaporator.

As can be seen, a synergy develops between chiller water and condenser water pumping sub-systems as a result of maintaining Delta T according to the operational strategy. For example, controlling condenser water entering temperature, condenser water leaving temperature, and condenser pump flow rate provides a synergistic effect on chiller energy, condenser pump energy, and cooling tower efficiency. It will be understood that optimal condenser pump, chiller and cooling tower fan energy combinations may be discovered during commissioning or setup of the operational strategy.

IV. Demand Flow Energy Utilization

As shown from the above, chilled water plant control systems/schemes can positively or negatively influence capacity and energy utilization of a chilled water plant. In general, traditional control schemes focus almost entirely on Delta P thus resulting in artificial capacity reductions and excess energy usage for a given load. Demand Flow reduces energy utilization and maximizes chilled water plant capacity, regardless of load.

The following describes the reductions in energy usage provided by Demand Flow at chilled water plant sub-systems, including chilled water pumps, condenser water pumps, compressors, cooling tower fans, and air side fans.

A. Chilled Water Pumps

The fundamental premise behind variable flow chilled water applications are best understood via the Affinity Laws. The Affinity Laws state that system load (tons) and flow (GPM) are linear, system flow and pressure drop (TDH) are a square function and system flow and energy are a cube function. Therefore as the system load is reduced the amount of chilled water flow is reduced proportionally but the energy is reduced exponentially.

As discovered previously in this narrative traditional Delta P based chilled water pumping algorithms may reduce flow but not enough to avoid Low Delta T Syndrome systems. As the building load drops from design conditions the relationship between system load (Tons) and flow (GPM) is described by the equation $$\text{Tons} = \left(\frac{GPM * \Delta T}{K}\right).$$

Maintaining a Delta T value at or near design parameters via Demand Flow's operational strategy optimizes flow (GPM) around the original system equipment selection criteria and specifications thus optimizing both work and pumping energy. Also, the optimal flow rates provided by Demand Flow reduce energy utilization exponentially as seen through the Affinity Laws.

As previously described using the chilled water pump to control to the design Delta T of the system has the dual effect of optimizing chiller energy via superheat as well as chilled water pump energy. Also, as will be described below, air side capacity will also be increased and fan energy reduced as a direct result of the Demand Flow operational strategy.

B. Condenser Water Pumps

The Affinity Laws apply to the condenser side energy as well. As the building load drops from design conditions the relationship between system load (Tons) and condenser water flow (GPM) is as described by the Affinity Laws as well. Maintaining a Delta T at or near design parameters via Demand Flow Control algorithms optimizes flow (GPM) around the original system equipment selection criteria thus optimizing both work and pumping energy. Similar to chilled water pumps, the energy utilization condenser water pumps (as well as other pumps) decreases exponentially has flow rate is decreased.

As discovered previously in this narrative traditional constant volume based condenser water pumping strategies result in very low operating Delta T across the condenser, minimizing the ability to reduce compressor energy via sub-cooling the refrigerant. Utilizing the operational strategy on condenser water pumps has the triple effect of optimizing pump energy, cooling tower efficiency, and managing minimum lift requirements in the chiller, even at very low condenser water entering temperatures. As will be further proven later in this narrative cooling tower efficiency will also be increased and fan energy reduced as a direct result of this Demand Flow control strategy.

Shifts in Demand Flow condenser water pump energy utilization may be determined in the same manner as chilled water pumping energy. It is noted that in the unusual case that the condenser water pumps are small (e.g. low horse power) relative to the nominal tonnage of the chiller, operating the condenser water system at or near design Delta T in upper load conditions under Demand Flow might in some cases, cause the chilled water plant to use slightly higher energy than operating at low condenser water Delta T. However, operating in this manner under Demand Flow maintains proper lift at the condenser even when operating at very low condenser water entering temperature. This maximizes sub-cooling which typically more than compensates for any increase caused by operating near or at design Delta T in upper load conditions. The optimal operating Delta T will typically be determined during the commissioning or setup process through field testing.

C. Compressors

Reductions in compressor energy derived via the application of a Demand Flow operational strategy are best quantified by calculating the associated shift in the Coefficient of Performance of the Refrigerant (COPR). COPR is the measure of efficiency in the refrigeration cycle based on the amount of energy absorbed in the evaporator as compared to the amount of energy expended in the compression cycle. The two factors that determine the COPR are refrigeration effect and heat of compression. Heat of compression is the heat energy equivalent to the work done during the compression cycle. Heat of compression is quantified as the difference in enthalpy between the refrigerant entering and leaving the compressor. This relationship may be stated as $$COPR = \frac{RE}{HC},$$

where RE is refrigeration effect and HC is heat of compression. For optimal COPR, the refrigerant superheat should be as high as possible and the refrigerant sub-cooling should be as low as possible.

Using chilled water pumping, condenser water pumping, and cooling tower fan subsystems to achieve optimal COPR is unique to the industry and fundamental to Demand Flow Technology.

Compressor energy shifts under Demand Flow will now be further explained. Design COPR is calculated from known chiller performance data, while operating COPR is an adjustment from the Design based on the current refrigeration effect and heat of compression. For example, the chart of FIG. 19 contains design and measured refrigerant properties from a Carrier (Trademark of Carrier Corporation) chiller before and after an actual Demand Flow retrofit. The top row of this spreadsheet shows the design efficiency to be 0.7 KW/Ton and the design COPR to be is 8.33. The second row is the measured operating parameters of the chilled water system prior to Demand Flow implementation. The third row is the measured operating parameters of the chilled water system with Demand Flow applied. The fourth row is the efficiency the chiller is capable of achieving in the best operating conditions. Note the change in nominal tonnage and efficiency achieved in this chiller by improving the refrigeration effect. Tonnage is increased by 30% while the efficiency is improved by over 50%.

This data is now applied to the pressure enthalpy diagram in FIG. 20 in order to which graphically illustrates the fundamental changes in the refrigeration cycle before and after Demand Flow is applied. As can be seen, by comparing the before graph 2004 and the after Demand Flow graph 2008 there is an increased refrigeration effect and reduced lift (without stacking) under Demand Flow. As can also be seen, application of Demand Flow has increased sub-cooling 2012 as well as refrigerant superheat 2016.

D. Cooling Tower Fans

Demand Flow cooling tower fan energy is approximately linear to load in a well maintained system operating with the lowest sump temperatures achievable at the current environmental conditions. Condenser water entering temperature or cooling tower fan set points may be set equal to the design wet bulb temperature+cooling tower sump temperature approach to wet bulb. Shifts in cooling tower fan energy may be based on actual condenser water entering temperature, nominal online tonnage, measured tonnage and online cooling tower fan horsepower.

A chart of a working system with the Demand Flow operational strategy applied is shown in FIG. 21. In this case study, the cooling tower fan set point was lowered from 83 degrees to 61 degrees to demonstrate the shift in energy between the subsystems as the condenser water entering temperature drops. The chart is read from right to left.

E. Air Side Fans

Air side fan energy and capacity is directly affected by Low Delta T Syndrome and bypass mixing in the plant. For example, a 2 degree rise in chilled water temperature can increase variable air volume air handler unit fan energy by 30% at design load conditions. This efficiency loss can be directly quantified in using basic heat exchanger calculations. It is noted that air side work and energy are affected by Low Delta T Syndrome in the same manner as other system heat exchangers with a loss of deliverable capacity and increased energy consumption.

The heat transfer equation $Q=U*A*LMTD$, where Q is the overall heat transferred, U is the overall heat transfer coefficient of the heat exchanger material, A is the surface area of the heat exchanger, and LMTD is the log mean temperature difference, is one way of observing the effects of Low Delta T Syndrome in air handler chilled water coils. In chilled water coils LMTD describes the relationship between the entering/leaving air side and the entering/leaving water side. In the context of Demand Flow systems where the chilled water is moving slower (higher Delta T) there is some discussion that the overall heat transfer coefficient, U, is reduced, resulting in less efficient coil performance. While it may be true that U is reduced, it is more than offset by the effects of the colder chilled water supply in a Demand Flow system, which is reflected in the higher LMTD. In effect, the higher LMTD more than offsets any theoretical reductions in U as seen in the following example.

Figure 22:
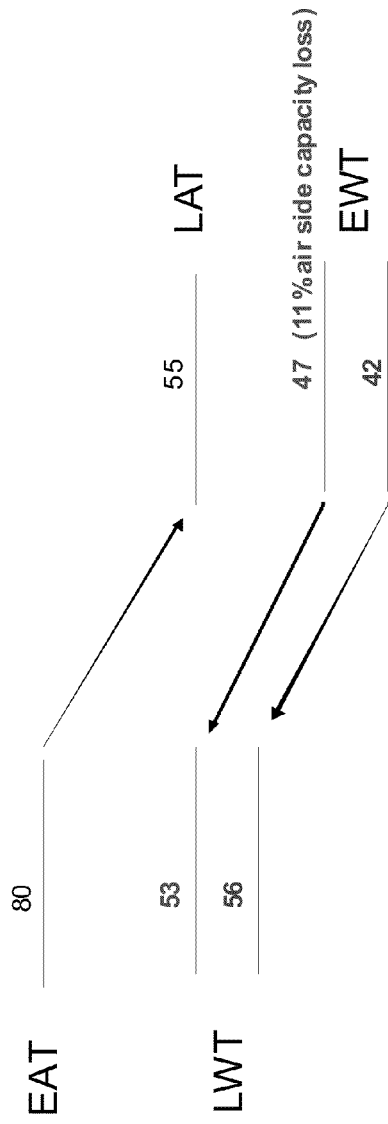
FIG. 22 is a graph illustrating log mean temperature difference with Demand Flow at an exemplary chilled water plant.

More specifically, the LMTD analysis shows that reducing CHWS to the coil by lowering chiller set points or eliminating mixing in the plant bypass can dramatically improve coil performance. The chart of FIG. 22 provides an LMTD analysis detailing potential air side coil capacity shifts in Demand Flow. With the exemplary data of FIG. 22, a 25% capacity increase is achieved.

FIG. 23A illustrates the relationship between chilled water flow and Delta T in a system with Low Delta T Syndrome. FIG. 23B illustrates a Demand Flow System coil with decreasing chilled water supply temperatures and associated GPM at constant chilled water return temperature and load. FIG. 23C illustrates the potential increased coil capacity at design chilled water flows with decreasing chilled water supply temperatures. This example illustrates the flexibility of a Demand Flow operational strategy to overcome particular problems in a given system.

Total air side cooling load is calculated by the equation $Q_t=4.5*CFM*(h_1-h_2)$, where entering air enthalpy is $h_1$ and leaving air enthalpy is $h_2$. For example, based on this formula and the following assumptions, fan energy utilization after Demand Flow is applied may be calculated/quantified.

The monthly average air handler unit (AHU) load (Qt) is known from prior analysis.

The AHU CFM is linear to load.

The AHU entering air enthalpy (h1) is known from design information or direct measurement.

Based on the above, the monthly average AHU CFM may be determined by the equation, $$CFM_{avg} = CFM_{design} * \left(\frac{Qt_{avg}}{Qt_{max}\Pi}\right)$$

where $Qt_{avg}$ is the monthly average AHU Qt and $Qt_{max}$ is the maximum AHU Qt. The monthly average leaving air enthalpy may be determined by the equation, $$h2_{avg} h1 + \left(\frac{Qt_{avg}}{4.5}\right) \cdot CFM_{avg}$$

where Qt.sub.avg is the monthly average AHU Qt and CFM.sub.avg is the monthly average AHU CFM. It is noted that the value 4.5 is a constant which may be adjusted for site location based on air density.

The example data in FIG. 24 illustrates the results of these calculations and assumptions to a system that has a maximum connected load of 1000 Tons at 315,000 CFM. The minimum air side CFM is 35% and the minimum AHU SAT is as stated. As can be seen, Demand Flow provides numerous advantages.

V. Specific Advantages Unique to Demand Flow

As can be seen from the above, Demand Flow provides an operational strategy unique in the HVA/C industry. In addition, Demand Flow and its operational strategy is the first that specifically:

1. Utilizes external control operations in chilled water production pumping subsystems to optimize evaporator refrigerant superheat, or refrigerant enthalpy leaving the evaporator thus beneficially influencing the mass flow component of compressor energy usage. Controlling chilled water pumps, such as through VFDs, to near or at manufacturer designed evaporator Delta T (e.g. design Delta T) using Demand Flow chilled water pumping operations controls refrigerant superheat to chiller manufacturer design conditions regardless of the load percent on a chiller at any given time. This optimizes refrigerant enthalpy leaving the evaporator and reduces chiller compressor energy as compared to a chiller operating at less than design Delta T (i.e. low Delta T).

Demand Flow also uses external control operations in chilled water distribution pumping subsystems to achieve design Delta T regardless of chilled water plant load conditions, thus eliminating Low Delta T Syndrome in the chiller water subsystem.

2. Utilizes external control operations in condenser water pumping and cooling tower fan subsystems to optimize condenser refrigerant sub-cooling, or refrigerant enthalpy leaving the condenser (and entering the evaporator). In this manner, mass flow component of the compressor energy equation, as described above, is beneficially influenced. Demand Flow control operations in condenser water pumping and cooling tower fan subsystems generally determine the final operating saturated pressure/temperature differential between the evaporator and condenser in the chiller (i.e. lift). This beneficially influences the mass flow and lift components of the compressor energy equation, discussed above.

As stated, evaporator saturated pressure may be considered a relative constant because chilled water entering and leaving conditions are kept constant. However, condenser entering water temperatures, and pressures when using constant volume condenser water pumps, are vary according to environmental and load conditions. Therefore, condenser saturated pressure conditions may be manipulated, via condenser water leaving temperature, to control to the minimum pressure differential required by the chiller manufacturer. Demand Flow constant Delta T variable flow operations control the condenser water pumps, such as through VFDs, to keep the minimum manufacturer pressure differential (i.e. lift) between the evaporator and condenser at all times.

Demand Flow also matches condenser water flow to chiller load in this manner reduces condenser water flow through the cooling tower at all partial load conditions. As stated, partial load conditions exist about 90% of the time in most chilled water plants. As the condenser water flow is reduced the cooling tower sump temperature approach to wet bulb is reduced as well. This is almost a linear relationship to about one half of the cooling tower original design approach temperature. This yields lower cooling tower sump temperatures at any given part load at the same cooling tower fan energy. In turn, the lower cooling tower sump temperatures result in lower condenser water entering temperatures at the condenser providing sub-cooling to refrigerant at the condenser.

In addition, Demand Flow uses external control operations in the condenser water pumping subsystem to achieve near or at design Delta T for a condenser regardless of chiller load conditions, thus eliminating Low Delta T Syndrome in the condenser water subsystem.

3. Utilizes external collaborating control operations between production and distribution loops in order to balance flow between the loops, minimizing or eliminating the excess flow and bypass mixing which contribute to Low Delta T Syndrome, such as in a decoupled chilled water plant. This produces the most deliverable air side capacity at any given chilled water flow rate. This also allows primary or production loop pumping to meet varying load conditions of the distribution pumping system. Under Demand Flow, Low Delta Syndrome is reduced to its lowest achievable level, if not effectively eliminated.

4. Utilizes critical zone resets to meet increases in cooling demand while controlling chilled water pumping according to a Delta T line. Critical zone resets may also be used to decrease cooling output by resetting the Delta T line.

5. Operates the chilled water plants and components thereof at minimal partial load pumping pressures to minimize chilled water valve bypass and the resultant overcooling, thus decreasing system load.

6. Produces a synergistic reduction in chilled water plant energy utilization as well as an increase in deliverable capacity by synchronizing chilled water pumping, condenser water pumping, compressor operation, cooling tower operation, and air side operation.

VI. Demand Flow Device or Controller

The operational strategy discussed and disclosed herein relates to the principles, operations, and algorithms applied to the one or more components of the chilled water plant implement a Demand Flow variable pressure curve logic control strategy to obtain the advantages and benefits discussed above. The operational strategy may be implemented in alternate embodiments to beneficially influence and optimize the performance of an existing chilled water plant and the components included or operable therein. The alternate embodiment and configuration may be utilized to control pressure and flow rates through the one more pumps and compressors operable within a chilled water plant. The controlled pressure and flow rates may, in turn, reduce or eliminate Low Delta T Syndrome by operating chilled water plant components at or near design delta T, regardless of demand conditions and/or cooling requirements.

Figure 25:
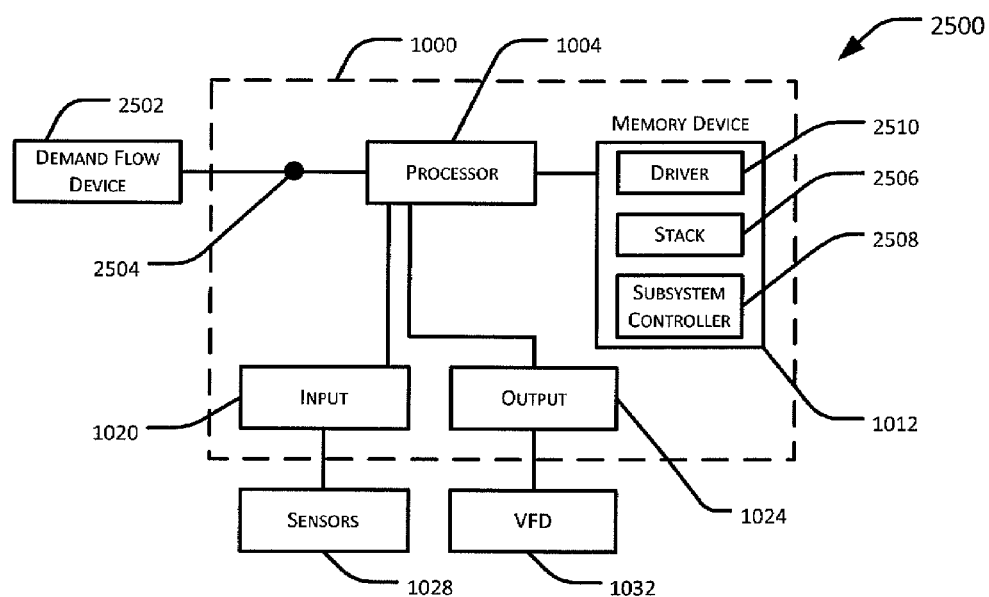
FIG. 25 is a block diagram illustrating an exemplary Demand Flow device interfaced with a controller of an exemplary chilled water plant.

FIG. 25 illustrates an exemplary demand flow control system 2500 which may be used to implement the operational strategy in a new chilled water plant system or to upgrade an existing chilled water plant. In one or more embodiments, the exemplary demand flow control system 2500 includes a demand flow controller 2502 coupled to or in communication with the controller 1000 (see FIG. 10). Herein, the phrases "coupled to", "in communication with" and the like are defined to mean components that are directly connected to each other or indirectly connected through one or more intermediate components. Such intermediate components may include both hardware and software based elements.

The controller 1000, in this exemplary embodiment, comprises the processor 1004, inputs 1020 configured to receive data or information from the sensors 1028, and outputs 1024 configured to provide control signals, setpoint information and other commands to the variable frequency drive (VFD) 1032 or other outputs. The data or information received or gathered via the sensors 1028 describes and characterizes the chilled water, condenser water, refrigerant, flow rate or other operating parameters and variables of chilled water plant components detected by one or more sensors 1028 may be received via an input 1020.

The processor 1004 may then perform one or more processing routines or algorithms on the data or information received via the one or more inputs 1020. The operational strategy includes the control and analysis routines including the algorithms embodied and described by the disclosed methods and illustrated by the accompanying flowcharts. The operational strategy may be performed or implemented by the demand flow controller 2502 and the results communicated to the processor 1004 and memory 1012. Alternatively, the processor 1004 may continue to perform the original, inefficient, control and analysis routines executed in connection with a subsystem control routine 2508. The results of the subsystem control routine 2508 may be overwritten or otherwise replaced by the results provided by the demand flow controller 2502 as will be discussed below in greater detail. As previously discussed, in the performance of the control routines, algorithms or other defined series of steps, tasks or activities, the processor 1004 may execute one or more computer-executable instructions stored on the memory device 1012. The computer-executable instructions may include the program logic, drivers and communications protocols required to exchange information, sensor data, demand flow information, and pressure setpoints. The computer-executable instructions may further be hard wired or designed into the processor 1004. The memory device 1012 may cooperate with or include an external storage device, device or accessible component used to store data or information.

Figure 26:
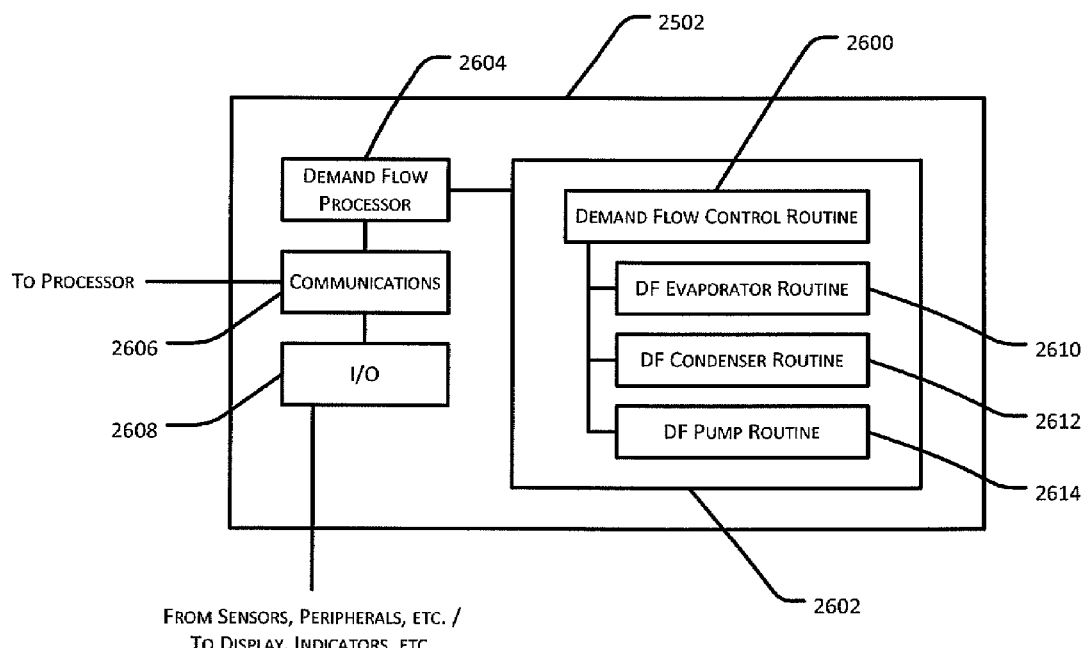
FIG. 26 is a block diagram of the exemplary Demand Flow device including a Demand Flow processor and a memory configured to store a Demand Flow control routine for performing Demand Flow variable pressure curve logic.

The demand flow device 2502, either alone or in cooperation with the controller 1000 and the processor 1004, stores the operational strategy routines and algorithms that comprise a demand flow control routine 2600 stored in a memory 2602 (see FIG. 26). The operational strategy routines and algorithms embodied in the demand flow control routine 2600 allow the demand flow device 2502 to operate the chilled water plant and/or the one or more components thereof according to demand flow principles in general and variable pressure control demand flow in particular. Examples of the operational strategy routines and algorithms embodied in the demand flow control routine 2600 are shown and discussed in connection with FIGS. 28 and 29 and the methods associated therewith. The hardware comprising the demand flow device 2502 and/or the compiled computer-executable instructions, processes and logic may be encrypted to prevent modification and ensure optimal operation.

The demand flow controller 2502 may accept input data or information from, for example, the controller 1000, to perform one or more real-time or near real-time operations, calculations and/or control processes on the input data according to the operational strategy, and provide a corresponding output. The corresponding output may be received by, for example, the controller 1000 and stored in the memory 1012 as will be discussed below in more detail. Alternatively, the corresponding output may be provided directly to one or more of the components of the chilled water plant.

FIG. 26 illustrates the configuration of the demand flow device 2502 that may be coupled to the controller 1000. The demand flow device 2502 may include a demand flow processor 2604 coupled to the memory 2602. The memory 2602 stores the demand flow control routine 2600 including algorithms that embody the disclosed methods for determining when increases or decreases to the pressure setpoints associated with each of the one or more pumps controlling the chilled/condenser water flow rate should be performed to keep chilled/condenser water at or near a desired delta T.

When the demand flow control routine 2600 has executed the operational strategy to determine an optimal pressure setpoint, the demand flow processor 2604 accesses a communication module 2606 to provide the determined optimal pressure setpoint (as identified by the reference numeral 2504) to controller 1000 and/or the memory 1012. In particular, the demand flow controller 2502 may communicate the calculated optimal pressure setpoint 2504 via a communication bus 2506 to the memory 1012. The exemplary optimal setpoint 2504 may be communicated via the controller 1004 or may bypass the controller 1004 and be provided directly to the memory 1012.

Regardless of the manner in which the exemplary optimal setpoint 2504 is provided, the information or values may be stored in a memory stack or location 2506 defined within the memory 1012. The memory stack 2506 may store and organize one or more design parameters and/or sensed or measured indicia for use by the demand flow control routine 2600. The memory stack 2506 may further store and organize one or more design parameters and/or measured indicia that, in turn, are accessible by the subsystem control routine 2508. The subsystem control routine 2508, in this example, encompasses the original, inefficient, control and analysis routines. The results and variables utilized and produced by the processor 1004 executing the subsystem control routine 2508 may be stored in predefined memory locations within the memory stack 2506.

The memory stack 2506, in this exemplary embodiment, is accessible to both the processor 1004 and the demand flow device 2502 (and more particularly, the demand flow processor 2604 operable within the demand flow device 2502). The demand flow device 2502 may communicate with and access a driver 2510 in order to facilitate communications with the memory stack 2506. For example, the driver 2510 may translate information and protocols to ensure reliable communications between the systems and programming of the demand flow device 2502 (and the included demand flow control routine 2600) and the existing controller 1000 to be upgraded or otherwise augmented.

The driver 2510 provides a mechanism by which the one or more design parameters and/or measured indicia stored in the memory stack 2506 may be read or otherwise utilized by the demand flow processor 2604 and the demand flow control routine 2600. Similarly, the driver 2510 provides a mechanism by which pressure setpoints and values calculated and determined by the legacy controller 1000 may be overwritten and otherwise replaced by, for example, the optimal pressure setpoint 2504 determined by the demand flow device 2502.

In another embodiment, the demand flow control routine 2600 may be stored on, for example, an auxiliary memory (not shown) such as: a memory card, memory stick, floppy disc, universal serial bus ("USB") memory device, or any other device operative to store computer-executable instructions or data. The auxiliary memory may, in turn, be coupled to and/or in communication with the memory device 1012. In this manner, the software or hardwired instructions to perform the demand flow variable pressure curve logic control may be implemented and/or integrated into the controller 1000. Alternatively, updates or upgrades may be loaded or stored on an auxiliary memory and transferred to the demand flow device 2502 via the communication module 2606.

The communication module 2606 may include both hardware and software elements necessary to exchange information between the demand flow device 2502 and the demand flow processor 2604 and a processor 1004. For example, the communication module 2606 may include hardware components such as a USB port, an Ethernet port, other networking capabilities to allow for communications via a wide area network (WAN), a local area network (LAN) and/or a wireless network configured according to for example, IEEE 802.11x. The communication module 2606 may further include software elements such as communication drivers, formatting algorithms, and translation tools configured to facilitate information or data exchange between the demand flow processor 2604, which may be operating according to a first programming language, and the processor 1004 which may be operating according to a second programming language. For example, the software elements of the communication module 2606 may convert or otherwise translate the information or sensor data received, or operational strategy results communicated, into other readable or exchangeable format such as an extensible markup language (XML). The communication module 2506 may further cooperate with the driver 2510 to convert or otherwise translate the information or results into one more proprietary communication formats or protocols.

The demand flow device 2502 may further include an input-output (I/O) interface 2608 configured to provide additional visual information, generate a graphical user interface (GUI) and/or receive user inputs via a keyboard or other input device. The I/O interface 2608 may further couple to a touch-screen display device configured to generate a graphical user interface (GUI) and/or receive one or more user inputs via a capacitive or resistive interface overlaid on the display screen. Alternatively, the I/O interface 2608 may include or cooperate with one or more buttons or keys arranged and configured to receive the user input. The I/O interface 2608 provides a means by which a user and/or system configurator may directly access the demand flow device 2502 without having to engage the controller 1000. In this way, the demand flow device 2502 may be utilized independently from the legacy controller 1000.

The demand flow processor 2604 and the demand flow control routine 2600 stored on the memory 2602 may cooperate and exchange information necessary to implement the operational strategy related to, at least, demand flow variable pressure curve logic as disclosed herein. The demand flow control routine 2600 may include control algorithms and routines programmed and designed to optimize the performance of each of the one or more components of the chilled water plant with respect to the remaining one or more components. For example, the demand flow control routine 2600 may include: a demand flow evaporator routine 2610; a demand flow condenser routine 2612 and a demand flow pump routine 2614. Each of these routines 2610 to 2614 may be arranged and programmed to determine optimal pressure setpoints to be maintain at one or more components and pumps such as the secondary and tertiary pumps operating within and in connection with the loops of the chilled water plant. By operating each of the pumps at it's determined optimal pressure setpoints, the pumps may be synchronized and coordinated to achieve or maintain an optimal pressure and flow rate between the components and loops, in turn, an optimal delta T may be maintained at each of the components of the chilled water plant 2700 (see FIG. 27). The control algorithms and routines contained or embodied within the demand floe control routine 2600 are discussed and illustrated in connection with the method disclosed herein and illustrated at least in FIGS. 28 and 29.

The demand flow evaporator routine 2610 may be configured and programmed to determine an optimal evaporator pressure setpoint based on, for example, the one or more design parameters and/or sensed or measured indicia. For example, the evaporator 2710 (see FIG. 27) may have been specified or designed in accordance with one or more design parameters which could include: (GPM); an operating pressure differential (PSID); an output capacity (Tons); and the design delta T. One or more measured of these parameters may be detected or sensed by sensors 2710a and 2710b. The sensors 2710a and 2710b may be flow sensors, pressure sensors, temperature sensors or any combination thereof.

As used herein sensors for each of the components of the chilled water plant 2700 (see FIG. 27) are identified by the reference numeral of the component being monitored (i.e., the reference numeral for the evaporator is "2710") and a letter "a" for the supply side and a letter "b" for the return side of each component. In this manner, the sensors 2710a and 2710b are known to monitor and report operating parameters and conditions related to the supply side output and the return side input of the evaporator 2710, respectively.

The demand flow condenser routine 2612 may be configured and programmed, similar to the demand flow condenser routine 2612, to determine an optimal condenser pressure setpoint based on for example the design parameters and/or sensed or measured operating conditions. For example, the condenser 2712 (see FIG. 27) may be characterized by one or more design parameters such as the flow rate (GPM); operating pressure (PSID); output capacity (Tons); and a design delta T. One or more measured or operational parameters may be detected or sensed by sensors 2712a and 2712b.

Figure 27:
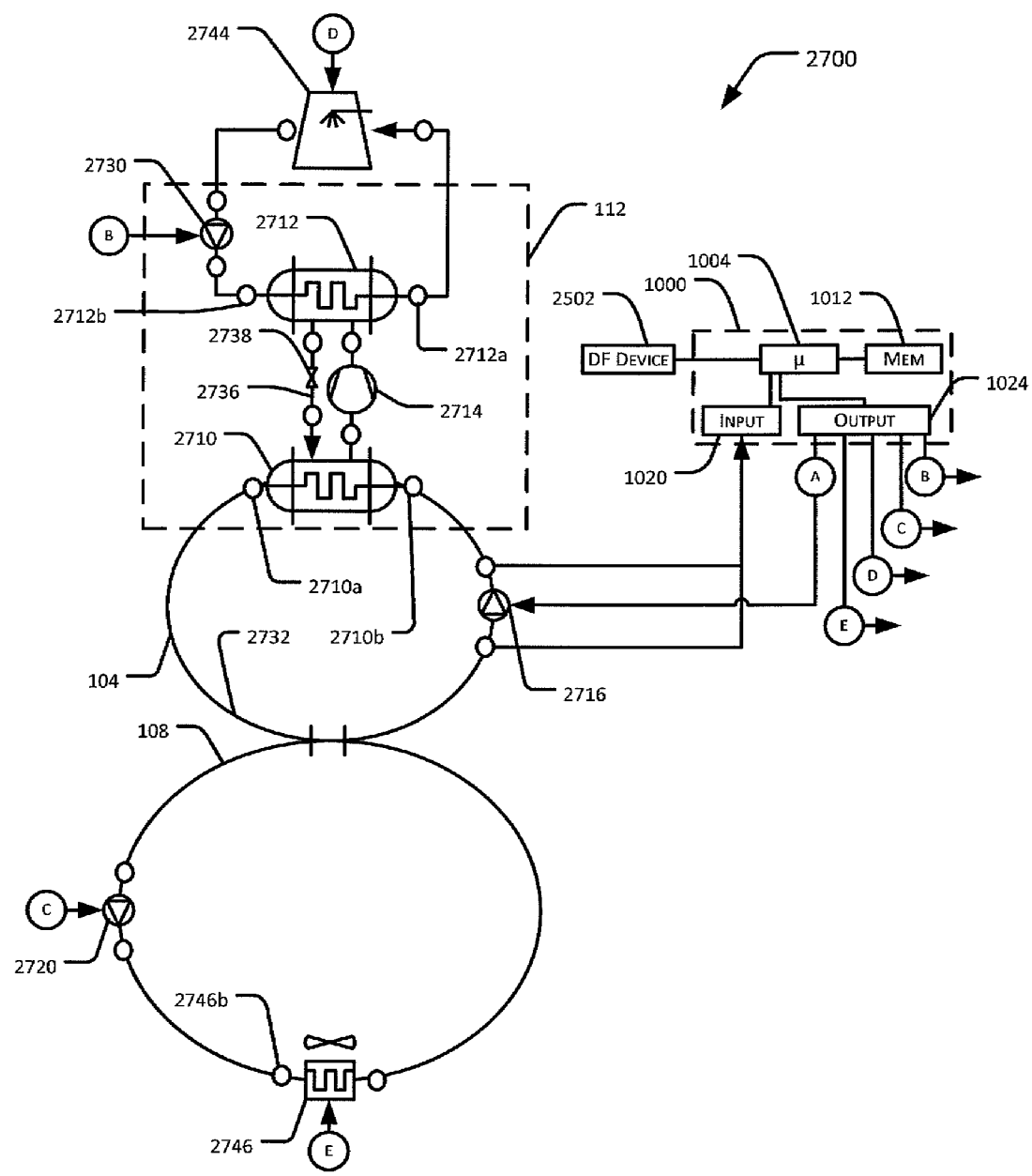
FIG. 27 is a block diagram illustrating an exemplary chilled water plant operable according to the Demand Flow variable pressure curve logic principles disclosed herein.

The demand flow pump routine 2614 may be utilized to calculate and determine optimal pressure set points for the compressor 2714, and the secondary pump 2720 (as well as any tertiary pumps, etc.) operable within the exemplary variable pressure curve logic control chilled water plant 2700 shown in FIG. 27.

VII. Demand Flow Variable Pressure Curve Logic (VPCL)

Figure 28:
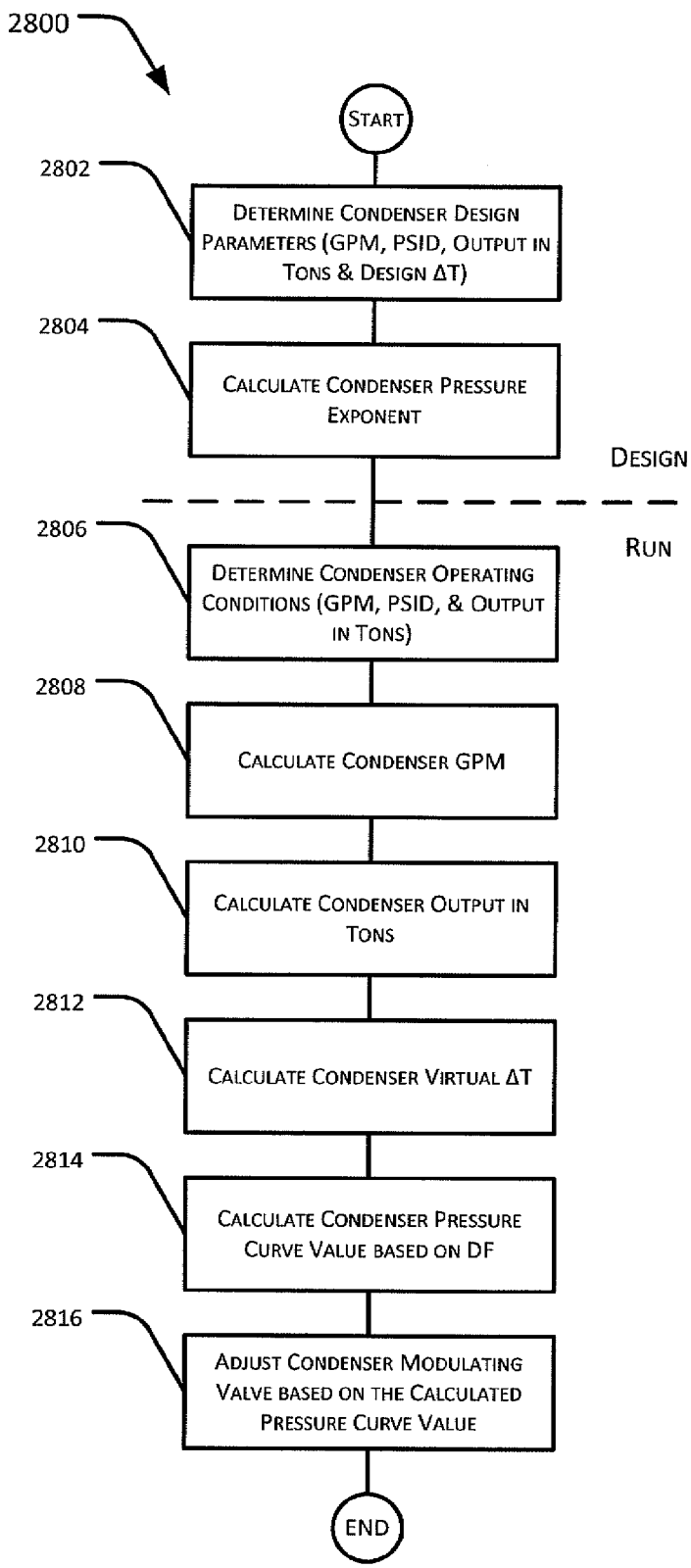
FIG. 28 is a flow diagram illustrating an exemplary Demand Flow condenser routine or algorithm in operation.
Figure 29:
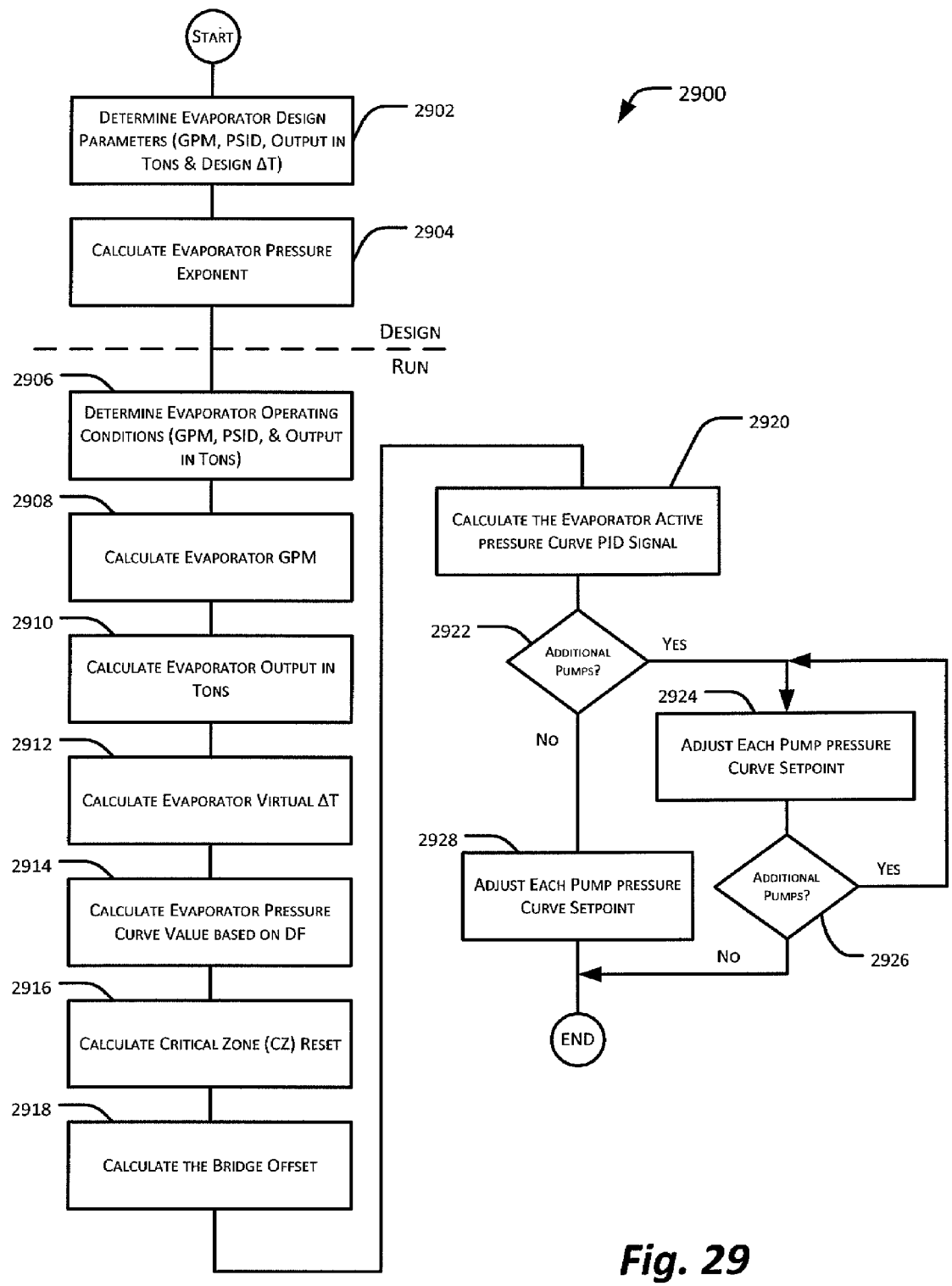
FIG. 29 is a flow diagram illustrating an exemplary Demand Flow evaporator routine or algorithm in operation.
Figure 30:
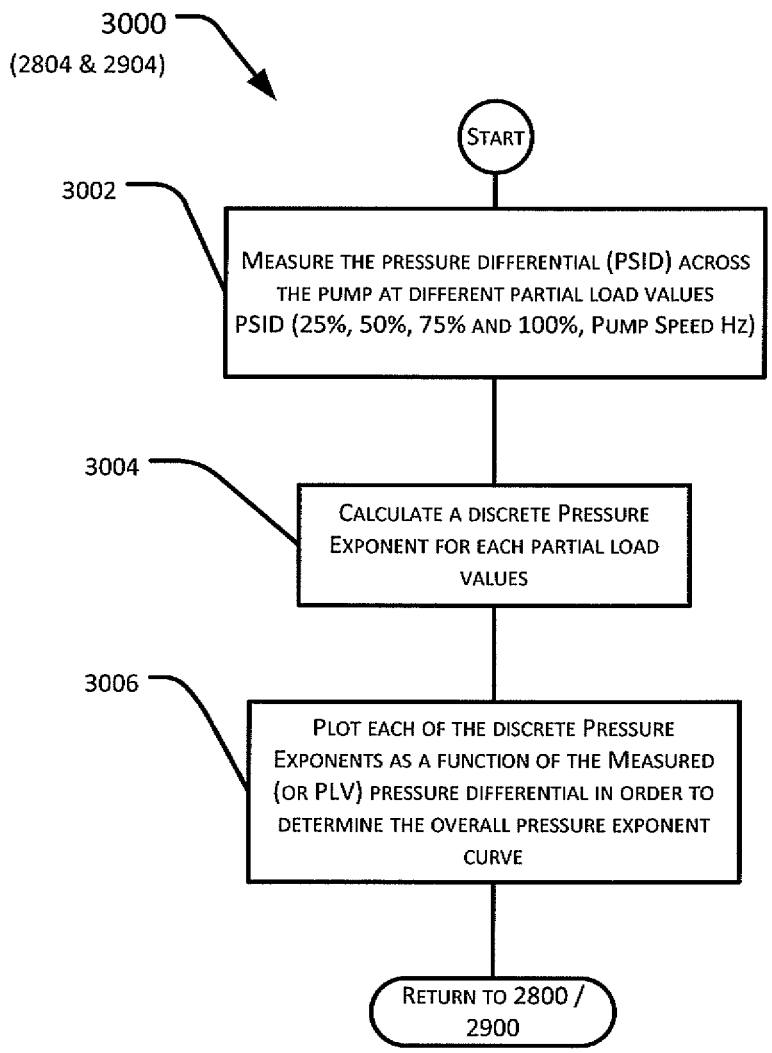
FIG. 30 is a flow diagram illustrating an exemplary routine or algorithm for determining the P Exponent variable for a given pump.

FIGS. 27, 28 and 29 illustrate, respectively, the exemplary chilled water plant 2700 configured to operate in conjunction with the demand flow device 2502, and algorithms and processes for determining optimal pressure setpoints associated with the condenser and evaporator operable therein. FIG. 30 illustrates an algorithm and process for calculating the operating pressure exponent utilized by the condenser and evaporator routines discussed and disclosed herein.

FIG. 27 illustrates the exemplary chilled water plant 2700 including a primary loop 104 and the secondary loop 108. The components of the exemplary chilled water plant are shown herein coupled to or in communication with the controller 1000 and the demand flow device 2502. The chiller 112, in fluid communication with the primary loop 104, comprises the condenser 2712, the compressor 2714 and the evaporator 2710 coupled via refrigerant lines 2736 and expansion valve 2738. The evaporator 2710 may be connected to a primary or other loop of a chilled water plant by one or more chilled water lines 2732. The demand flow device 2502, via the controller 1000, executes the demand flow control routine 2600 to control the operation of, for example, the compressor 2714, a condenser water pump 2730, and water pumps 2716 and 2720 operable in the primary and secondary loops, respectively.

In this exemplary embodiment, the demand flow control routine 2600 receives, via the processor 1004, memory 1012 (specifically the memory stack 2506) and input 1020; sensor data and communicates each of the subsequently calculated optimal pressure control setpoints to the compressor and water pumps operable within the chilled water plant 2700. FIG. 27 depicts the demand flow device 2502 communicating an optimal pressure setpoint A (which may be the optimal pressure setpoint 2504 previously discussed in connection with FIG. 25) to the water pump 2716. Similarly, the condenser water pump 2730 controlling or adjusting the pressure within the chiller 112 receives an optimized pressure setpoint B. Secondary and tertiary water pumps such as the exemplary water pump 2720 will likewise receive optimized pressure setpoints (represented by the reference identifier "C"). By controlling the delta T between the chiller 112 and the primary and secondary fluid loops, the operation of the cooling tower fan 2744 and the air handling unit 2746 may be controlled and adjusted to similarly optimize their performance and energy usage as indicated by the reference identifiers "D" and "E", respectively.

Sensor data related to measured and operational parameters occurring throughout the chilled water plant 2700 may be detected by the sensors 2714a, 2714b, 2730a, 2730b, 2716a, 2716b, 2720a and 2720b deployed at the appropriate supply and return points adjacent to the compressor 2714, the condenser water pump 2730, and the water pumps 2716 and 2720, respectively. The detected sensor data may, in turn, be communicated to the input 1020 for use by the processor 1004 (and stored when applicable in the memory 1012 and specifically the memory stack 2506).

In this manner, the demand flow device 2502 evaluates each of the components operable within the chilled water plant 2700 based on design characteristics, measured operational performance and current load requirements. The demand flow control routine 2600 operable within the demand flow device 2502 then calculates in real-time or near real-time an optimal pressure setpoint for each of the components to control the flow rate and ultimately regulate the delta T across each of the components in order to implement the demand flow variable pressure curve logic operational strategy.

Demand flow variable pressure curve logic (VPCL) as implemented by the demand flow control routine 2502 optimizes the total system energy of the chilled water plant 2700 by synchronizing the operation of the individual components operating therein. In particular, the individual components are synchronized to a calculated efficiency curve relative to the current environmental/load condition sensed via the sensors 2714a, 2714b, 2730a, 2730b, 2716a, 2716b, 2720a and 2720b.

In order to maximize user comfort and optimize system efficiency, the demand flow control routine 2502 utilizes a comprehensive optimization algorithm and process to minimize the energy usage of the chiller 112. Demand flow variable pressure curve logic varies provides the mechanism by which the energy usage can controlled by optimizing the pressure setpoints of the compressor 2714, and pumps 2716, 2720 and 2730 which, in turn, allows for the control of the water temperature and flow rate throughout the chilled water plant 2700.

A. Condenser

FIGS. 28 and 29 illustrate exemplary algorithms and processes for determining optimal pressure setpoints associated with the condenser and evaporator that may be implemented by the demand flow device 2502 and the demand flow control routine 2600. FIG. 28 is an operational flowchart 2800 of the procedures, steps and tasks that may be implemented by the demand flow control routine 2600, and more particularly the demand flow condenser routine 2612 portion of the demand flow control routine 2600, in order to optimize the performance and efficiency of the condenser 2712 (see FIG. 27).

An initial step or task undertaken to utilize the principles of the disclosed demand for variable pressure curve logic is to identify and review the design parameters of the one or more components operating with interconnection with the chilled water plant 2700. For example, prior to beginning implementation of the disclosed optimization algorithm and routine, the user or designer may input or provide the one or more design parameters to the memory 2602, the memory 1012 or any other accessible database or storage location (block 2802). The design parameters may include: the design condenser flow rate (GPM); the condenser design pressure differential (PSID); the design condenser capacity (Tons). The design parameters may further include the baseline or design chilled water delta T that represents the full load chilled water delta T calculated at the time commissioning of the chilled water plant 2700. These initial design parameters provide the demand flow processor 2604, and more specifically the demand flow condenser routine 2612, with a baseline performance envelope against which the condenser 2712 may be evaluated.

The demand flow control routine 2600 and the demand flow condenser routine 2612 are further configured, as shown at block 2804, to empirically calculate an operating pressure exponent (P Exponent) based on measured parameters of the condenser 2712 operating in the chiller 112. In this exemplary embodiment, the operating pressure exponent is calculated according to the formula:

$$P \text{ Exponent} = Ax^x + Bx + C$$

where x is the delta P or pressure change measured across the condenser 2712 (see block 2804) and the constants A, B and C are calculated for each chilled water plant 2700. This relationship is discussed in more depth in connection with FIG. 30. In particular, FIG. 30 illustrates a pressure exponent algorithm and routine 3000, that may be utilized to empirically derive discrete pressure exponents and an overall pressure exponent curve that fits or otherwise connects each of the discrete pressure exponents. The overall pressure exponent curve, and more particularly, the equation describing the overall exponent pressure curve, in turn, is utilized by the condenser routine to determine the operating pressure exponent shown above.

As the pressure exponent routine 3000 initializes, the delta P or pressure differential (PSID) across the condenser 2712 is measured at a variety of pump speeds specified at the condenser water pump 2730. For example, the pressure exponent routine 3000 records the pump speed in Hertz (Hz) and the pressure differential (PSID) across the condenser 2712 when the condenser water pump 2730 is operating at a partial load value (PLV) corresponding to 25%, 50%, 75% and 100% pumping capacity (block 3002). The pressure exponent for each discrete partial load value (PLV) is calculated as a function of the maximum operation pressure differential (PSID) of the system, the pump speed in Hertz and the measured operating pressure differential at a given PLV. The formula for calculating one of the discrete P Exponents for a given PLV is:

$$PLV \text{ Operating } PSID = \text{Max. Operating } PSID \cdot \left(\frac{\text{Pump Speed (Hz)}}{60}\right)^{P \text{ Exponent}_{PLV}}.$$

The maximum operating pressure differential (PSID) is a known design value, and the pump speed (Hz) and the operating pressure differential (PSID) are measured and/or empirically derived values. In this way, it is possible to calculate a discrete pressure exponent (P Exponent$_{PLV}$) for each set of variables associated with a given partial load value (PLV). Stated another way, by balancing the left and right sides of the above-formula, the discrete pressure exponent (P Exponent$_{PLV}$) can be derived for a given partial load value (e.g., 25%, 50%, 75% and 100% pumping capacity) and measured operating pressure differential at the given PLV (block 3004). The resulting the discrete pressure exponents (P Exponent$_{PLV-25\%}$, P Exponent$_{PLV-50\%}$, P Exponent$_{PLV-75\%}$, and P Exponent$_{PLV-100\%}$) may be plotted according to the measured operating pressure differential in order to define the overall pressure exponent curve. The equation describing the overall exponent pressure curve (block 3006) can be derived based on these plotted values.

Once the equation describing the overall exponent pressure curve has been derived, the pressure exponent routine 3000 completes and returns to the operational flowchart 2800. At this point, the equation describing the overall exponent pressure curve may be utilized to calculate the operating pressure exponent for any given pressure differential (PSID). An exemplary overall exponent pressure curve equation may be defined as:

$$P\text{ Exponent} = -0.00003x^2 + 0.0031x + 1.9358$$

where x is the delta P or pressure change measured across the condenser 2712 (see block 2804) and the constant A equals −0.00031, the constant B equals 0.0031 and the constant C equals 1.9358.

This portion of the demand flow condenser routine 2612 may be considered the design or configuration portion of the routine while the remaining steps and operations may be characterized as the run or operational portion of the routine.

The demand flow condenser routine 2612 utilizes the sensors 2712a and 2712b to detect and measure the pressure differential (PSID) across the condenser 2712. In this embodiment, the sensors 2712a and 2712b may be water immersion sensors specified with a suitable range (e.g. 20°-120° F.) to measure the condenser water delta-T high. In other embodiments and configurations the temperature sensors may be high or higher accuracy sensors (±0.5° F.) ar ranged to detect minor variations in the condenser and/or chilled water flow throughout portions of the chilled water plant 2700. Moreover, the demand flow control routine sensors 2712a and 2712b and/or components or subsystems thereof may be configured and arranged to measure a chilled water supply (CWS) temperature (sensor 2712a) and the chilled water return (CHR) temperature (sensor 2712b) associated with the condenser 2712 (at block 2806).

The demand flow condenser routine 2612 may subsequently utilize the detected and measured pressure and temperature information to calculate a flow rate (GPM) through the condenser 2712 (at block 2808). In particular, the demand flow processor 2604 accesses the values stored in, for example, the memory stack 2506 (or memory 2602 if previously accessed and stored locally) as directed by the demand flow control routine 2600. The condenser flow rate is calculated according to the formula:

$$\textit{Meas. Condenser Flow Rate} = T\&B\ GPM * \left( \frac{\textit{Meas. Condenser }\Delta P(PSID)}{\textit{Design Condenser }\Delta P(PSID)} \right)^{.5}$$

where the test & balance (T&B) GPM represents the actual flow measured by the hydronic balancer of the condenser water system. This is usually different that the "design" or full-rated flow of the condenser, due to the unique piping system at each customer's plant. As previously discussed, the sensors 2712a and 2712b may be high accuracy pressure sensors such arranged to measure the supply pressure (via sensor 2712a) and the return pressure (via 2712b). The difference between the measured supply and return pressures represents the pressure differential or loss across the condenser 2712.

Upon determination of the measured condenser flow rate (GPM), the demand flow condenser routine 2612 and the demand flow control routine 2600 (as shown at block 2810) calculate the current condenser output capacity (Tons). The current condenser capacity may be calculated according to the formula:

$$\textit{Condenser Capacity (Tons)} = \textit{Meas. Condenser Flow Rate} * \left( \frac{CWR - CWS}{24} \right)$$

In this way, the demand flow condenser routine 2612 portion of the demand flow control routine 2600 can empirically calculate the output capacity each condenser 2712 operating in conjunction with the chilled water plant 2700.

The demand flow control routine 2600 and the demand flow condenser routine 2612 may, in turn, utilize the results from the previous steps and calculations to determine a virtual delta T (see block 2812). The virtual delta T represents a hypothetical or equivalent chilled water delta T that would be present if a constant volume pumping algorithm were utilized under the current operating conditions. The virtual delta T may be calculated according to the formula;

$$\textit{Virtual Delta } T = \textit{Design Delta } T * \left( \frac{\textit{Condenser Capacity (Tons)}}{\textit{Design Condenser Capacity (Tons)}} \right).$$

The demand flow control routine 2600 and the demand flow condenser routine 2612 may, at block 2814, utilize the results and information from one or more of the preceding algorithm steps to determine a pressure curve set point for the condenser 2712. The pressure curve setpoint may be determined according to the formula:

$$PC\ \textit{Setpoint} = \textit{Design Condenser }\Delta P(PSID) * \left( \frac{\textit{Virtual Delta } T}{\textit{Baseline Delta } T} \right)^{P\ Exponent}$$

Where the baseline delta T represents the full load delta T chosen or selected at the time of commissioning of the chilled water plant 2700. The baseline delta T may (and often will) correspond to the design delta T.

In another embodiment, the demand flow control retained 2600 and the demand flow condenser routine 2612, at block 2814, may utilize the parameters and information from one or more of the preceding algorithm steps in conjunction with the measured active pressure differential (PSID) value to directly determine the pressure curve set point for the condenser 2712. The pressure curve setpoint according to this alternate embodiment may be determined according to the formula:

$$PC\ \textit{Setpoint} = \textit{Active Condenser }\Delta P(PSID) * \left( \frac{\textit{Measured Delta } T}{\textit{Design Delta } T} \right)^{P\ Exponent}.$$

The calculated pressure curve set point may, in turn, be communicated from the demand flow control routine 2600 and demand flow processor 2604 via the communications module 2606 to the pump 2730 (see block 2816). During operation, if the temperature of the condenser water detected by the sensor 2712b rises above or exceeds a threshold level corresponding to, for example, the supply chilled water temperature setpoint plus a small deadband temperature (e.g. 1° F.), then the demand flow device 2502 and the demand flow control retained 2600 initiates an override to linearly increase or ramp up the VFD 1032 associated with the condenser water pump 2730 to full speed. When the temperature of the chilled water exceeds the threshold, a loss of communication occurs as the temperature surpasses the sensor's ability to detect the temperature. The subsequent increased flow rate provided by the ramped up VFD 1032 limits additional heat transfer, thereby causing the temperature to decline and communications to be restored. The VFD 1032 may further be programed to initiate a deceleration ramp after, for example, 15 min. at full speed.

B. Evaporator

FIG. 29 is an operational flowchart 2900 for implementing implemented variable pressure curve logic operational strategy by the demand flow control routine 2600 in order to optimize the performance and efficiency of the evaporator 2710 (see FIG. 27).

In the design portion or stage of the demand flow evaporator routine 2610 receives and organizes one or more design parameters in the memory 2602, the memory 1012 or any other accessible database or storage location (as shown at block 2902). The design parameters may, as previously discussed, include: a design condenser flow rate (GPM); a condenser design pressure differential (PSID); the design condenser capacity (Tons); a baseline or design chilled water delta T that represents the full load chilled water delta T calculated at the time commissioning of the chilled water plant 2700. In another embodiment, the organized design parameters can be supplemented with or augmented by a current or active pressure differential (PSID) value measured across the evaporator 2710. Utilizing these design and/or measured parameters, the performance envelope against which the evaporator 2710 is to be evaluated may be established by the demand flow processor 2604 and the demand flow condenser evaporator 2610 a.

An evaporator-specific pressure exponent (P Exponent) may be empirically-derived and calculated by the demand flow control routine 2600 and the demand flow evaporator routine 2610. The pressure exponent (P Exponent) may be based on measured parameters of the evaporator 2710 operating in the chiller 112. The pressure exponent may be calculated according to the formula:

$$P\ \text{Exponent} = Ax^2 + Bx + C$$

where x is the delta p or pressure change measured across the evaporator 2710 (see block 2904) and the constants A, B and C are calculated for each chilled water plant 2700. As previously discussed in connection with the condenser 2730, FIG. 30 illustrates a pressure exponent algorithm and routine 3000 that may be utilized to empirically derive discrete pressure exponents and an overall pressure exponent curve that fits or otherwise connects each of the discrete pressure exponents. The overall pressure exponent curve, and more particularly, the equation describing the overall exponent pressure curve, in turn, is utilized by the evaporator routine to determine the operating pressure exponent shown above.

Once the equation describing the overall exponent pressure curve has been derived, the pressure exponent routine 3000 completes and returns to the operational flowchart 2900. At this point, the equation describing the overall exponent pressure curve may be utilized to calculate the operating pressure exponent for any given pressure differential (PSID) as discussed previously.

The demand flow evaporator routine 2610 begins the operational or run portion of the routine by utilizing the sensors 2710a and 2710b to detect and measure the pressure differential (PSID) across the evaporator 2710. The sensors 2710a and 2710b and/or components or subsystems thereof may further be configured and arranged to measure a chilled water supply (CWS) temperature (sensor 2710a) and the chilled water return (CHR) temperature (sensor 2710b) associated with the evaporator 2710 (at block 2906).

The demand flow evaporator routine 2610, in turn, calculates a flow rate (GPM) through the evaporator 2710 (at block 2908) based on the detected and measured pressure and temperature information. In particular, the demand flow processor 2604 accesses the detected values stored in, for example, the memory stack 2506 of memory 2602 as directed by the demand flow control routine 2600. The condenser flow rate is be calculated according to the formula:

$$\text{Meas. Evaporator Flow Rate} = T\&B\ GPM * \left(\frac{\text{Meas. Evaporator }\Delta P(PSID)}{\text{Design Evaporator }\Delta P(PSID)}\right)^{.5}$$

where the T&B GPM represents the full flow evaporator flow rate. As previously discussed, the sensors 2710a and 2710b may be high accuracy pressure sensors such arranged to measure the supply pressure (via sensor 2710a) and the return pressure (via 2710b). The difference between the measured supply and return pressures represents the pressure differential or loss across the evaporator 2710.

Upon determination of the measured evaporator flow rate (GPM), the demand flow evaporator routine 2610 and the demand flow control routine 2600 may (as shown at block 2910) calculate the current evaporator output capacity (Tons) according to the formula:

$$\text{Evaporator Capacity (Tons)} = \text{Meas. Evap. Flow Rate} * \left(\frac{CWR - CWS}{24}\right)$$

In this way, the demand flow evaporator routine 2610 empirically calculates the output capacity each evaporator 2710 operating in conjunction with the chilled water plant 2700.

The demand flow control routine 2600 and the demand flow evaporator routine 2610, in turn, utilize the results from one or more of the previous steps and calculations to determine a virtual delta T (see block 2912). As previously discussed, virtual delta T represents an equivalent chilled water delta T that would result if a constant volume pumping algorithm were utilized under the current operating conditions. The virtual delta T may be calculated according to the formula;

$$\text{Virtual Delta }T = \text{Design Delta }T * \left(\frac{\text{Evaporator Capacity (Tons)}}{\text{Design Evaporator Capacity (Tons)}}\right).$$

The demand flow control retained 2600 and the demand flow evaporator routine 2610, at block 2914, utilize the results and information from one or more of the preceding algorithm steps to determine a pressure curve set point for the evaporator 2710. The pressure curve setpoint may be determined according to the formula:

$$PC\ \text{Setpoint} = \text{Design}\ Evap.\ \Delta P(PSID) * \left(\frac{\text{Virtual Delta } T}{\text{Baseline Delta } T}\right)^{P\ Exponent}$$

where the baseline delta T represents the full load delta T chosen or selected at the time of commissioning of the chilled water plant 2700. The baseline delta T may (and often will) correspond to the design delta T.

In another embodiment, the demand flow control retained 2600 and the demand flow evaporator routine 2610, at block 2914, may utilize the results and information from one or more of the preceding algorithm steps in conjunction with the measured active pressure differential (PSID) value to determine the pressure curve set point for the evaporator 2710. The pressure curve setpoint according to this alternate embodiment may be determined according to the formula:

$$PC\ \text{Setpoint} = \text{Active}\ Evap.\ \Delta P(PSID) * \left(\frac{\text{Measured Delta } T}{\text{Design Delta } T}\right)^{P\ Exponent}.$$

The demand flow evaporator routine 2610 and the demand flow control routine 2600 may cooperate to implement a critical zone reset portion of the operational strategy (see block 2916) in order to adjust the operation of the chilled water plant 2700 to altered demand requirements. For example, if cooling demand is lowered, then a critical zone reset may alter the operating or current delta T linearly towards the design delta T. In operation, a decrease in demand from the chilled water plant 2700 may trigger a critical zone reset that causes the 15-degree current operating delta T to shift towards the 16-degree design delta T. Accordingly, the pressure setpoint for one or more pumps operating throughout the chilled water plant 2700 may be decreased in order to decrease the chilled water flow therethrough. The critical zone reset setpoint can be calculated according to the linear formula:

$$Y=M*X+B.$$

where M is the slope of the line as defined by (Y2−Y1)/(X2−X1);

X is the current value of the chosen critical zone parameter; and

B is the Y-intercept value. The Y-intercept value is selected from the minimum or maximum Y-M*(Min or Max critical zone (CZ) value). The minimum or maximum critical zone (CZ) values are site-specific parameters selected or identified at the time of commissioning of the chilled water plant 2700 and the demand flow device 2502. For example, in one implementation, the humidity within a building or area may be of importance to a user, in this instance the critical zone values may be selected based on measured humidity and/or temperature values in the area of interest. In another embodiment, the sensor 2746*b* may monitoring the temperature and flow into the air handling unit 2746 in order to determine if and when the supply temperature falls below a threshold or value necessary to provide the desired cooling. In this embodiment, the operation and performance of the air handling unit 2746 may provide the requisite minimum critical zone (CZ) value feedback or control the demand flow device 2502. Other values and parameters may be determined based on the requirements of a specific implementation.

The demand flow evaporator routine 2610 and the demand flow control routine 2600 may, as indicated at block 2918, determine the temperature at the decoupler or bypass 128 connecting the primary loop 104 and secondary loop 108. The detected temperature difference may, in turn, be utilized to determine the existence of a flow imbalance between the loops 104 and 108. The temperature in the de-coupler 128 ranges between predetermined minimum and maximum temperatures, and the bridge offset may be calculated via a linear equation that adjusts pressure setpoint (as indicated by the reference "C") associated with the water pump 2720 to balance the flow between these loops.

The calculated or critical zone reset pressure curve setpoint may, in turn, be communicated from the demand flow control routine 2600 and demand flow processor 2604 via the communications module 2606 to the pump 2716 (see block 2920). The change in operating pressure of the pump 2716 to the calculated or new pressure curve setpoint alters the pressure and flow rate through the evaporator 2710.

Subsequently, the demand flow pump routine 2614 may determine (at block 2922) if additional components, pumps, etc. require evaluation and reset. If additional pumps and compressors require evaluation, then the demand flow pump routine 2614 calculates a new or optimal pump setpoint for the additional pump (see block 2924). The demand flow pump routine 2614 repeats (at block 2926) the calculations for each identified and/or operational pump in the chilled water plant 2700.

The calculated pressure curve set point(s) may, in turn, be communicated from the demand flow control routine 2600 and demand flow processor 2604 via the communications module 2606 to the remaining pump(s) (see block 2928).

Figure 31:
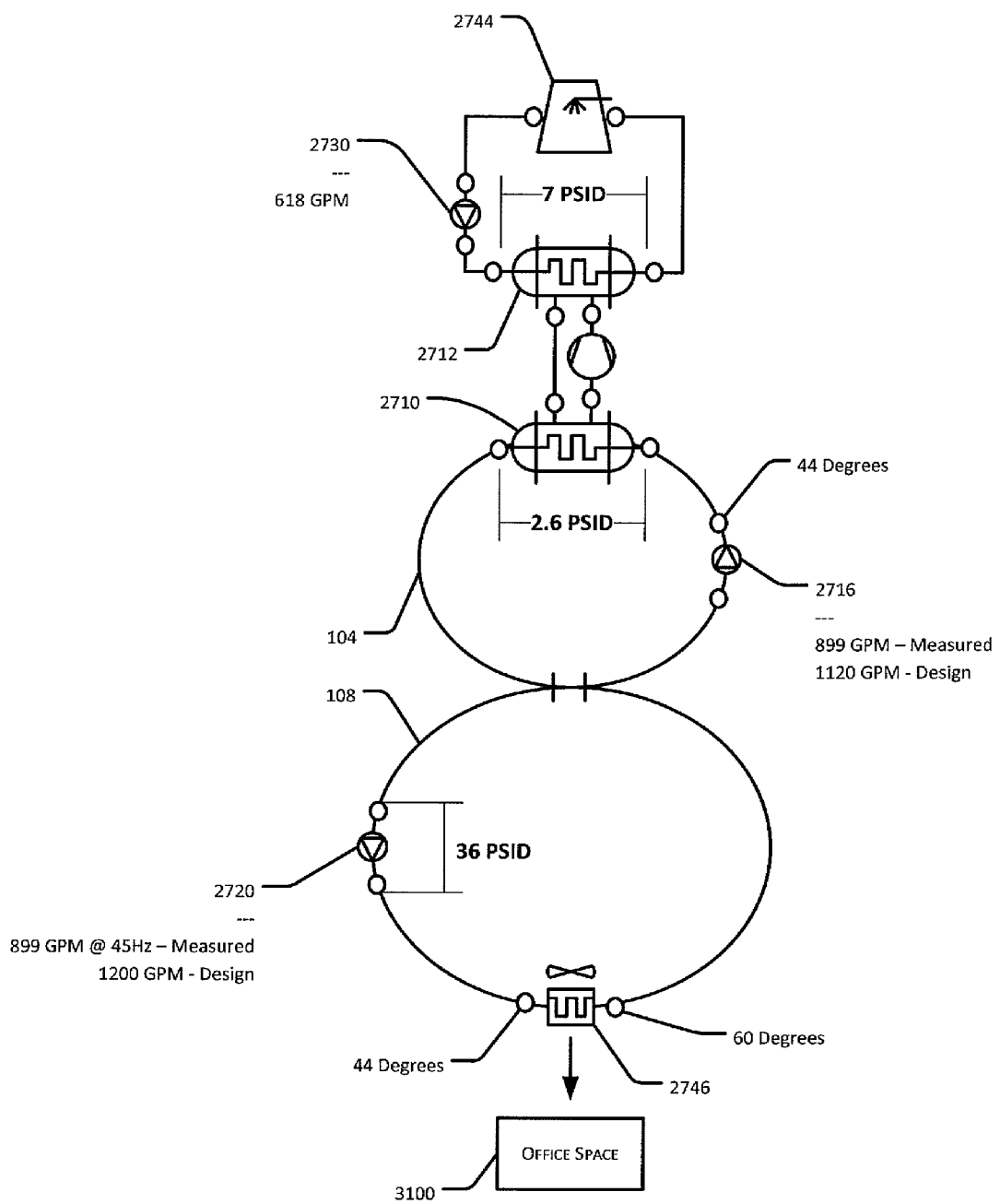
FIG. 31 is a block diagram illustrating the exemplary chilled water plant shown in FIG. 27 operating according to the disclosed Demand Flow variable pressure curve logic principles disclosed herein.

To illustrate with a specific example, an exemplary chilled water plant optimized and managed in accordance with Demand Flow variable pressure curve logic is shown in FIG. 31. In the example, the 44 degree chilled water produced in the primary loop 104 is circulating at a flow rate equal to 899 gallons per minute (GPM) to maintain a 2.6 pressure differential (PSID) across the evaporator 2710. Similarly, the secondary loop 108 circulates the chilled water through the secondary pump 2720 at a flow rate 899 GPM (with the VFD 1032 driving the secondary pump at 45 Hz) and a 36 PSID. At this flow rate and pressure differential, the air handling unit 2746 receives sufficient chilled water flow to cool the office space 3100 to a desired temperature. The temperature of the chilled water exiting the air handling unit 2746, in this example, increases from 44 degrees to 60 degrees and circulates from the secondary loop 108 back to the primary loop 104. In a similar manner, heat from the 60 degree chilled water is transferred from the evaporator 2710 to the condenser 2712 via a refrigeration cycle established between the two components. The condenser 2712 and the cooling tower 2744 cooperate with the condenser pump 2730 to maintain a 618 GPM flow rate and a 7 PSID across the condenser 2712. By balancing the flow rates between these loops as a function of the pressure setpoints associated with the pumps 2716, 2720 and 2730, the evaporator 2710, the condenser 2712 and the air handling unit 2746 may be operated efficiently at flow rates and pressure outside of their original design parameters. This, in turn, provides additional operational flexibility as well as increased efficiency because no one component or element is required to compensate for the inefficient operation of the remaining components under varying demand conditions.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A demand flow device configured to interface with an existing chilled water plant controller to manage performance of one of a plurality of chilled water plant subsystems with respect to remaining subsystems of the plurality of chilled water plant subsystems over a range of load conditions, the demand flow device comprising:
a communication device configured to receive sensor data associated with the one of the chilled water plant subsystems, wherein the sensor data measures operational variables of the chilled water plant;
a demand flow controller in communication with the communication device, the demand flow controller configured to utilize the received sensor data to:
determine an optimal pressure setpoint as a function of a chilled water delta T,
control a chilled water flow rate through the one of the chilled water plant subsystems as a function of the optimal pressure setpoint and the chilled water delta T; and
adjust, via the chilled water plant controller, the optimal pressure setpoint, in response to one or more detected triggering events, to perform a critical zone reset of the chilled water delta T, wherein the optimal pressure setpoint is determined as a function of a measured pressure differential, a ratio of a measured delta T to a design delta T and a site-specific exponent.

2. The demand flow device of claim 1, wherein the chilled water delta T is a function of a measured chilled water entrance temperature and a measured chilled water exit temperature sensed at one or more components of the chilled water plant.

3. The demand flow device of claim 1, wherein the function, with the measured delta T expressed as Measured $\Delta T$, the design delta T expressed as Design $\Delta T$, the measured pressure differential expressed as Measured $\Delta P$, and P Exponent is a pressure exponent, is defined as:

Pressure setpoit=Measured $\Delta P$*(Measured $\Delta T$/Design $\Delta T$)^P Exponent.

4. The demand flow device of claim 1, wherein the optimal pressure setpoint controls a flow rate provided by a circulatory pump associated with the one of the subsystems of the chilled water plant.

5. The demand flow device of claim 4, wherein the flow rate is determined to maintain the chilled water delta T across the one of the subsystems of the chilled water plant.

6. The demand flow device of claim 1, wherein the critical zone reset adjusts the optimal pressure setpoint to correspond to a different chilled water delta T.

7. The demand flow device of claim 1, wherein the one of the subsystems of the chilled water plant is selected from the group consisting of: an evaporator; a condenser; a compressor and a chilled water pump.

8. The demand flow device of claim 7, wherein the optimal pressure setpoint represents an optimal component pressure setpoint for the one of the subsystems of the chilled water plant.

9. The demand flow device of claim 7, wherein the chilled water pump comprises multiple chilled water pumps in operation throughout the chilled water plant.

10. A demand flow control system for the implementation of variable pressure control logic in an existing chilled water plant controller to synchronize the performance of one or more chilled water plant components over a range of demand conditions, the demand flow control system comprising:
a demand flow controller in communication with the existing chilled water plant controller, the demand flow controller configured to: receive sensor data from one or more chilled water plant components coupled to the existing chilled water plan controller:
determine an optimal pressure setpoint as a function of a desired chilled water delta T and the received sensor data for each of the one or more chilled water plan components, wherein the optimal pressure setpoint is determined iteratively for each of the one or more chilled water plant components; communicate the optimal pressure setpoint to the existing chilled water plant controller; and control, via the existing chilled water plant controller, a chilled water flow rate through each of the one or more chilled water plant components as a function of the optimal pressure setpoint and the desired chilled water delta T; wherein the optimal pressure setpoint is determined as a function of a measured pressure differential, a ratio of a measured delta T to a design delta T and a site-specific exponent.

11. The demand flow control system of claim 10, wherein the demand flow controller is further configured to:
adjust the optimal pressure setpoint, in response to one or more detected triggering events, to perform a critical zone reset of the desired chilled water delta T.

12. The demand flow control system of claim 11, wherein the triggering event is selected from the group consisting of: opening of a chilled water valve; a change in a sensed chilled water temperature; a change in flow rate of a pump; and a change in a humidity level within a sensed space.

13. The demand flow control system of claim 11, wherein the critical zone reset adjusts the optimal pressure setpoint to correspond to a different desired chilled water delta T.

14. The demand flow control system of claim 10, wherein the desired chilled water delta T is evaluated with respect to a measured chilled water entrance temperature and a measured chilled water exit temperature sensed at one or more components of the chilled water plant.

15. The demand flow control system of claim 10, wherein the desired chilled water delta T at the one or more chilled water plant components is maintained by:
increasing the optimal pressure setpoint and consequentially the chilled water flow rate to reduce a sensed chilled water delta T with respect to the desired chilled water delta T; and
decreasing the optimal pressure setpoint and consequently the chilled water flow rate to increase the sensed chilled water delta T with respect to the desired chilled water delta T.

16. The demand flow control system of claim 10, wherein the one or more components of the chilled water plant are selected from the group consisting of: an evaporator; a condenser; a compressor and a chilled water pump.

17. The demand flow control system of claim 16, wherein the optimal pressure setpoint represents an optimal component pressure setpoint for each of the one or more components of the chilled water plant.

18. A method of demand flow control utilizing variable pressure control logic to manage the performance of one or more chilled water plant components over a range of demand conditions operable in an existing chilled water plant, the method of demand flow control comprising: sensing a chilled water entrance temperature and a chilled water exit
- temperature at one or more components of the chilled water plant; communicating the sensed chilled water entrance temperature and the
- sensed chilled water exit temperature to a demand flow controller; calculating an optimal pressure setpoint at the demand flow controller,
- wherein the optimal pressure setpoint is calculated as a function of a desired chilled water delta T and the sensed chilled water entrance temperature and the sensed chilled water exit temperature to a demand flow controller; communicating the optimal pressure setpoint to an existing chilled water plant
- controller; and controlling a chilled water flow rate through the one or more components of the chilled water plant as a function of the communicated optimal pressure setpoint; wherein the optimal pressure setpoint is determined as a function of a measured pressure differential, a ratio of a measured delta T to a design delta T and a site-specific exponent.

19. The method of demand flow control of claim 18, wherein calculating the optimal pressure setpoint is a function of a design characteristic of the one or more components of the chilled water plant.

20. The method of demand flow control of claim 18, wherein sensing the chilled water entrance temperature and the chilled water exit temperature further comprises sensing a chilled water flow rate through one or more components of the chilled water plant.

21. The method of demand flow control of claim 18 further comprising:
- iteratively calculating the optimal pressure setpoint for each of the one or more chilled water plant components.

22. The method of demand flow control of claim 18, wherein controlling the chilled water flow rate further comprises:
- increasing the optimal pressure setpoint and consequentially the chilled water flow rate to reduce a sensed chilled water delta T with respect to the desired chilled water delta T; and
- decreasing the optimal pressure setpoint and consequently the chilled water flow rate to increase the sensed chilled water delta T with respect to the desired chilled water delta T.

23. The method of demand flow control of claim 18 further comprising:
- adjusting the optimal pressure setpoint, in response to one or more detected triggering events, to perform a critical zone reset of the desired chilled water delta T.

24. The method of demand flow control of claim 23, wherein the triggering event is selected from the group consisting of: opening of a chilled water valve; detecting a change in a sensed chilled water temperature; detecting a change in flow rate of a pump; and detecting a change in a humidity level within a sensed space.

25. The demand flow device of claim 1 wherein the demand flow controller is configured to identify a pre-determined chilled water Delta T and setting a chilled water Delta T based on the pre-determined chilled water Delta T, the chilled water Delta T comprising a chilled water entering temperature and a chilled water leaving temperature at one or more components of the chilled water plant and wherein the demand flow controller is configured to control the chilled water flow rate to maintain the chilled water Delta T across the one or more components of the chilled water plant.

* * * * *